(12) United States Patent
Tuck

(10) Patent No.: US 8,184,000 B2
(45) Date of Patent: *May 22, 2012

(54) PERSONAL RADIO LOCATION SYSTEM

(75) Inventor: Edward F. Tuck, West Covina, CA (US)

(73) Assignee: Social Fabric Corporation, West Covina, CA (US)

( * ) Notice: Subject to any disclaimer, the term of this patent is extended or adjusted under 35 U.S.C. 154(b) by 714 days.

This patent is subject to a terminal disclaimer.

(21) Appl. No.: 12/590,515

(22) Filed: Oct. 24, 2008

(65) Prior Publication Data

US 2010/0141433 A1   Jun. 10, 2010

Related U.S. Application Data

(63) Continuation-in-part of application No. 11/286,143, filed on Nov. 23, 2005, now abandoned, which is a continuation-in-part of application No. 11/239,603, filed on Sep. 28, 2005, now Pat. No. 7,969,301.

(51) Int. Cl.
G08B 1/08 (2006.01)
G08B 23/00 (2006.01)
C07K 16/00 (2006.01)

(52) U.S. Cl. ........... 340/539.13; 340/573.1; 530/388.15; 530/388.2

(58) Field of Classification Search .................. None
See application file for complete search history.

(56) References Cited

U.S. PATENT DOCUMENTS

| | | | |
|---|---|---|---|
| 6,970,474 B1 * | 11/2005 | Sinha | 370/401 |
| 7,912,764 B1 * | 3/2011 | Frederick et al. | 705/27.1 |
| 2004/0189476 A1 * | 9/2004 | Borovoy et al. | 340/573.1 |
| 2005/0282530 A1 * | 12/2005 | Raff | 455/418 |
| 2007/0118426 A1 * | 5/2007 | Barnes, Jr. | 705/14 |
| 2010/0332994 A1 * | 12/2010 | Istvan et al. | 715/740 |

* cited by examiner

*Primary Examiner* — Julie Lieu
(74) *Attorney, Agent, or Firm* — Thomas N. Giaccherini

(57) ABSTRACT

Methods and apparatus for using an energy emanating device to find a person (17a,b) or an object based on preselected attributes (33) stored in the energy emanating device (10) are disclosed. A network radio (52) enables the user of the device to communicate with others over a wireless network (50) via voice calls, text messaging, instant messaging, e-mails and Internet access.

73 Claims, 48 Drawing Sheets

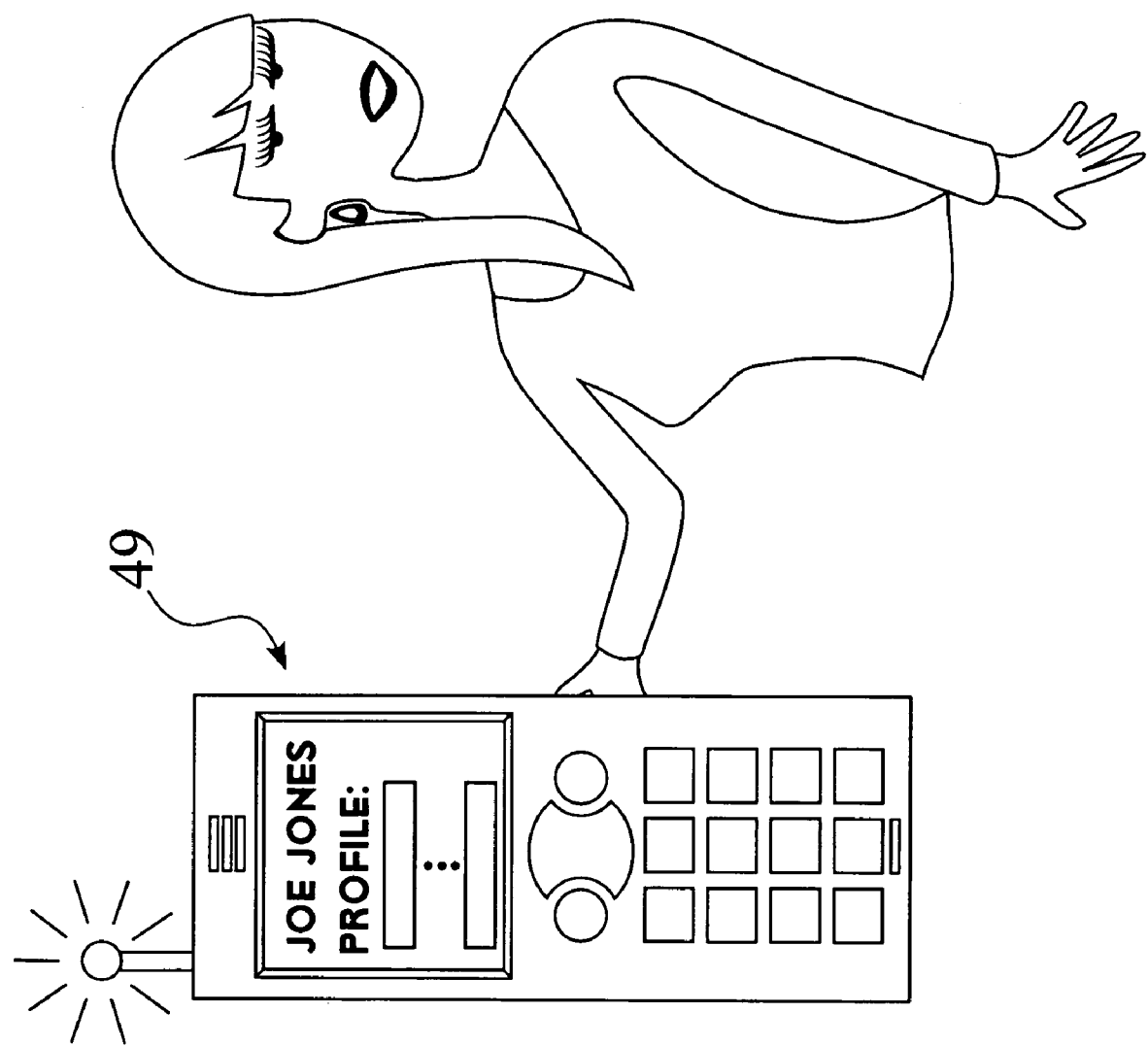
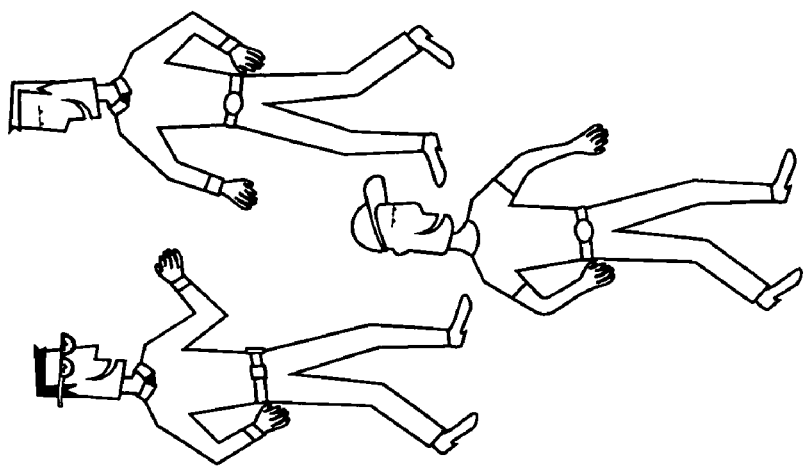
Fig. 29

PERSONAL RADIO LOCATION SYSTEM

CROSS-REFERENCE TO A RELATED U.S. PATENT APPLICATION & CLAIMS FOR PRIORITY

The Present application is a Continuation-in-Part Application, and is related to Parent Application U.S. Ser. No. 11/286,143 which was filed on 23 Nov. 2005 now abandoned; and Parent Application U.S. Ser. No. 11/239,603 which was filed on 28 Sep. 2005 now U.S. Pat. No. 7,969,301. The Applicant claims the benefit of priority in accordance with Sections 119 and/or 120 of Title 35 of the United States Code of Laws for any subject matter which is commonly disclosed in U.S. Ser. No. 11/286,143 and U.S. Ser. No. 11/239,603 and in the Present Application.

INTRODUCTION

The title of this Non-Provisional patent application is Personal Radio Location System. The Applicant is Edward F. Tuck, 2412 East Crescent View Drive, West Covina, Calif. 91791. The Applicant is a Citizen of the United States of America.

FEDERALLY SPONSORED RESEARCH OR DEVELOPMENT

None.

FIELD OF THE INVENTION

The present invention pertains to methods and apparatus for using an electronic device to find a person or system who meets criteria specified by a user and/or to establish mutual compatibility between or among two or more people or systems. More particularly, one preferred embodiment of the invention uses a small radiating device using radio, optical, supersonic or other means that automatically and continuously or periodically emits a signal which interrogates other similar devices. When the user's device finds another person or system whose device returns a signal that matches the user's pre-specified criteria, the user is alerted by a visual and/or audible signal. Alternatively, the other user's or users' device(s) might passively receive the emitted signals and give its user an indication that a criteria-meeting device is within range.

In one embodiment, the invention is combined with a network radio, such as a cellular telephone, to enable communications over a wireless network. These communications may include voice calls, text-messaging, instant messaging, e-mails and Internet browsing.

BACKGROUND OF THE INVENTION

For almost all of their existence as a separate species, humans have lived in relatively isolated groups ("hunting-gathering camps") of ten to forty people. See Tuck, Edward F. and Earle, Timothy "Why CEOs Succeed and Why They Fail," published in *Strategy and Business*, Issue 5 (Fourth Quarter 1996). The group behaviors of humans, and their bodies and senses, have evolved to fit this manner of living.

All animals, including insects and bacteria, and many plants, have some means of communicating with others of their species. The most common means use the chemical senses: taste and smell. Some of the substances that activate these senses for information transfer are called pheromones.

Pheromones are defined in the *Merriam-Webster Office Dictionary* as "a chemical substance that is produced by an animal and serves especially as a stimulus to other individuals of the same species for one or more behavioral responses."

Some pheromones are sexual attractants. However, mammals, including humans, use odors other than pheromones to provide far more detailed information. Researchers found in 1982 that some mammals select their mates on the basis of a complementary Major Histocompatibility Complex (MHC) defined in the Merriam-Webster Office Dictionary as: "A group of genes in mammals that function especially in determining the Histocompatibility antigens found on cell surfaces." The MHC contributes to the mammal's personal smell and uniquely identifies it, as well as carrying information on the mammal's immune system. Mate selection based on complementary MHC maximizes their offspring's number of immune system responses, making for more disease-resistant, thus fitter, offspring; and, because mammals with different MHCs are not closely related, selection based on these criteria also avoids the hazards of consanguinity, which amplifies genetic defects. This is analogous to the human taboo against marrying one's close relatives.

For the original work on MHC mate selection among mammals, see Boyse E A et al., "Chemosensory Communication—A New Aspect of the Major Histocompatibility Complex and Other Genes in the Mouse," Journal of Oncodevelopmental Biology and Medicine, Vol. 4 No 1-2: pages 101-116, 1982. Later work, in 1995, showed that women also select their preferred mates on this basis, but because of humans' relatively poor sense of smell, this selection must be done at very close range. See Wedekind C., et al., "MHC-Dependent Mate Preferences in Humans," Proceedings of the Royal Society B, 260, pages 245-249, 1995.

Odors carrying information on MHC are produced in the skin or passed along in breath or urine. The sense of smell in free-ranging mammals is exquisitely sensitive and complex: it can identify a range of odors far greater than that needed to avoid danger and seek food. The major use of this enhanced sense is to detect and understand pheromones and to analyze the MHCs of others of its own species. To understand the profound importance of smell one must know that the first organ to evolve after the spinal cord was the olfactory bulb at its end. The rest of a chordate's brain evolved from this base (vertebrates, including mammals, are among the members of the phylum Chordata).

Unlike most mammals, humans and some apes have poor senses of smell. They have retained their ability to detect and analyze MHC; however, these odors can be detected and analyzed only at very close range. Our impaired sense of smell may be the result of the natural selection that took place in three million years of living in small camps (as discussed above), because it was no longer needed (women do not have an estrus cycle like most mammals. They are always receptive, and thus have no need to signal their receptiveness. Degrees of consanguinity are public information in a small group. Camp dwellers usually find their mates in neighboring camps, which provides genetic separation. Because they are usually in sight of one another, camp dwellers have no need for odors to advertise their gender, pregnancy, age, state of health and other visible features; humans in committed relationships usually adorn themselves with special marks, such as wedding rings, tattoos, hair length and special clothing; information on mood, such as fear, is easy to gain from the context of a person's actions.)

In addition, pheromones in particular may have been detrimental to the fitness of the camp (constant reminders of sex are distracting and lead to jealousy and strife, which is deadly in a confined group; animals with strong odors are at more risk of predation.)

Between 10,000 and 100,000 years ago, depending on the society, most hunting-gathering camps combined into either pastoral or agricultural tribes. Tribes are much larger groups, and bring two new metrics: social rank and wealth. In human society, which by then relied almost entirely on visual cues, clothes, posture, jewelry, tattoos and scarification were used as markers for these metrics. There was still no need for "long-distance" pheromones or long-range MI-IC analysis, because in a typical tribe of a few hundred people, everyone was seen by everyone else over a reasonable period of time.

In summary, identifying odors generated by the MI-IC, and behavior-modifying odors such as pheromones evolved and became of vital importance in mammals that were solitary or which lived in closely-related family groups. Pheromones became less important, and finally counterproductive, in species that tended to aggregate themselves in clumps of up to a few hundred individuals. In human societies the ability to detect and discriminate among those odors at a distance was essentially lost (and in some cultures the odors themselves are often intentionally suppressed, as with perfume and frequent bathing) and were replaced by their visual equivalents, some or which were eventually suppressed by clothing.

Modern urban society is radically different from life in a tribe or hunting-gathering camp, especially for singles. In 2005, over 30% of the households in the United States are inhabited by "single" people: unmarried people, married people living apart from their spouses, and single-parent households with small children. Specifically, in the year 2000, the United States had a population of 281 million, of which 224 million, or about 80%, lived in cities or metropolitan area of 100,000 or more people. These people lived in 105 million households, of which 33 million, or 31%, were non-family households (up from 26% in 1980), and 27 million, or 26%, were one-person households (up from 23% in 1980). See U.S. Census Bureau, *Statistical Abstract of the United States:* 2001, (121st edition) Washington, D.C. 2001.

Unlike his or her ancestors in a tribe or camp, the average person in the United States is now a member of a free-ranging species, and, because he is ill-equipped for that role, has a very poor chance of meeting a compatible stranger, either for friendship or matrimony, without exposure to embarrassment or danger. The traditional mechanisms for singles to meet are attendance at churches and bars; in the first case, it is considered bad form to "go shopping" from church to church, and in the second, there is very little protection against predators and chemically impaired judgment, and no mechanism to filter the compatible from the incompatible.

Note that while this analysis is, for simplicity's sake, cast in terms of singles seeking singles, it is recognized that in urban areas, families which would like to establish social contact with other families suffer an even greater disadvantage because of their lower mobility and more complex selection criteria. In addition, purely inanimate objects, such as cranes and containers in a shipyard, can benefit from a mechanism that establishes mutual compatibility on a peer-to-peer level, without intervention of clerks or computers.

Many individuals have difficulty finding a mate. According to eHarmony, 21 million Americans spent $313 million dollars last year on Internet dating services. There are many other services similar to eHarmony.com, such as Match.com in the United States and Soulmates in the United Kingdom.

These are efficient, profitable and useful services. They not only find and filter acquaintance candidates, but also provide a sanctioned (though virtual) arena, like a church or small private party, in which strangers can meet without danger or embarrassment. They have the disadvantage of being cumbersome, time-consuming, and involving an elaborate contact ritual designed to avoid disappointment, embarrassment and danger; and the element of spontaneity, in which the best decisions are often made, is missing. See Gladwell, Malcolm, *Blink: The Power of Thinking Without Thinking*, Little, Brown & Co., 2005.

There is also the disadvantage that online selection does not correspond well to the selection process that takes place in real-life acquaintance scenarios. Recent studies involving "Instant Dating" tests have shown that physical appearance is by far the most important consideration in the early stages of acquaintance. This is true for both genders (though more so for men). Therefore, an acquaintance process that does not quickly include face-to-face contact is somewhat artificial.

Since it does not appear that natural pheromones and odors are greatly effective in helping men and women find each other, it would be extremely helpful if some type of man-made device could help enable people to find friends or mates based on specific criteria, retaining some of the precision and safety of the online dating sites, while maintaining the efficiency and naturalness of the church and the bar. It would also help to avoid some of the abusive and demeaning behavior now invading the dating process. See Netburn, Deborah, "Danger: Pickup Artists Ahead," *Los Angeles Times*, Wednesday, Aug. 10, 2005, p. E1.

The development of such a device or system would constitute a major technological advance, and would satisfy long-felt needs and aspirations of the Internet dating industry and of Humanity in general.

SUMMARY OF THE INVENTION

The present invention provides a simple miniaturized electronic device that enables individuals to find a friend, a mate or someone with a specific interest or skill. In one embodiment of the invention, a man or a woman may program a MateFinder™ to help find an ideal match. In one particular embodiment, the MateFinder™ comprises a radio and a microprocessor with a non-volatile memory, such as a static RAM. Information that describes both the user and the ideal match can be written to the non-volatile memory. The radio automatically and periodically broadcasts a "seeking signal" over a short range. When the seeking signal is received by another MateFinder™, it is analyzed to determine the degree of correlation with the receiver's preferences. If the degree of correlation exceeds a preset minimum, the sender, the receiver, or both are alerted.

Another embodiment combines the MateFinder with a network radio, such as a cellular telephone or some other suitable device to provide communications over a wireless network. This combination enables voice calls, text-messaging, instant messaging, e-mails and Internet browsing.

An appreciation of the other aims and objectives of the present invention, and a more complete and comprehensive understanding of this invention, may be obtained by studying the following description of preferred and alternative embodiments, and by referring to the accompanying drawings.

A BRIEF DESCRIPTION OF THE DRAWINGS

FIG. 1 offers a view of men and women attending a party. The man has a MateFinder™ clipped to his belt. Some of the women at the party have a MateFinder™ clipped to a purse or belt, or concealed in her clothing. The man's MateFinder™ produces a short-range radio signal that interrogates other MateFinders™ that are nearby. The interrogation signal may broadcast a description of the man and seeks another MateFinder™ that stores a list of qualities, characteristics or criteria that describe the gentleman's aspirations, preferences or requirements in a mate. When the interrogation signal finds a good match, the man is alerted by a visual or audible alert. If the man's own attributes match those sought by one of the women, the MateFinder™ may alert her to the presence of the man.

FIG. 2 supplies a perspective view of one particular embodiment of the invention, which may be clipped to a man's belt or to a lady's purse, or which may be concealed in the clothing of either. The MateFinder may also be incorporated into a bracelet, watch, necklace, tietack, shoe, hat or some other fashionable item or article.

Figure 6:
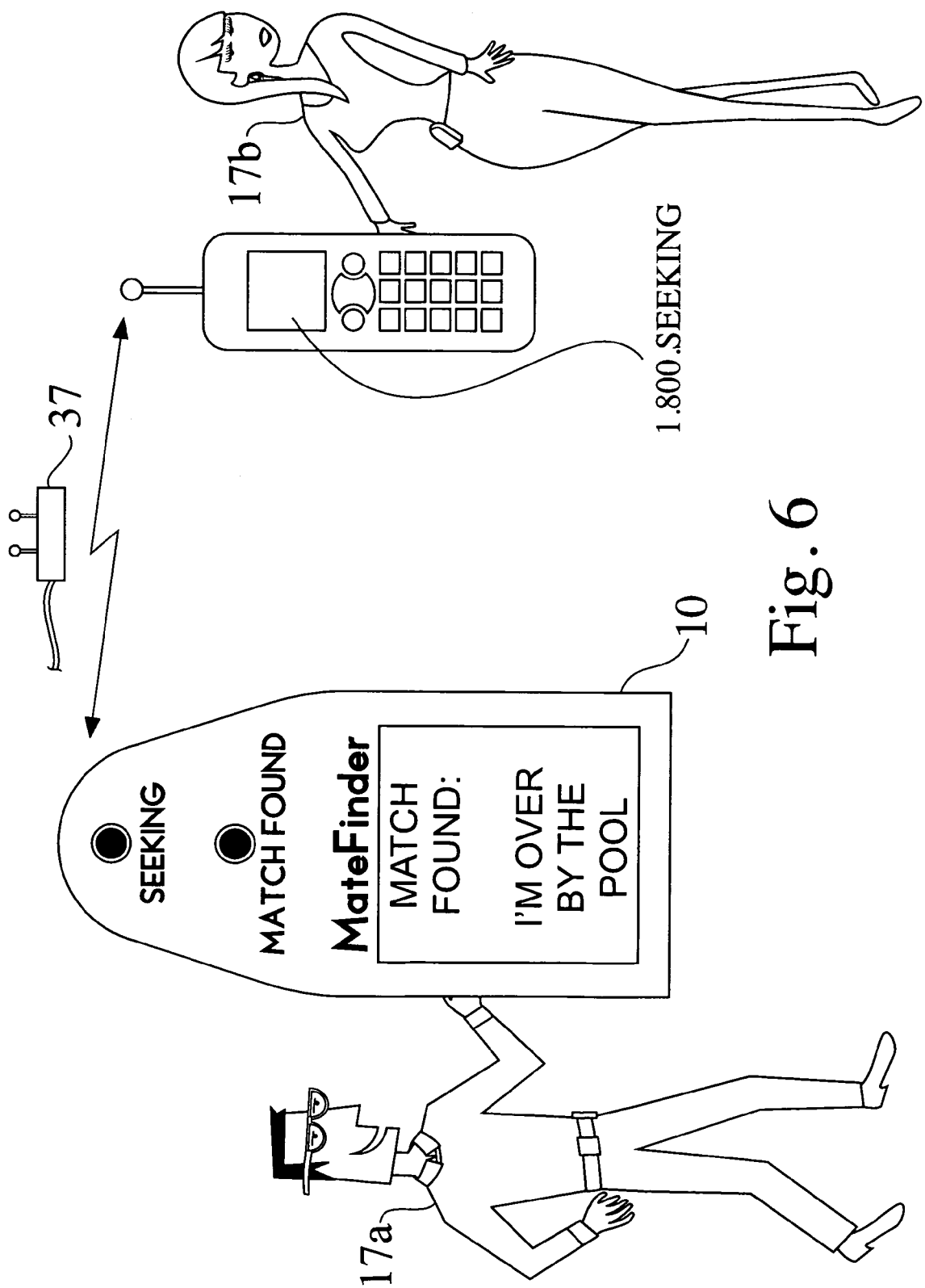

FIG. 6 exhibits the operation of a pair of MateFinders™. When the man's device finds a woman's MateFinder™ that presents a good match, his device alerts him. In an alternative embodiment, the woman may respond by using her cellular telephone to send a message back to her prospective match, or by using a text-message feature of her MateFinder™.

Figure 7:
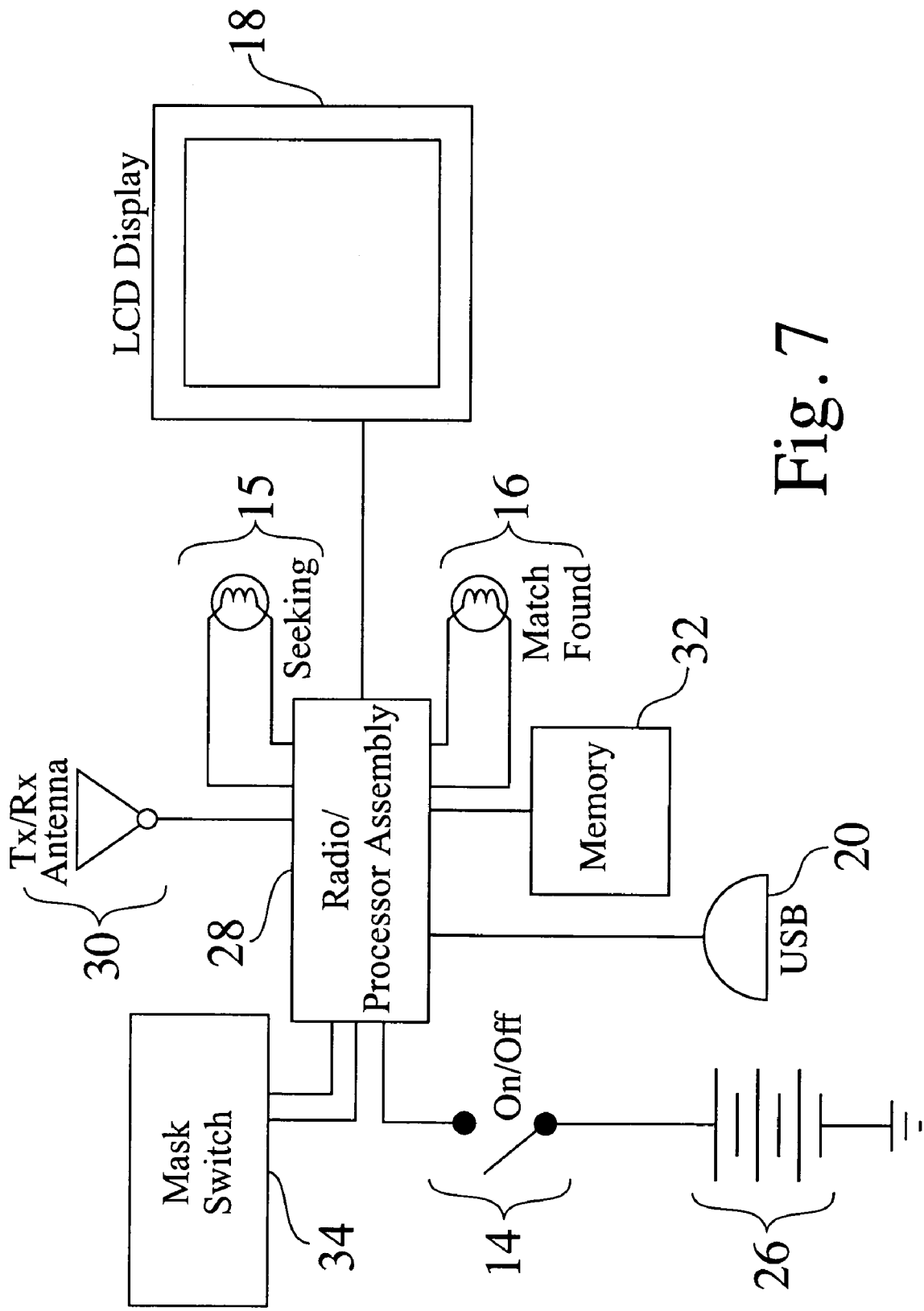

FIG. 7 is a simplified schematic diagram of one embodiment of the present invention.

Figure 8:
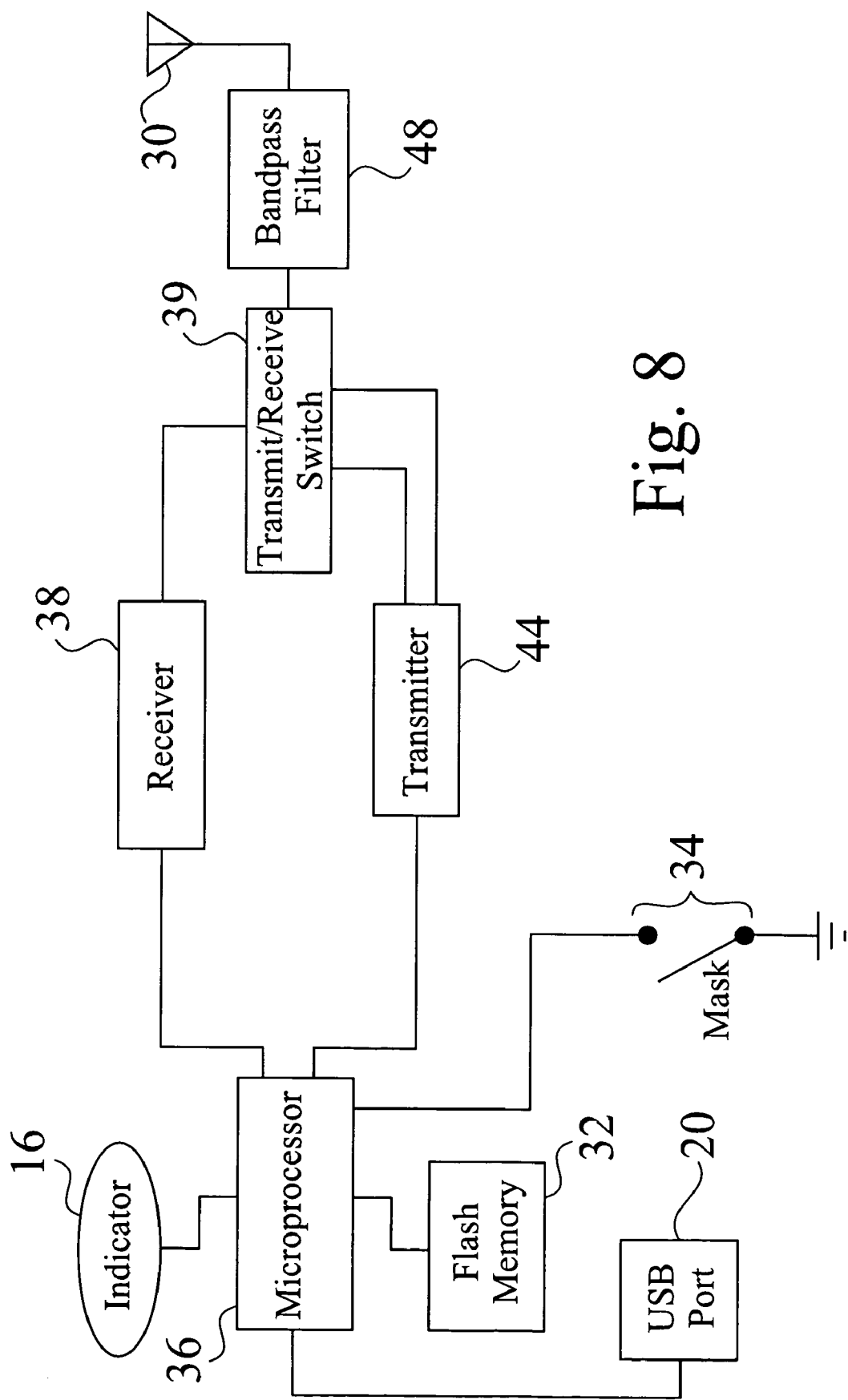

FIG. 8 is a more detailed schematic diagram which exhibits a particular implementation of the present invention.

Figure 9:
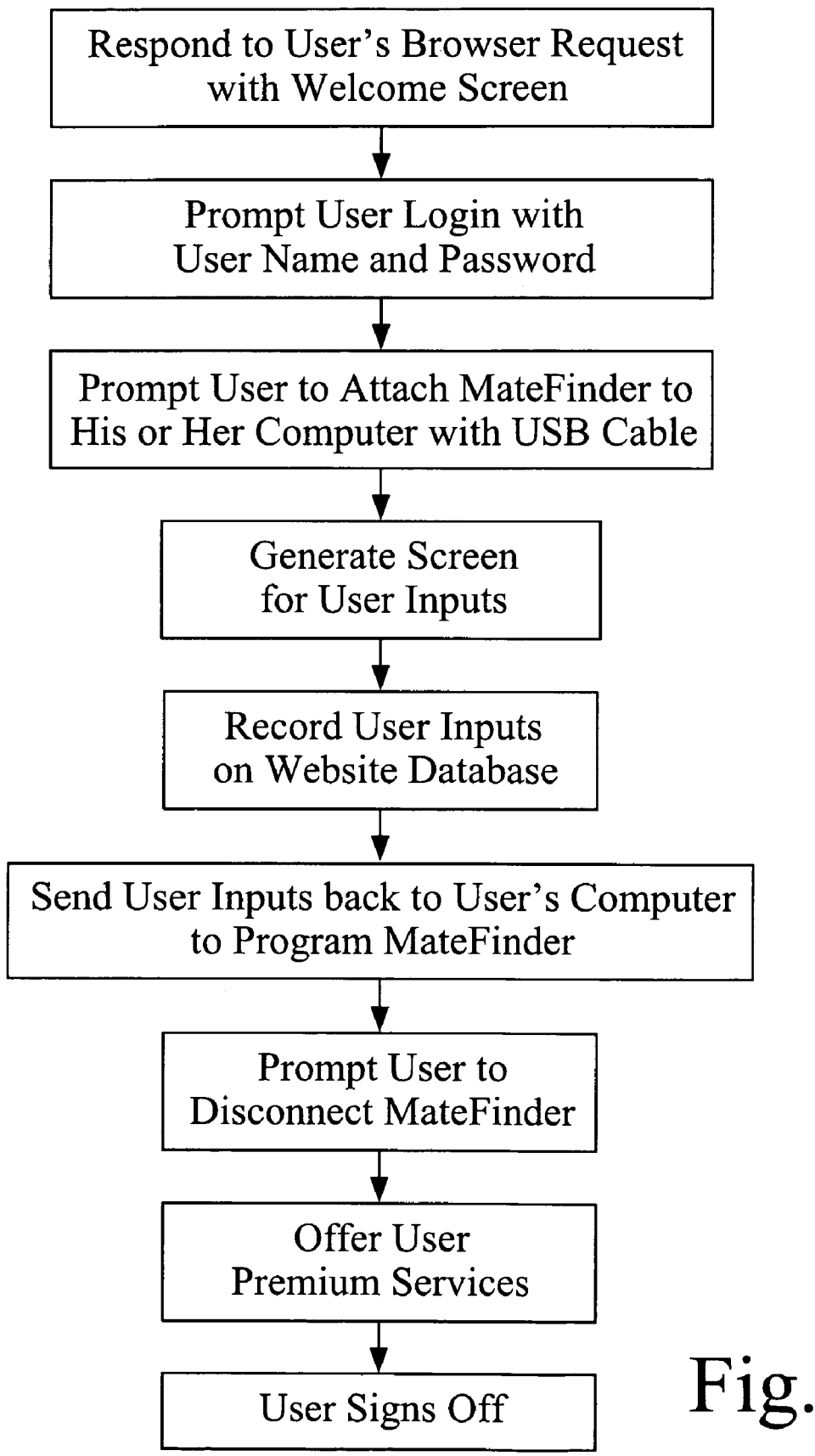

FIG. 9 is a flow-chart that outlines a basic design for a software program that may be utilized in one embodiment of the invention.

FIGS. 10, 11, 12, 13, 14, 15, 16, 17, 18 and 19 summarize several implementations and applications of the basic embodiments of the present invention.

Figure 20:
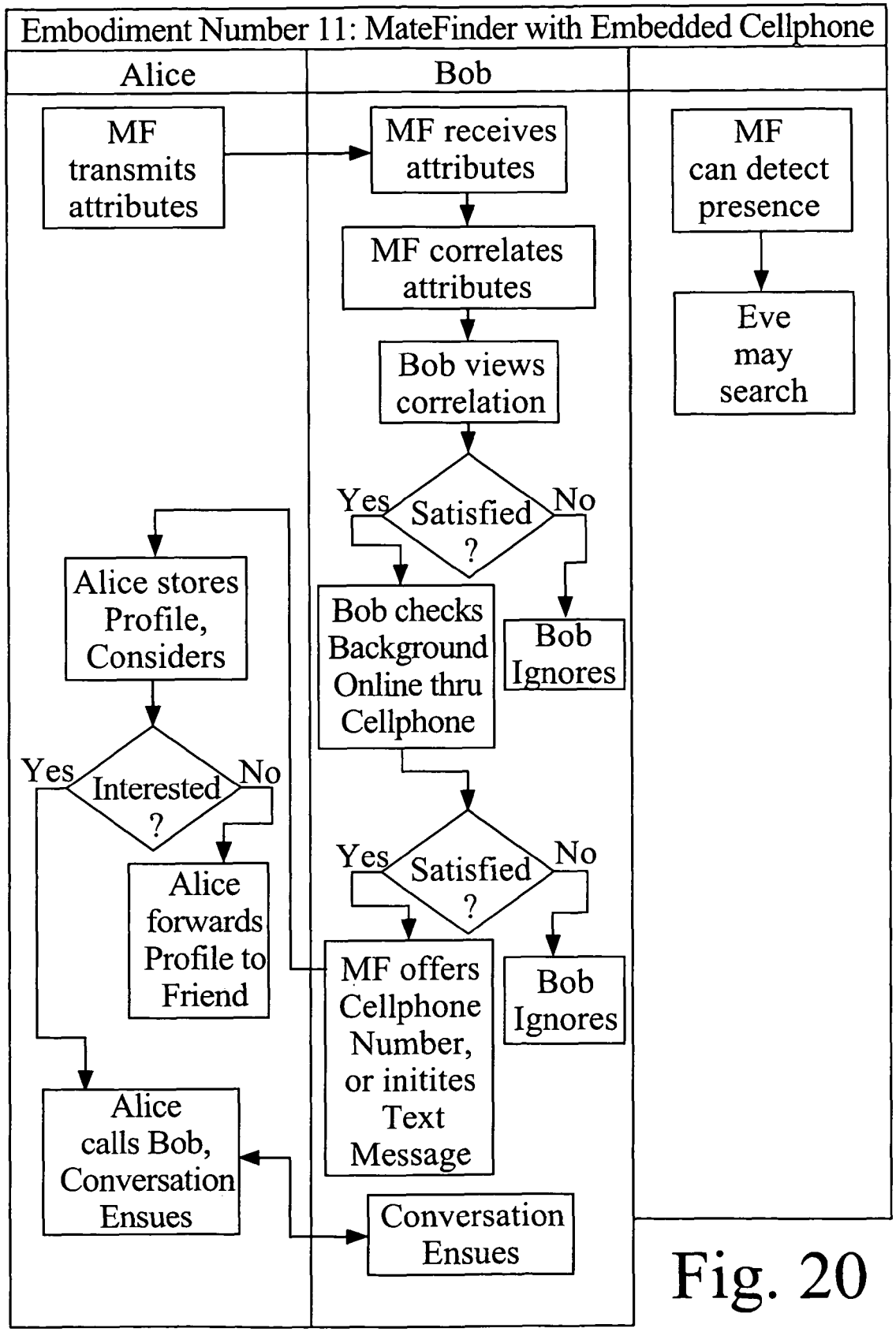
Figure 21:
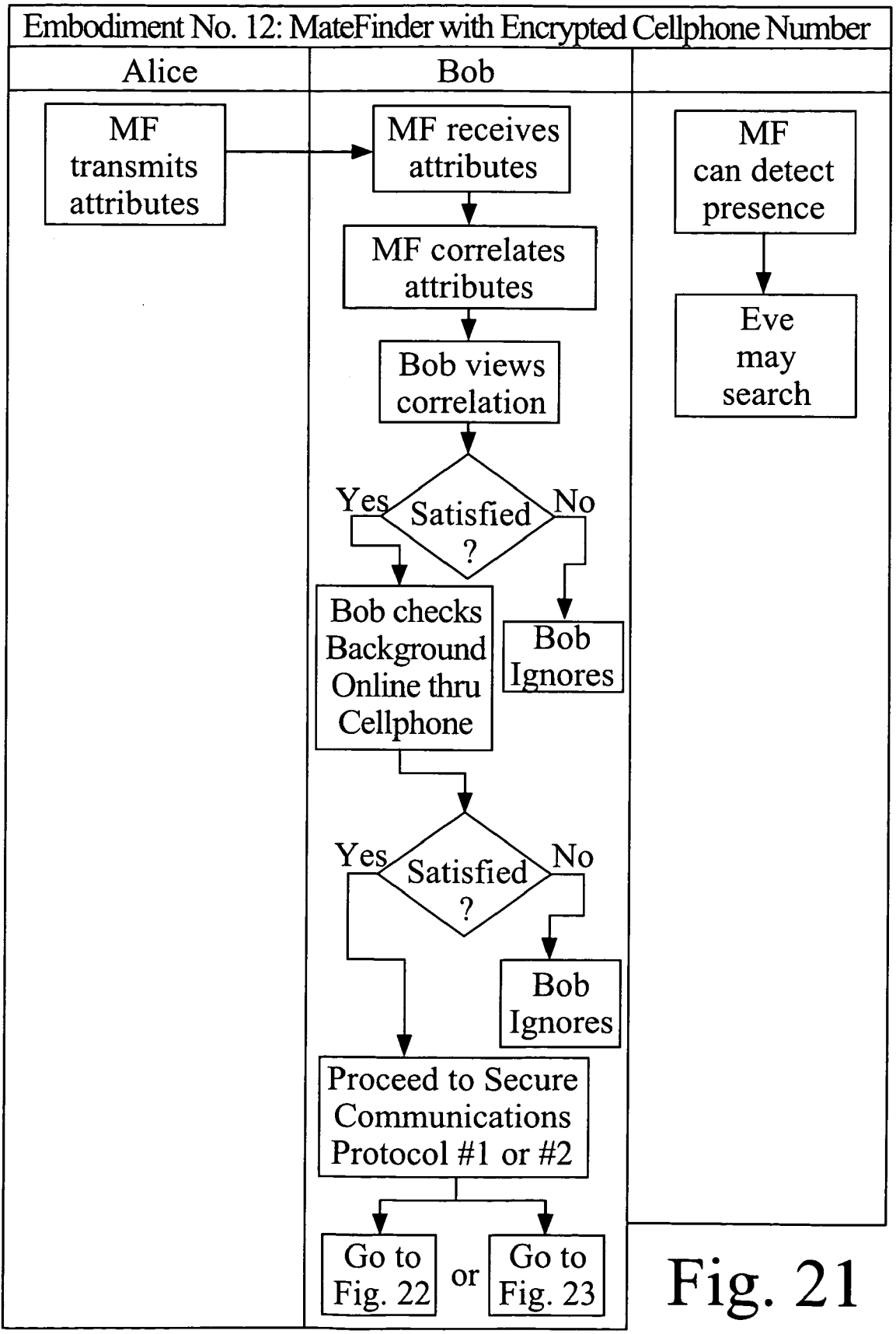

FIGS. 20 and 21 summarize various implementations of the MateFinder when it is combined with a network radio to communicate over a wireless network.

Figure 22:
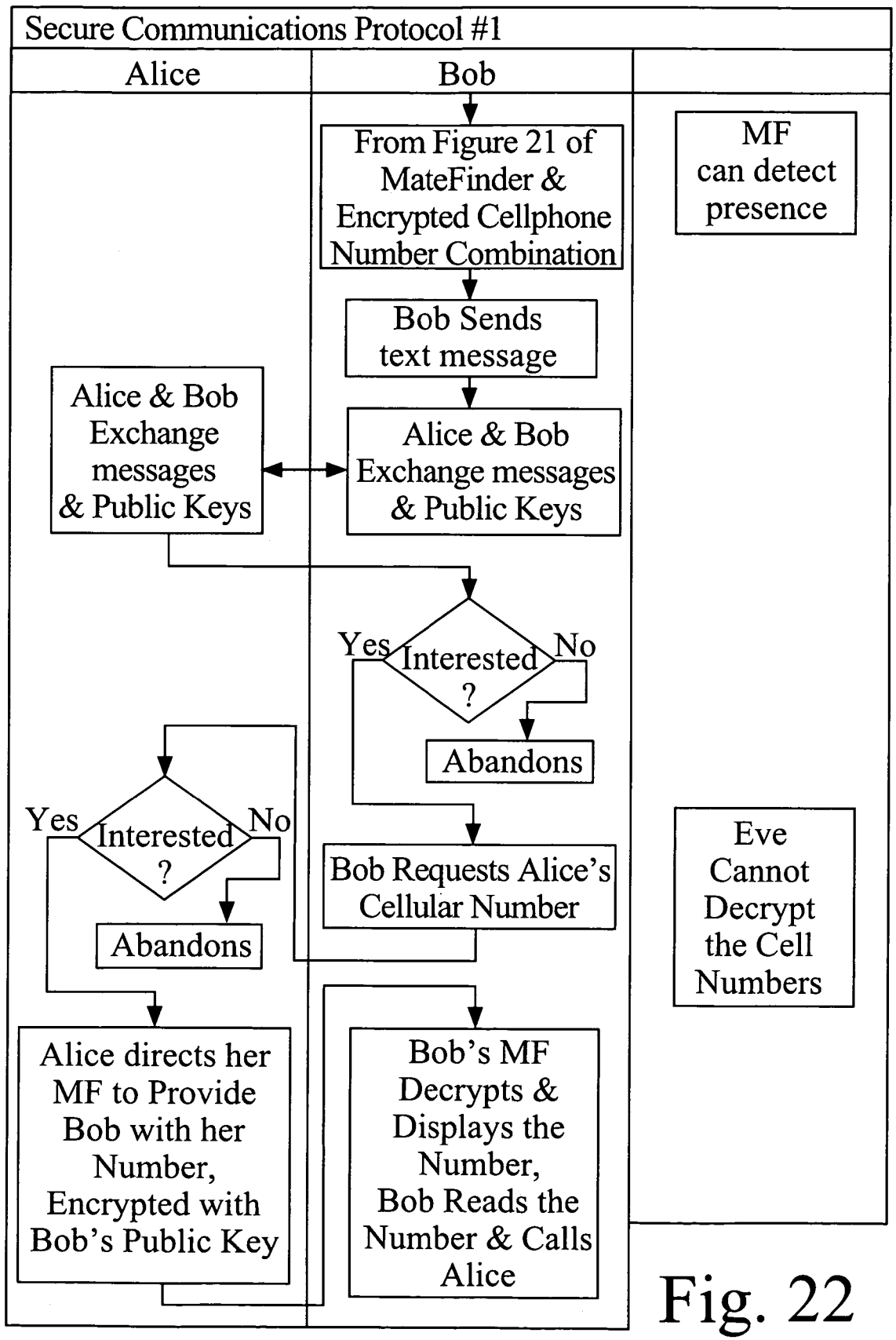
Figure 23:
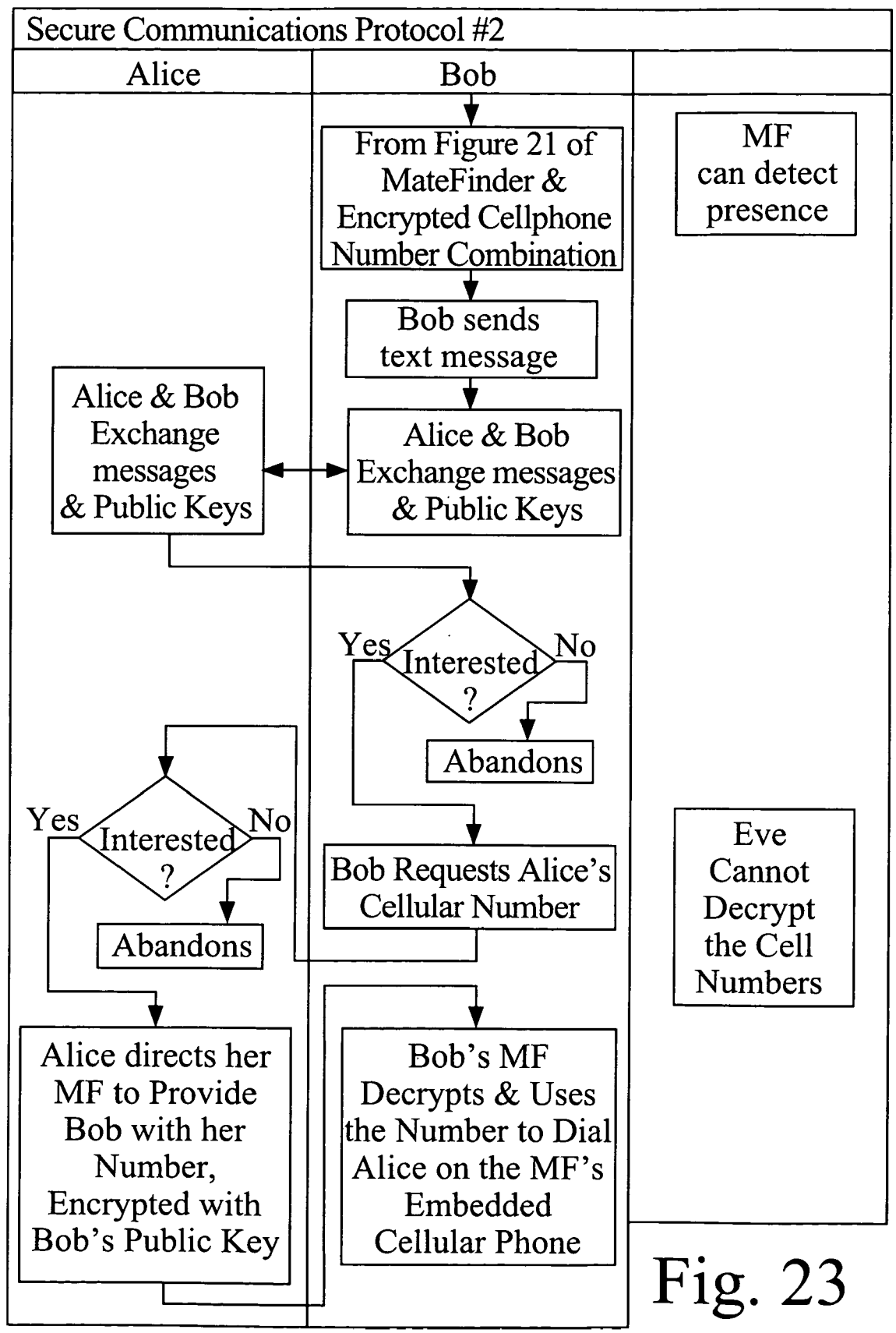

FIGS. 22 and 23 depict secure communications protocol embodiments for the MateFinder Cell Phone shown in FIG. 21.

Figure 24:
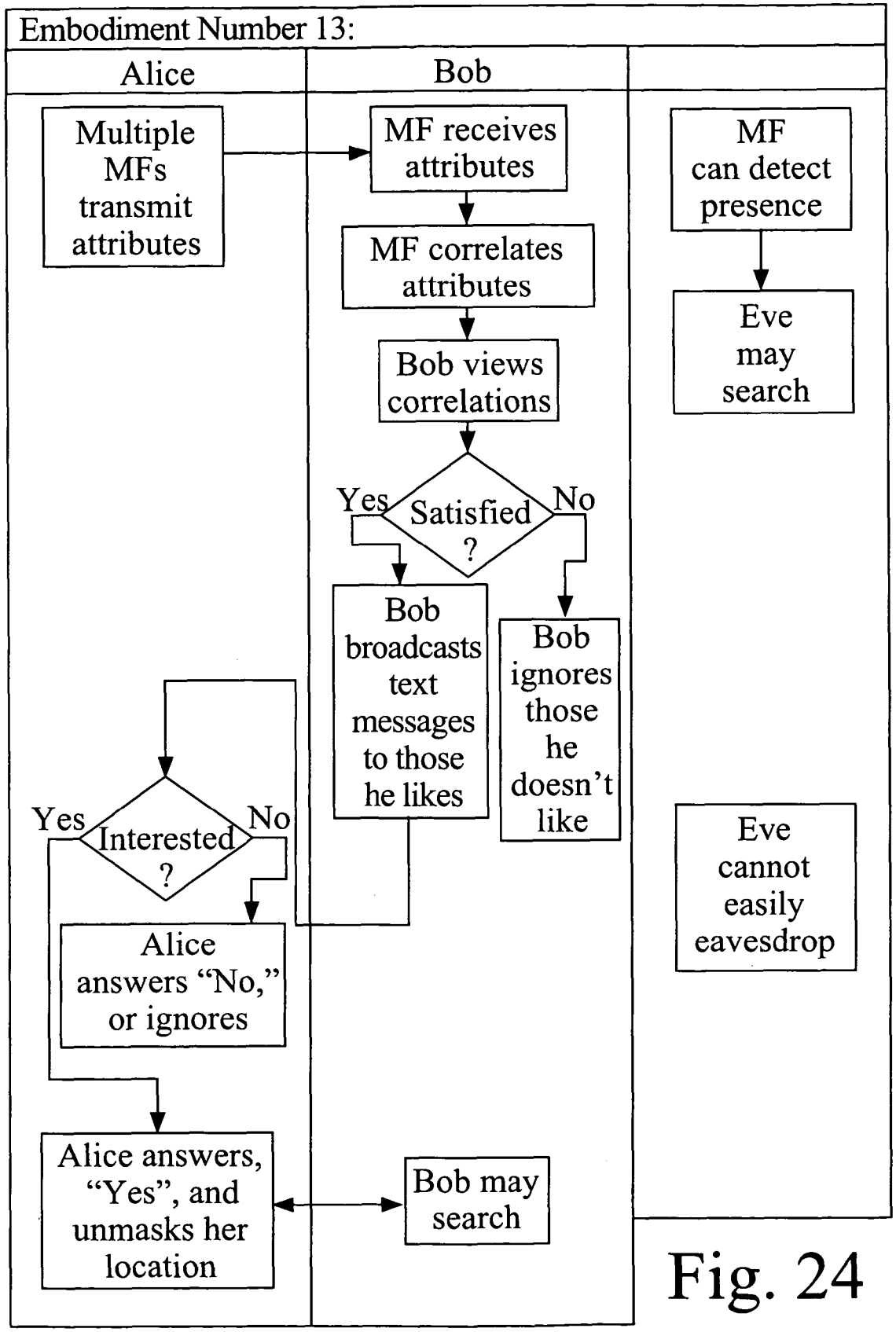
Figure 25:
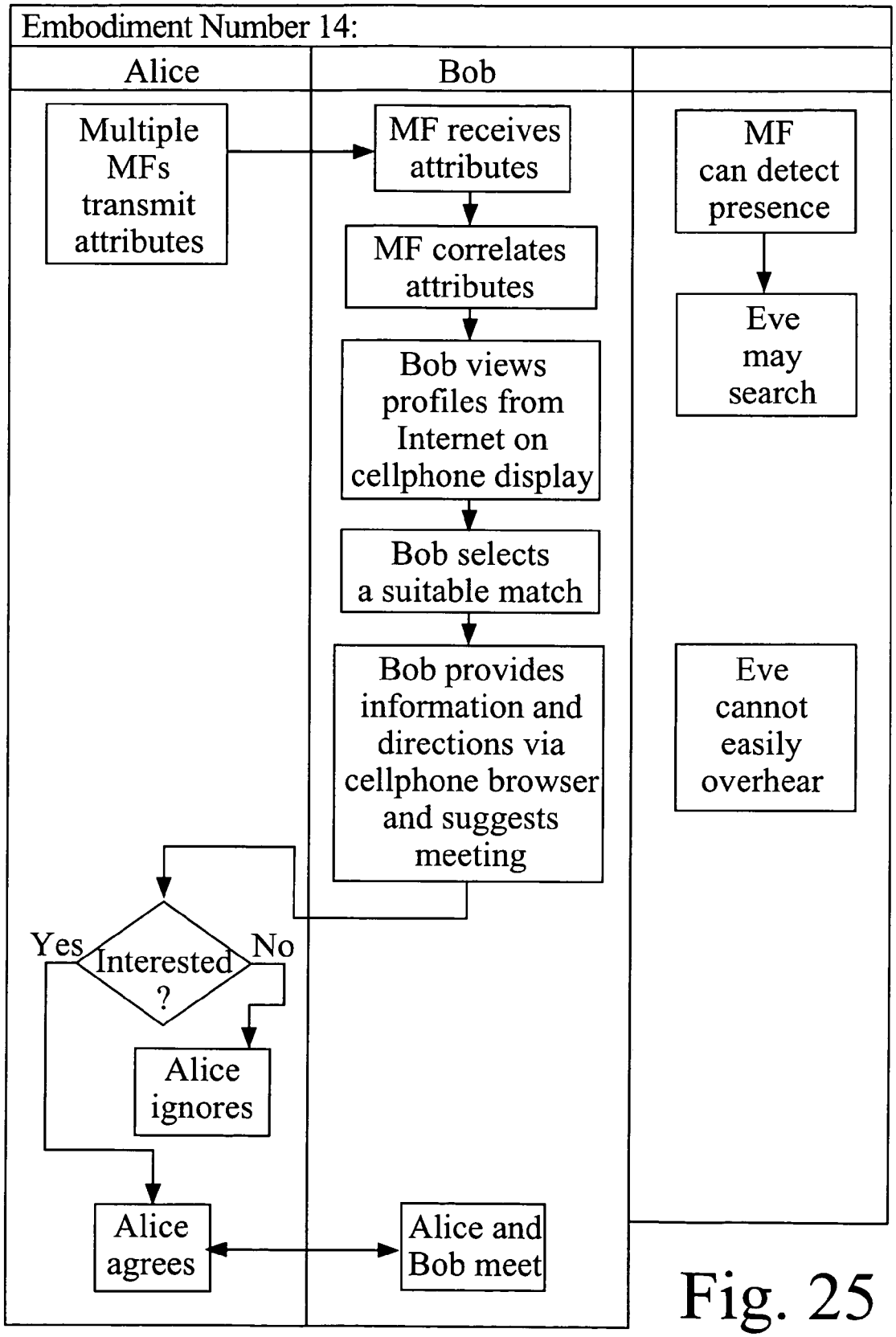

FIGS. 24 and 25 show alternate implementations of a MateFinder combined with a network radio.

Figure 26:
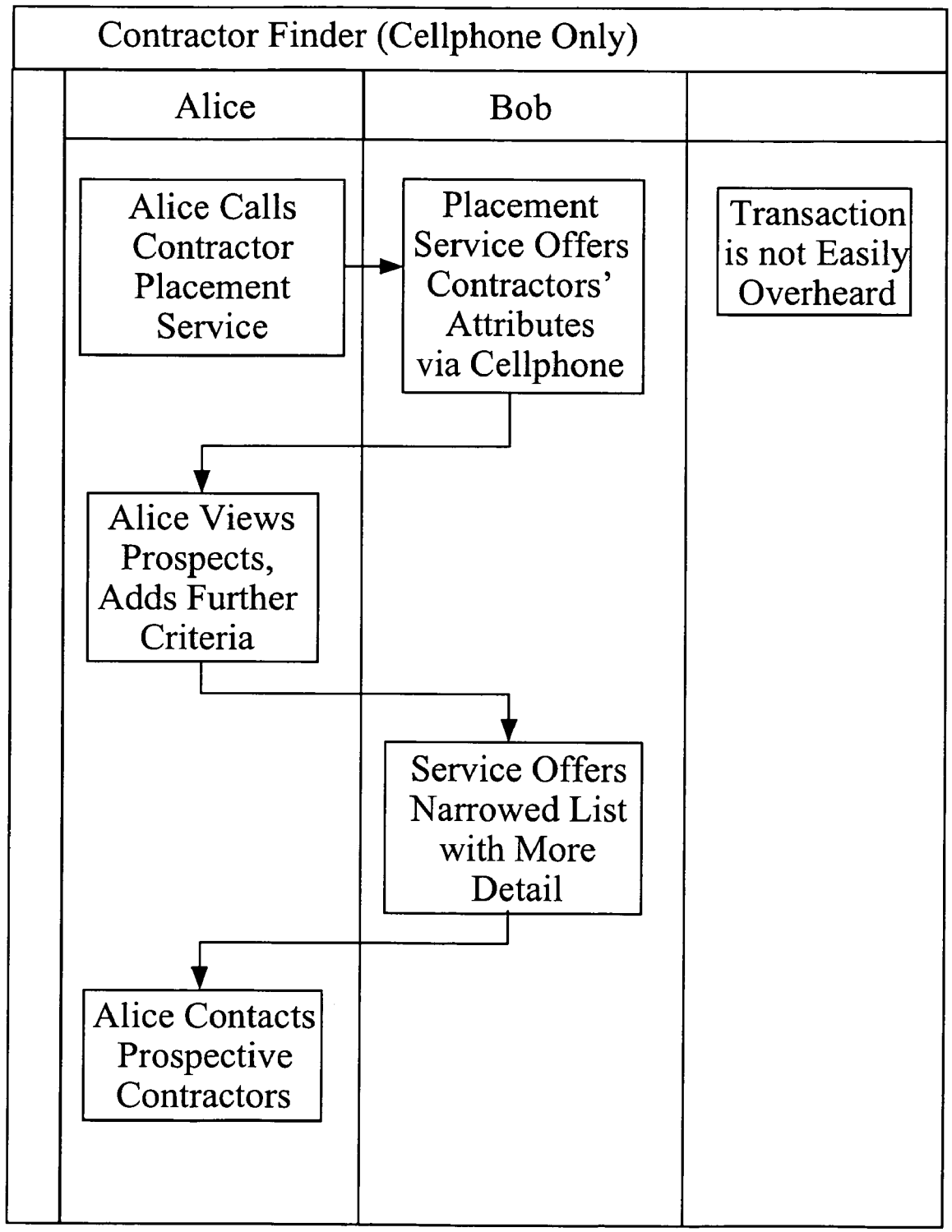
Figure 27:
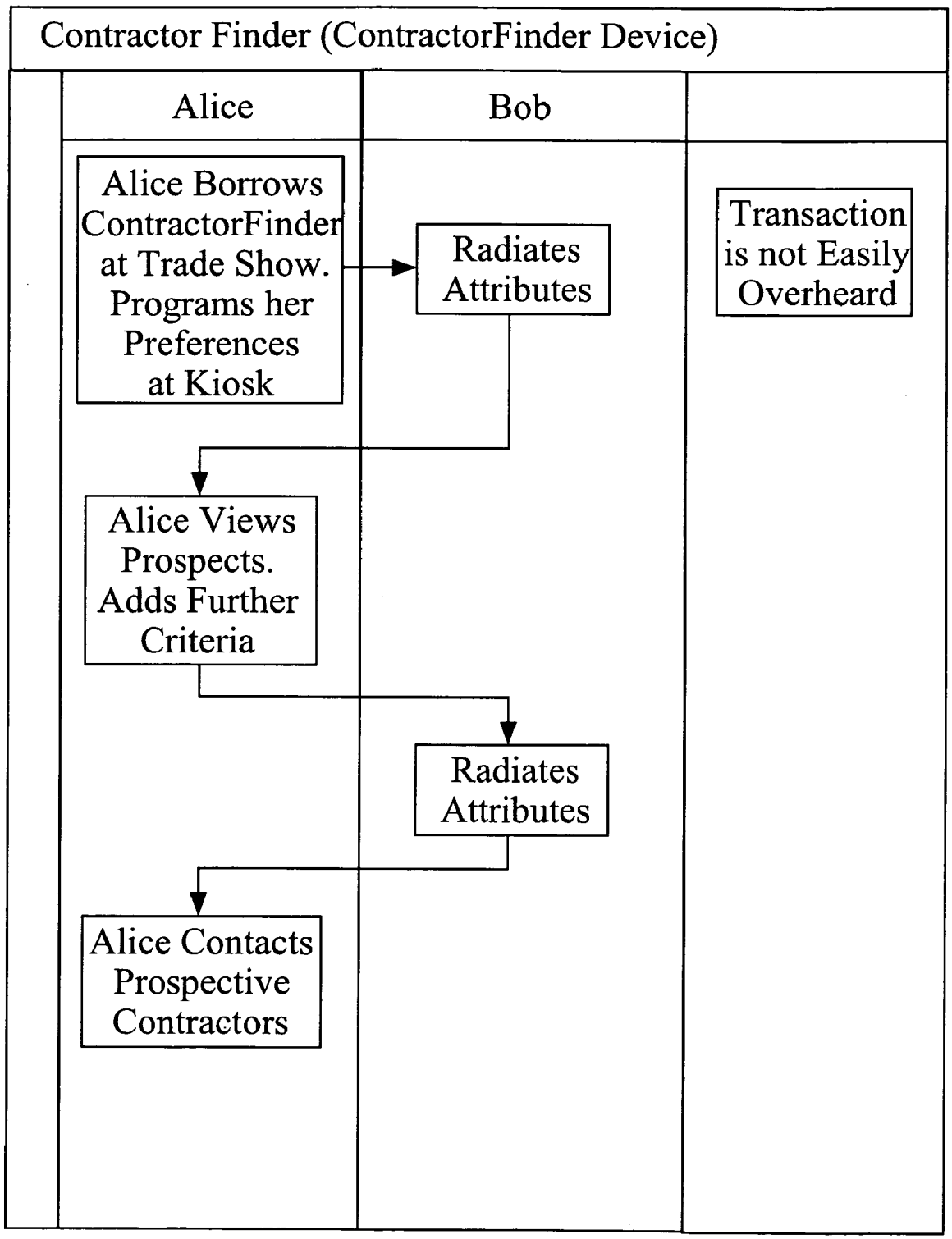

FIGS. 26 and 27 illustrate the uses and functions of an alternative embodiment of the invention—the ContractorFinder™.

Figure 28:
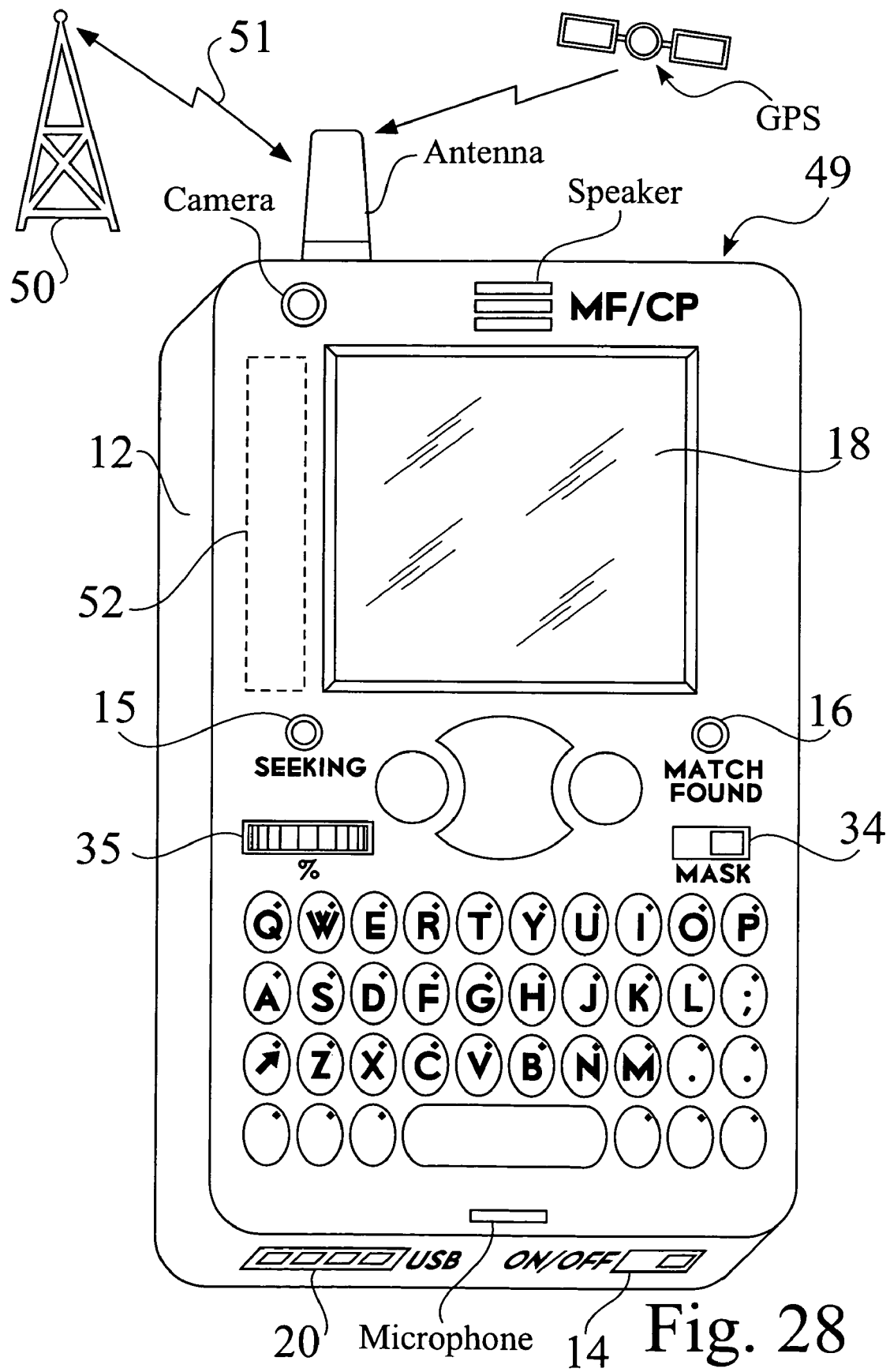

FIG. 28 is a close-up view of one embodiment of a MateFinder with Cellular Telephone combination.

FIGS. 29, 30, 31, 32, 33 and 34 illustrate the process of finding a match using a MateFinder/Cell Phone.

FIGS. 35, 36, 37 and 38 illustrate an application for the ContractorFinder™.

FIGS. 39, 40, 41, 42 and 43 portray the use of another embodiment of the invention—the MateFinder with Direction & Range Finder™.

FIGS. 44, 45, 46, 47 and 48 depict the use of yet another embodiment of the invention—the MateFinder with Network-Pushed Attributes™.

A DETAILED DESCRIPTION OF PREFERRED & ALTERNATIVE EMBODIMENTS

I. A Preferred Embodiment of the Invention

The present invention comprises methods and apparatus for finding someone or something with specific attributes using a radio device. In one embodiment of the invention, a MateFinder™ 10, which resembles a pager, may be used by a man or a woman to find a match.

Figure 1:
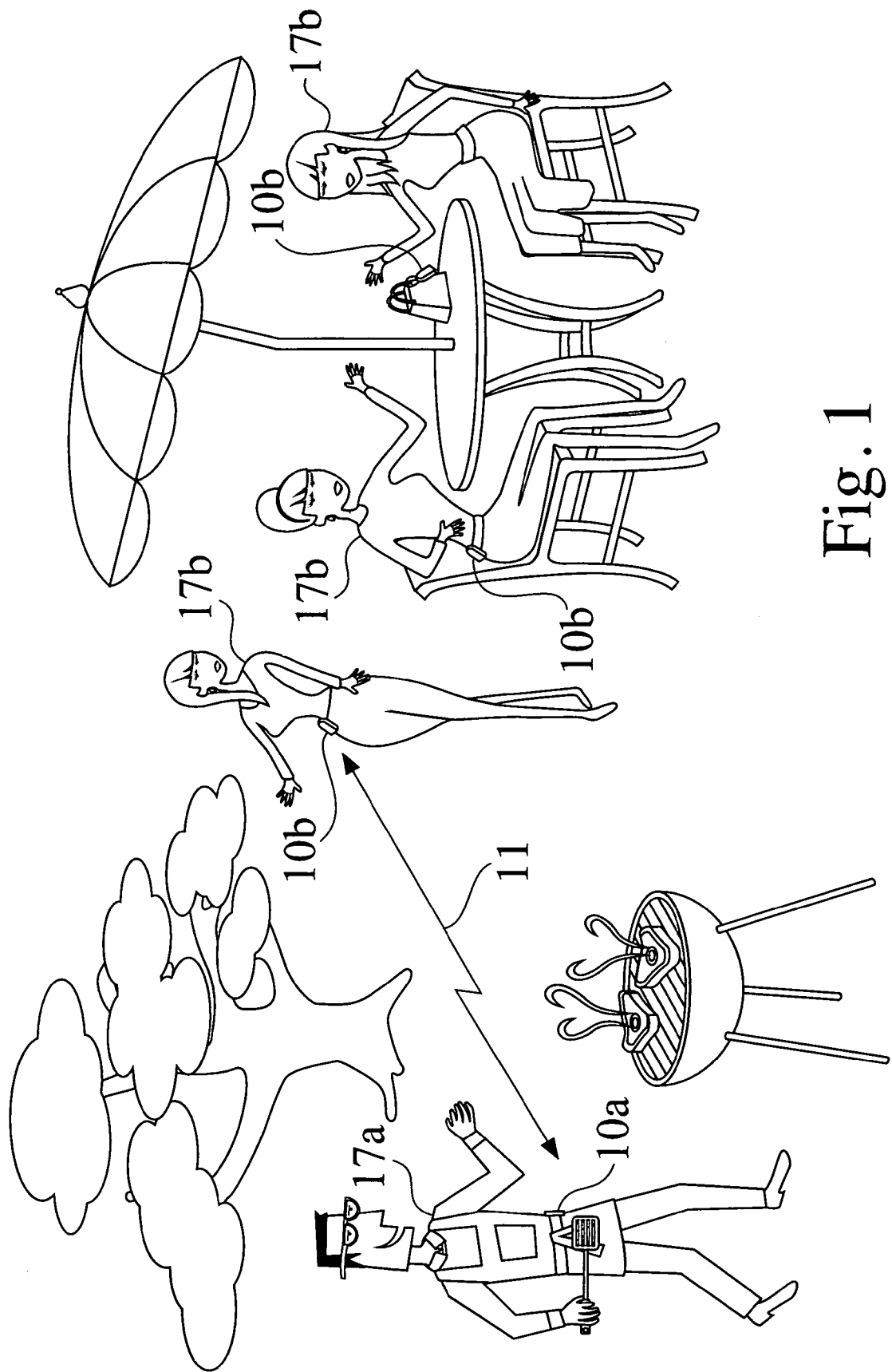

FIG. 1 is a representation of a private party. One of the hopes of some of the men and women who attend the party is that of finding a friend or a mate. In accordance with one embodiment of the present invention, a man 17a is shown wearing a MateFinder™ 10a clipped to his belt. A group of women 17b standing around or sitting at a table also have MateFinders 10b, which are clipped to their belts or purses or are concealed in their clothing. In general, the MateFinder™ 10 is an electronic device which uses a radio to help find someone or something which fits a predetermined description or some preselected criteria. In this Specification and in the Claims that follow, the MateFinders 10 are generally identified as 10a when used by a man or an unspecified "first user" 17a, and as 10b when used by a woman or unspecified "second user" 17b. The use of the reference characters ending in "a" and "b", which are also recited in the Claims as the "first" and "second" transceivers, 10a and 10b, are intended to assist the reader in understanding the invention, but do not connote any substantive differences in the device 10.

The man's MateFinder™ 10a continuously emits an automatic and generally continuous radio seeking or interrogation signal 11. This signal 11 illuminates or interrogates other MateFinder radios that are within range. The man 17a has programmed his MateFinder 10a with a set of attributes that describes himself, and this information is conveyed by the signal 11 emitted by his MateFinder. This signal 11 may also convey a description of the woman that he is interested in finding. If the man's MateFinder signal finds a woman who fits his preselected set of criteria, his MateFinder issues a visual and/or audible alert. If the man's MateFinder signal contains a description that matches the woman's predetermined description of a suitable man; the woman's MateFinder alerts her to his presence. The location and/or identity of each person carrying the MateFinder is not initially available to the users. For example, in one possible use, exemplars of the device would be worn (possibly concealed) by a number of users attending a large private party or public function. Each user's MateFinder would emit its own interrogation signal, for example, first interrogation signal 11a, and second interrogation signal 11b. Users would be alerted to the presence of compatible types, along with an indication of the degree of correlation found and whether a selected matching signal's position is masked. The user would then have the option of unmasking his or her position to the emitter of a specific signal, possibly by changing the modulation scheme to one that allows its strength to be detected. Users could then approach each other by maximizing their indication of the other's signal strength. It should be possible to see the target person at a safe distance before making further contact. The present invention reduces the risk that is inherent in Internet or other forms of remote or electronic dating by allowing a user to evaluate a prospective match in person before initiating contact. Some of the embodiments may also enhance the user's privacy, because his or her personal data are not sent to a website or other third party.

Figure 2:
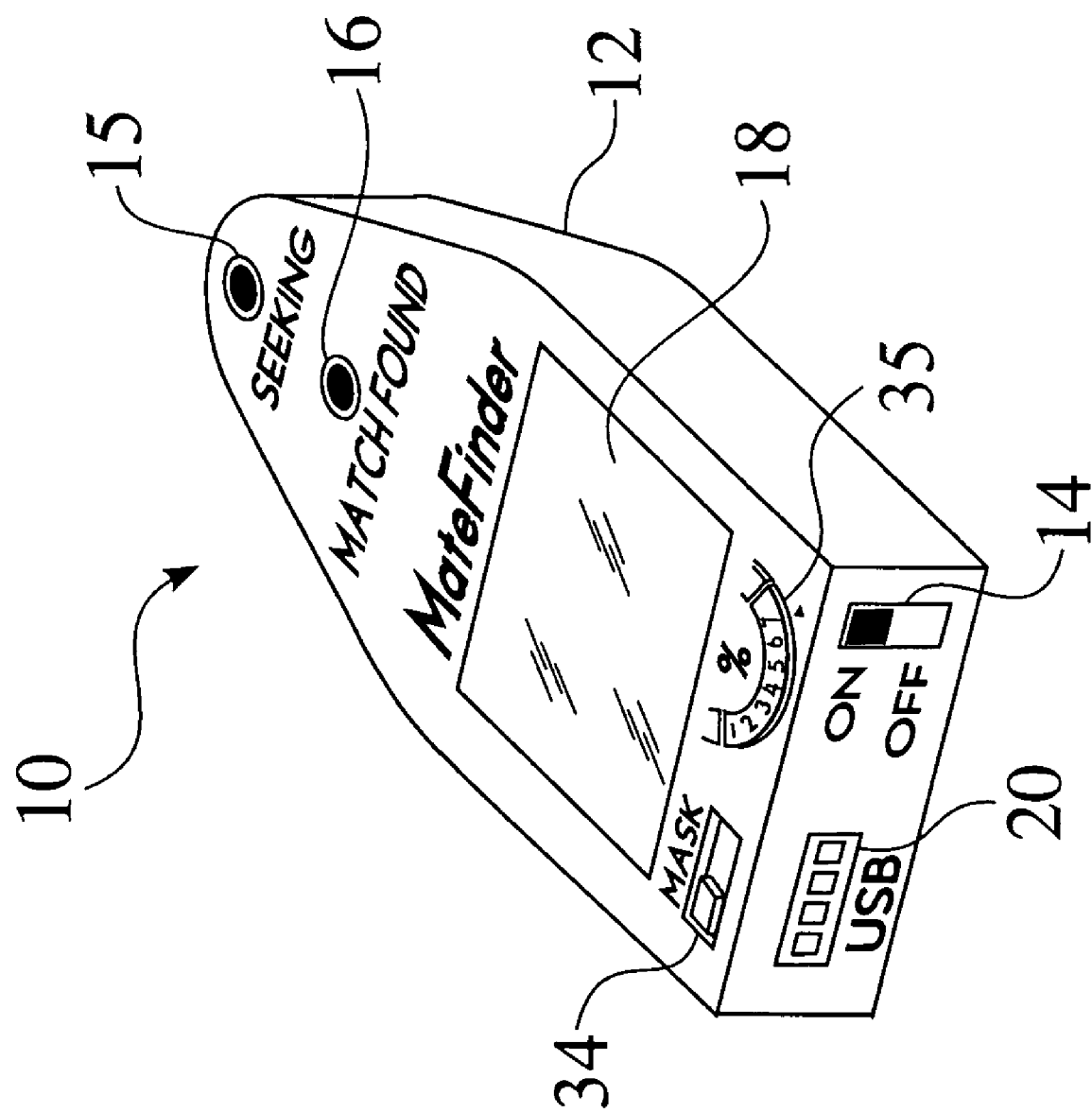

FIG. 2 furnishes a perspective view of one embodiment of the MateFinder device 10. A housing 12 made of plastic or some other suitable material encloses a radio (not shown in FIG. 2). A power switch 14 is located on the base of the housing 12. When the power switch 14 is turned to the "ON" position, an LED 15 labeled "SEEKING" flashes periodically to indicate that the MateFinder™ 10 is emitting a signal. When the MateFinder™ finds a match, an LED 16 labeled "MATCH FOUND" is illuminated. The illumination of the "MATCH FOUND" LED 16 may be accompanied by an audible alarm or tone, vibration or some other suitable means for alerting the user. In an embodiment in which two MateFinders 10 are used, each MateFinder includes a match indicator, 16a and 16b. A miniature LCD screen 18 is situated on one side of the MateFinder 10. This screen 18 is used to read messages which may be sent by the person who is detected by the seeking signal 11, or to view a list of possible matches detected by the MateFinder. A USB 20 or some other suitable port for connecting the MateFinder 10 to a personal computer or some other appliance or device is located on the base of the device. In an alternative embodiment, the USB port 20 may be replaced or enhanced by a wireless connection. A "Mask" switch 34 enables the user to allow the matching MateFinder to locate him or her by electronic means. A correlation switch 35 enables the user to adjust the level of matching that is performed by the MateFinder. For example, if the user turns the thumbwheel 35 toward the "10" indicator on the wheel, he or she is instructing the MateFinder to seek out a stronger or higher level of correlation between the preselected qualities or attributes stored in his or her MateFinder and a potential candidate. By turning the thumbwheel 35 down towards "1", the MateFinder reports matches that represent lower levels of correlation between preselected attributes and candidates.

In alternative implementations of the invention, the MateFinder 10 may be built into a bracelet, a necklace, a tie-clip, a hat, a shoe or some other suitable fashion item, article of clothing or ornament.

Figure 3:
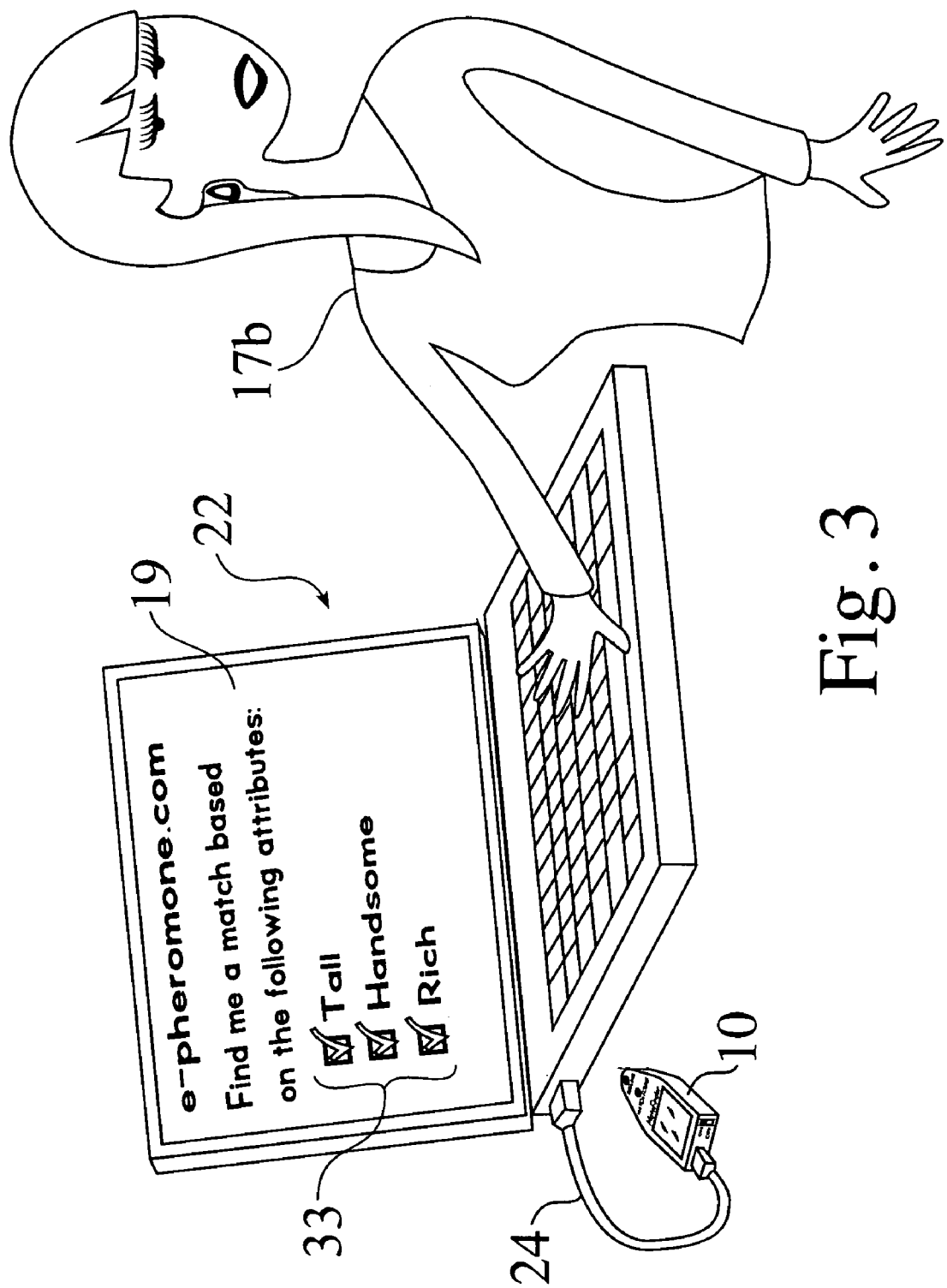
FIG. 3 illustrates a woman who has visited a website using her personal computer. She has connected her MateFinder™ device to the USB port of her computer, and is programming her MateFinder™ with her own attributes, as well as with her preferences in a mate.

FIG. 3 depicts a woman 17b who has visited a website 19. After connecting her MateFinder 10b to the USB port of her personal computer 22 with a cable 24, she is able to program her MateFinder 10b with two sets of attributes 33: a first set of attributes 33a that describes herself, and a second set of attributes 33b that describes her ideal mate. In general, an attribute is any form of data, criteria, information, measure of suitability, complementarity or compatibility; qualities or characteristics that describe a person, item, system, device or thing being sought by a user of the present invention. In one embodiment, two sets of attributes are employed, a first 33a, which pertain to the "seeking" user, and a second 33b, which pertain to the "target" user. Both of these sets of information may be entered into the personal computer 22 in response to prompts from the pages of the website 19. Software running on a server (not shown) which hosts the website then sends the data back to the woman's computer 22, where it is conveyed to the attached MateFinder 10 over the USB cable 24. In an alternative embodiment, the connection between the personal computer 22 and the MateFinder 10 may be wireless.

In one embodiment of the invention, the MateFinder may be programmed using a personal computer 22 with an Internet connection and a website 19. Alternatively, the programming may be accomplished with just a personal computer 22 loaded with suitable software. In an advanced embodiment, the MateFinder may be programmed without any other device or software by communicating directly with a website 19 over a wireless connection, or may be programmed using a keyboard or some other input means associated with the MateFinder.

In another embodiment, the website can also provide aliases for its members' e-mail addresses. In this way, e-mail is forwarded to their true address, which is kept secret. If a suitor is too persistent, a user can easily change her alias. The user may also block e-mails from unwanted suitors. The website may also provide a similar service for cellular telephone numbers, by furnishing a call-forwarding feature for a discreet call-in number.

The attributes 33 which may be selected by the user are virtually unlimited. In the case of a dating service, attributes 33 may be selected from an existing list of attributes 33. As an example, Table One presents attributes 33 which the website 19 displays may include:

TABLE ONE

| Category | Attribute |
| --- | --- |
| Gender | Male, Female |
| Age | |
| Appearance | Handsome/Knockout, Attractive/Cute |
| Marital history | Single, Divorced |
| Residence location | |
| Height | Tall, Average, Short |
| Weight | |
| Hair Color | Blonde, Brunette, Redhead |
| Occupation & Income | |
| Religiosity | Yes/No; Denomination |
| Political preferences | Conservative, Liberal, None |
| Interests or hobbies | |
| Educational level | |
| Social Class Marker | |

In this "electronic dating" embodiment, the user generally selects two sets of attributes 33—a first set 33a to describe herself or himself, and a second set 33b to describe his or her ideal match. In another embodiment, the user may only select one set, either only attributes that describe herself 33a, or only attributes that describe a mate 33b. A set of attributes 33 may include any number of qualities, numbering from one to a large number. Both sets of attributes 33 are stored in a non-volatile memory that is housed within the MateFinder 10. In one embodiment of the invention, one MateFinder 10a with a first memory 32a is employed to find a second MateFinder 10b with a second memory 32b. These preselected attributes may be revised by visiting the website 19, or may be generated using a software template provided with the MateFinder, which is then reprogrammed to incorporate the new data. In an alternative embodiment of the invention, the MateFinder 10 may be programmed directly using voice commands, or by using a keypad built into the device (not shown).

Figure 4:
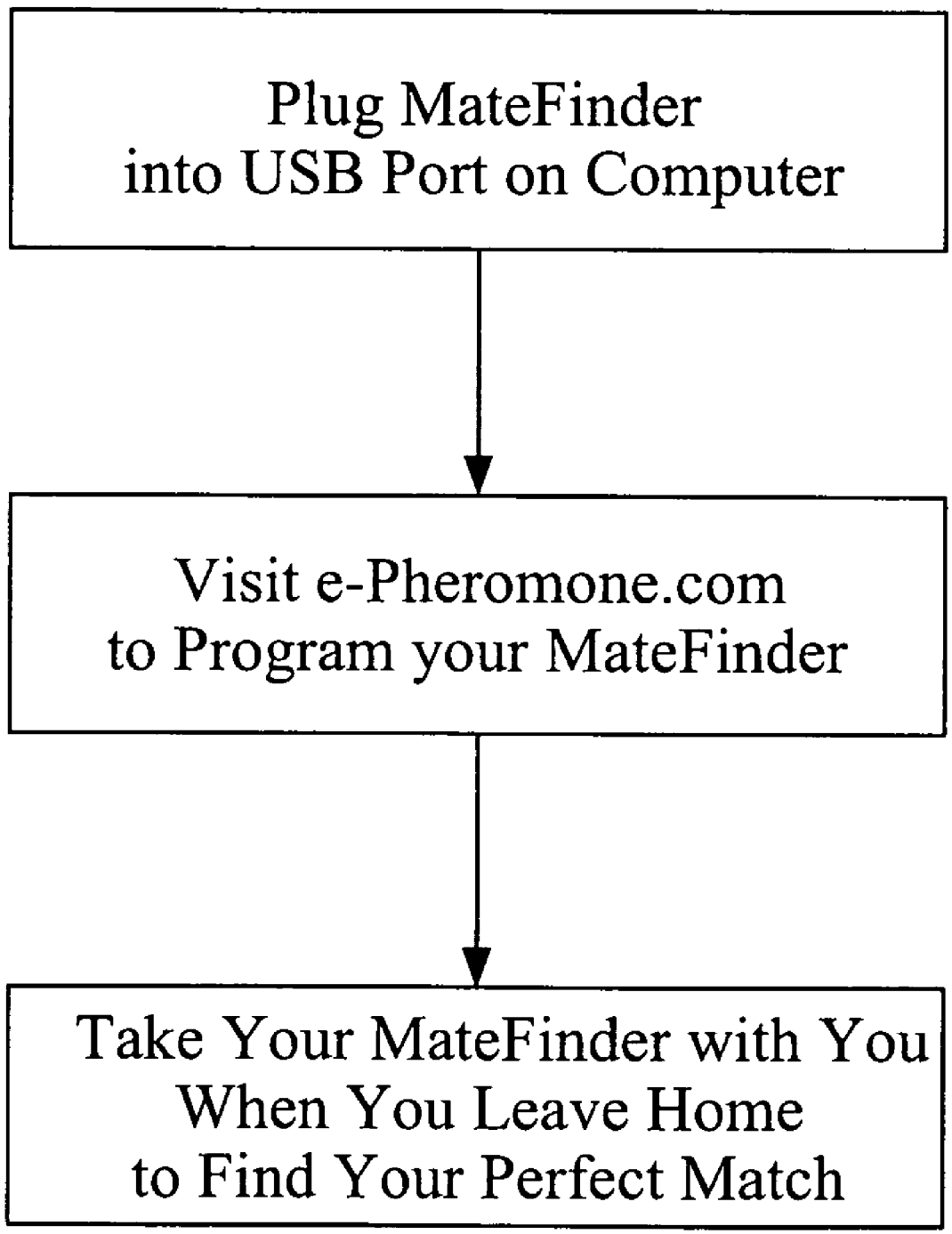
FIG. 4 is a flowchart that explains how a user employs the MateFinder™ to help find a person with characteristics that match the user's preferences.

FIG. 4 offers a basic flowchart that describes how this embodiment of the invention is used. After acquiring a MateFinder 10, the user connects it to a personal computer 22. The user visits a website 19 to select two sets of attributes 33 that are stored in his or her device, or uses a software template supplied with the MateFinder. When he or she is ready to enter a social setting, or simply leaves home, he or she then turns the MateFinder on, and takes it along.

Figure 5:
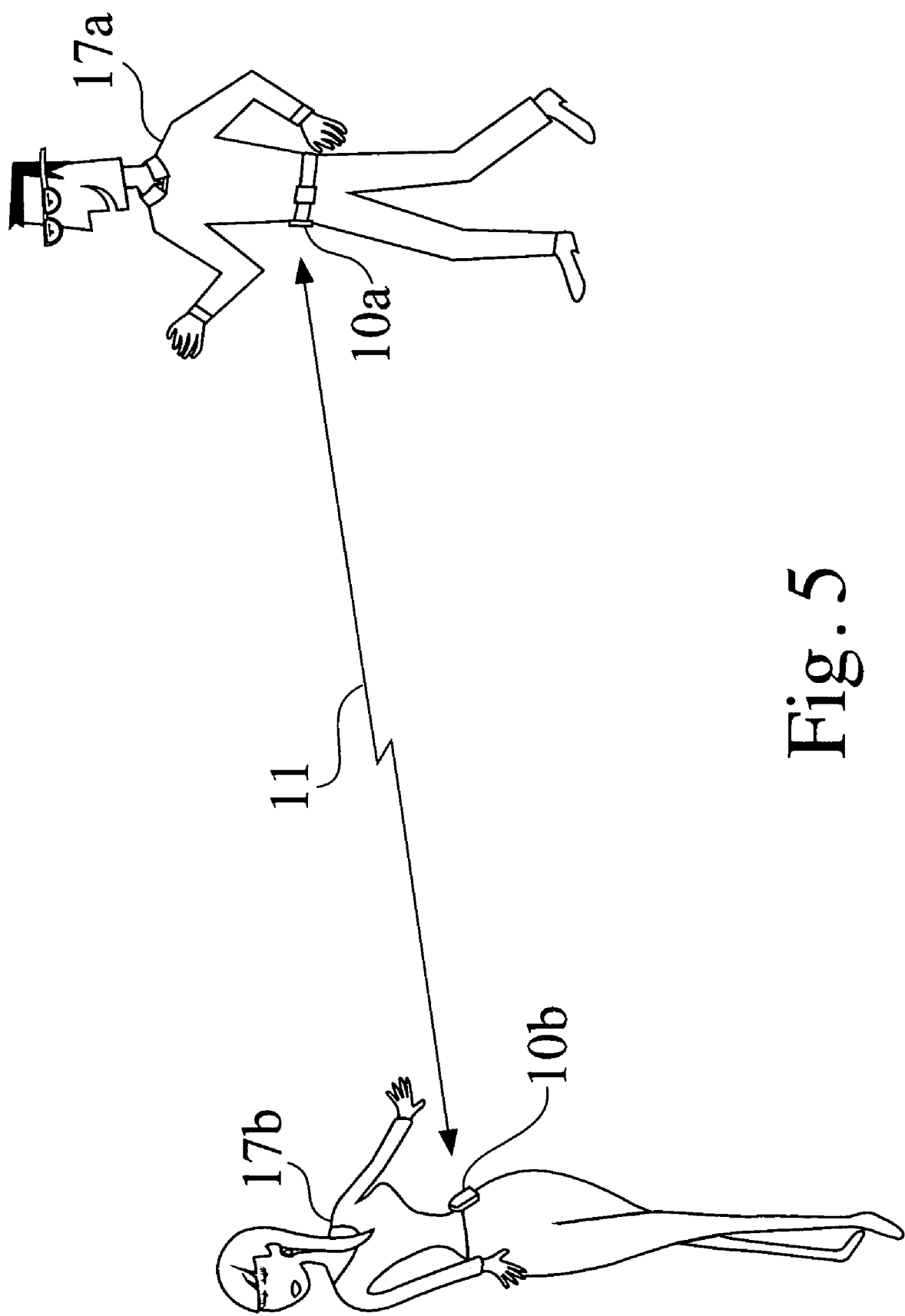
FIG. 5 shows the same woman at some sort of social event, perhaps at the beach, in a park, at a concert or attending a sporting event. The woman's MateFinder™ has found a match in the crowd, and alerts her to his presence.

As shown in FIG. 5, the automatic and continuous seeking signal 11 finds a match. The woman 17b shown in FIG. 5, who may be attending a party, a concert or a sporting event, finds a match 17a based on her preselected attributes 33.

FIG. 6 reveals the operation of a more complex embodiment of the invention. After a man's MateFinder 10a has located a suitable match 17b, the man's MateFinder 10a conveys an address or some other identification message to the woman who has been matched. Her message may appear on the screen 18 of his device 10a. The woman 17b then has the option to communicate with the man 17a immediately. In one embodiment of the invention, the woman 17b may use her cellular phone to call a toll free number, such as 1.800.SEEK-ING. In another embodiment, the MateFinder itself can provide text-messaging, either through its radiated signal or through a local network 37 or the Internet. The address or identification information which has been sent to her MateFinder 10b by the man's MateFinder 10a is displayed on her LCD screen 18. After dialing the toll-free number, she enters this address or identification information, and is then prompted to enter a text message, or to record a voice message.

FIG. 7 is a simplified schematic diagram of the circuitry that may be employed to implement one embodiment of the present invention. The power switch 14 controls the flow of energy from a battery 26 that powers the MateFinder 10. When the MateFinder 10 is turned on, a radio/processor assembly 28 automatically and continuously emits a seeking signal 11 using antenna 30 over a short range. A USB port 20 is connected to the radio/processor assembly 28. The antenna 30 may be contained within the housing 12. When the radio/processor assembly 28 is broadcasting, the "SEEKING" LED 15 flashes periodically. When a match is found, the "MATCH FOUND" LED 16 illuminates, or some other audible or vibrating alarm is activated. The radio/processor assembly 28 is also connected to the LCD screen 18, which may be used to display short text messages that are received from another MateFinder 10.

The radio/processor assembly 28 is also connected to a memory 32, which is used to store attributes that describe the user and his or her ideal mate. The memory 32 may comprise any suitable non-volatile device, including, but not limited to a flash memory or hard-drive. In an alternative embodiment, a "MASK" switch 34, which is connected between the microprocessor 36 and ground, may be included to allow the user to mask his or her location.

A suitable frequency for the radio emissions, such as one of the unlicensed "ISM" or "RF device" bands set aside by the United States Federal Communications Commission, is selected to avoid creating unwanted interference. The MateFinder 10 may be configured to emit and/or receive a variety of signals or emanations of energy. In the United States, some embodiments of the invention may use the 900 Mz, 2.1 GHz, 5.8 GHz, 59-64 GHz or some other radio frequency band. In other countries, other suitable frequency bands may be selected for the operation of the present invention. Other embodiments of the invention may employ light energy, voice commands, audible tones or ultrasonic emissions; mechanical, physical or chemical manifestations; radioactivity, or any other suitable means for communication.

In a more advanced embodiment of the invention, some or all of the discrete components described in FIG. 7 may be integrated on a single computer chip.

FIG. 8 provides a schematic diagram that illustrates one particular implementation of the invention. A microprocessor 36 is connected to a flash memory 32, a USB port 20 and an indicator 16. The microprocessor 36 is also connected to a receiver assembly 38 and a transmitter assembly 44. The outputs of the receiver 38 and the transmitter 44 are connected to an automatic transmit-receive switch 39, which, in turn, is connected to a bandpass filter 48 and an antenna 30. FIG. 9 offers a flowchart which depicts the basic operational steps of a particular software program that may reside at the website 19 used by the present invention. In the first step of the process, a user visits the website 19, such as e-pheromone.com. The user's browser requests information from the website 19, and the website responds by sending the user a welcome screen. The welcome screen invites the user to either create a new account, or to login to his or her existing account with a username and a password.

After the user has logged in for the first time, a new screen prompts the user to attach his or her MateFinder to his or her computer with a USB cable. After the user's computer has reported back to the website that the MateFinder is connected, the website generates a new screen that prompts the user to program his or her MateFinder using menu selections and/or a set of input fields.

After the user completes the selections, this information is recorded on a website database, and the website 19 sends the data back to the user's computer in a form that may be recorded in the MateFinder's memory. The user then disconnects the MateFinder, and may be offered a variety of premium services, such as background checks, certification of attributes or compatibility analysis, before he or she logs off.

In another alternative embodiment of the invention, the MateFinder may be designed to work in combination with an existing WiFi or similar wireless network 37 that is operating in the place where the user happens to be located. The user would be able to employ the wireless LAN or wired network (via a cable to the MateFinder), and would then be able to take advantage of all the connections offered by the Internet.

II. Applications & Uses of the MateFinder Invention

FIGS. 10, 11, 12, 13, 14, 15, 16, 17, 18, 19, 20, 21, 22, 23, 24, 25, 26 and 27 summarize the various combinations of uses, applications and functions of the present invention. All of these figures use a convention common in the communications industry when describing secure communication systems, in which there are three humans or systems involved in the transaction. The originator is called "A" or "Alice," regardless of whether it is a man, woman or system; similarly, the first intended recipient is "B" or "Bob." A third person or system, which may be attempting to eavesdrop, is called, "Eve."

The attributes 33 that describe Alice or Bob are called labeled "attributes," sometimes abbreviated "A." The attributes 33 that describe the entity that Alice or Bob is seeking are called "preferences," sometimes abbreviated P. When used in FIGS. 10-19, preferences are subsets, meaning that they are intended to be understood as members of the larger set of attributes 33. Thus, for example, the attributes that Alice uses for self-description are sometimes abbreviated "A's As," and the attributes Alice seeks are called, "A's Ps."

Each of the embodiments shown in FIGS. 10-27 are provided only as examples of the many possible uses of the present invention, and are not intended to circumscribe or limit the scope Of the Claims.

Figure 10:
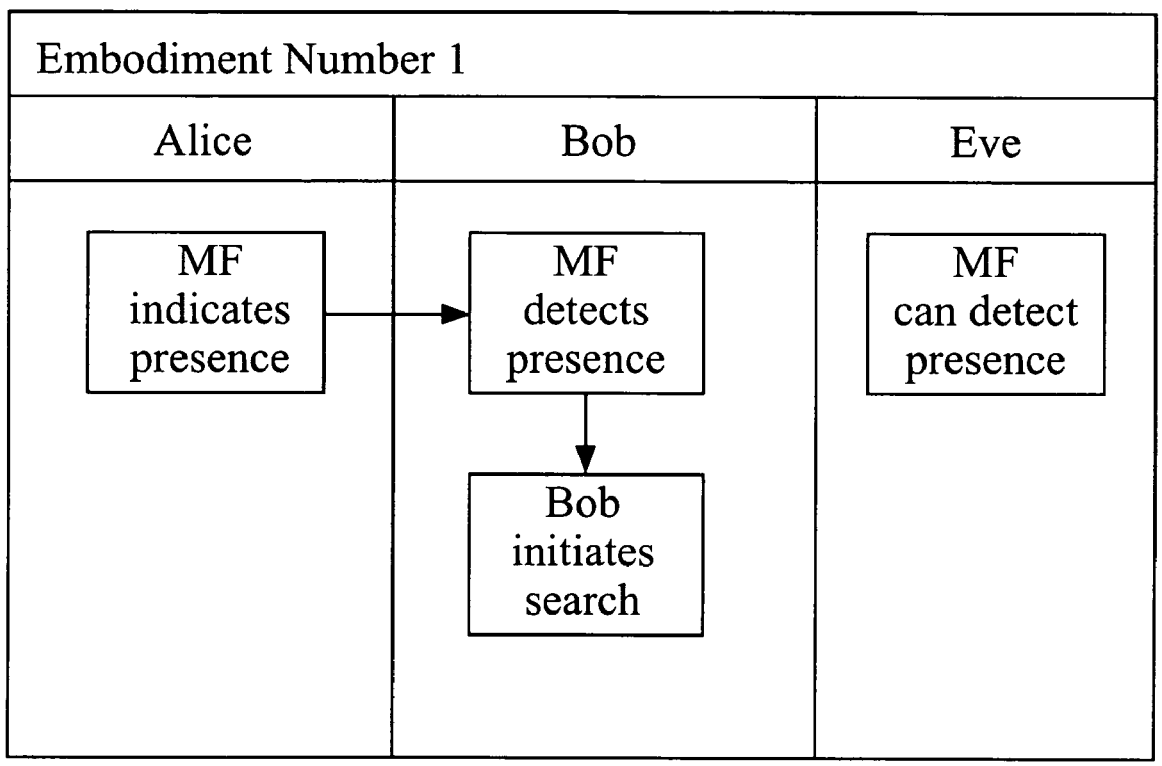

In Embodiment Number 1, shown in FIG. 10, Alice's MateFinder simply indicates her presence in the vicinity. Bob's MateFinder detects that information and alerts Bob, who may initiate a search. Eve's and other MateFinders in the area can detect the presence of Alice's MateFinder.

Figure 11:
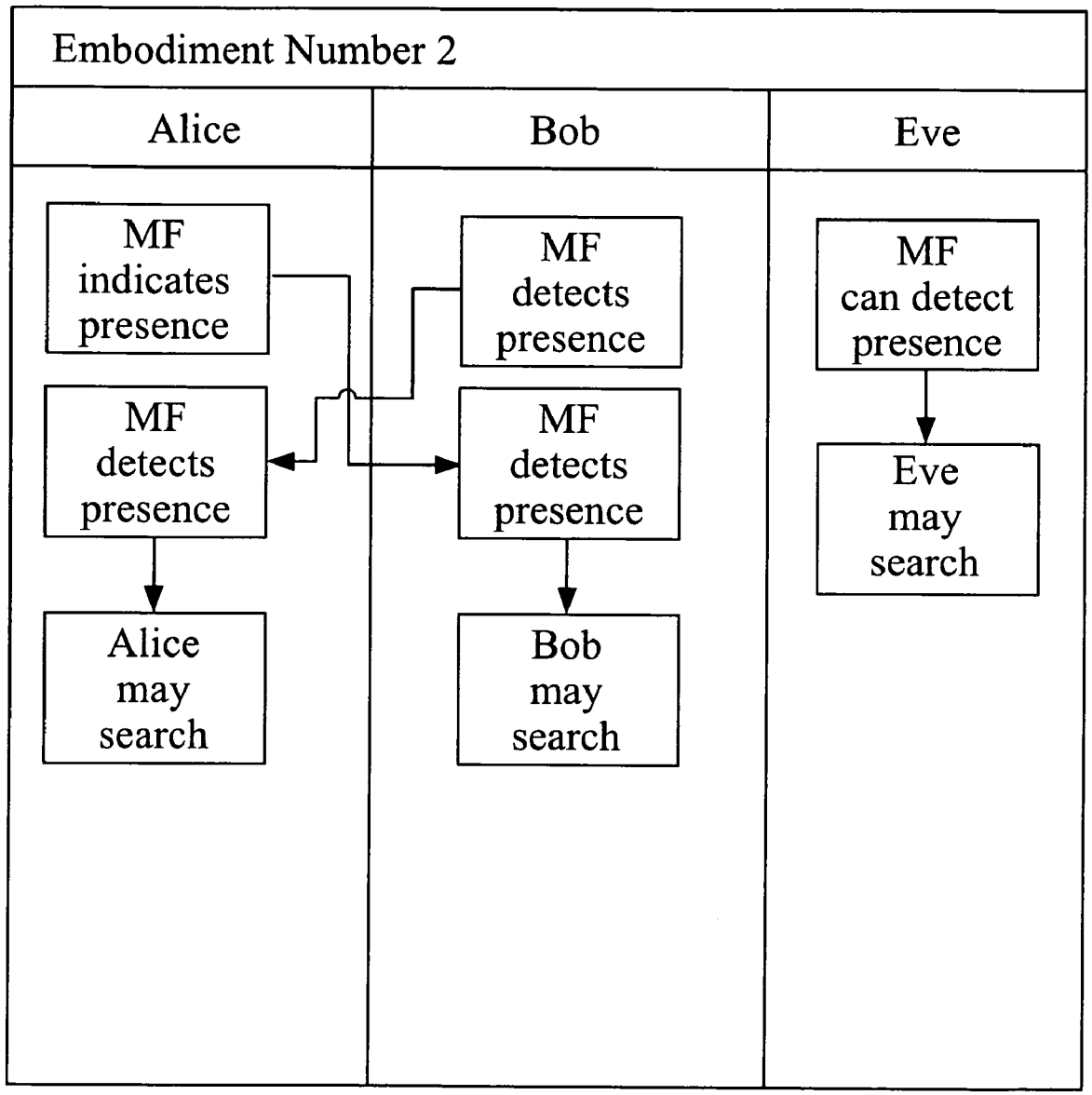

In Embodiment Number 2, shown in FIG. 11, both Alice's and Bob's MateFinders simply indicate their presence in the vicinity. Alice's and Bob's MateFinders detect that information and alert their wearers, who may initiate a search. Eve's and other MateFinders in the area can detect the presence of Alice's and Bob's MateFinders.

Figure 12:
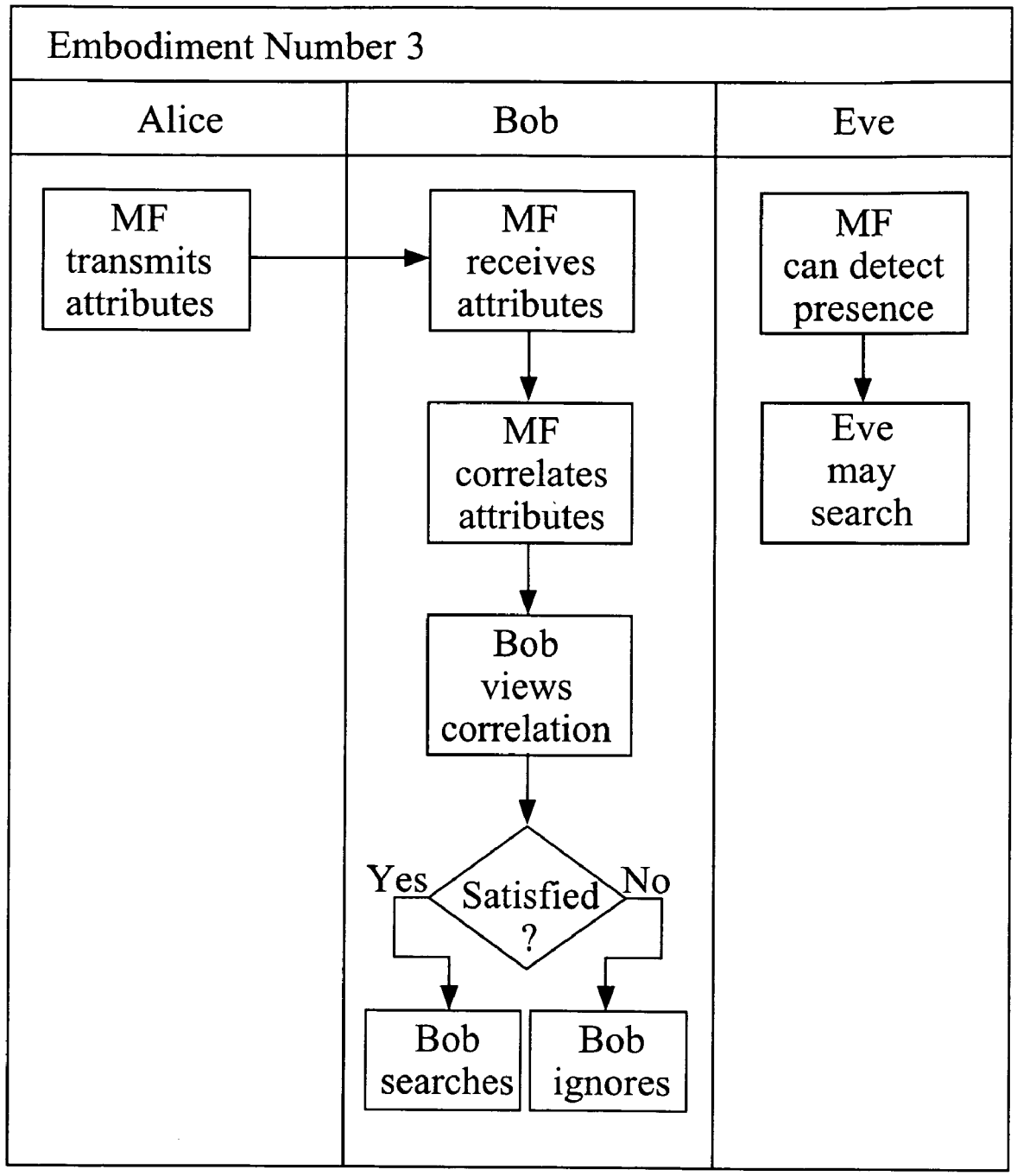

In Embodiment Number 3, shown in FIG. 12, Alice's MateFinder broadcasts Alice's attributes. Bob's MateFinder receives this information and correlates the received attributes with Bob's preferred attributes (hereafter called preferences). Bob views the degree of correlation and decides whether to initiate a search based on that information. Eve's and other MateFinders in the area can detect the presence of Alice's MateFinder.

Figure 13:
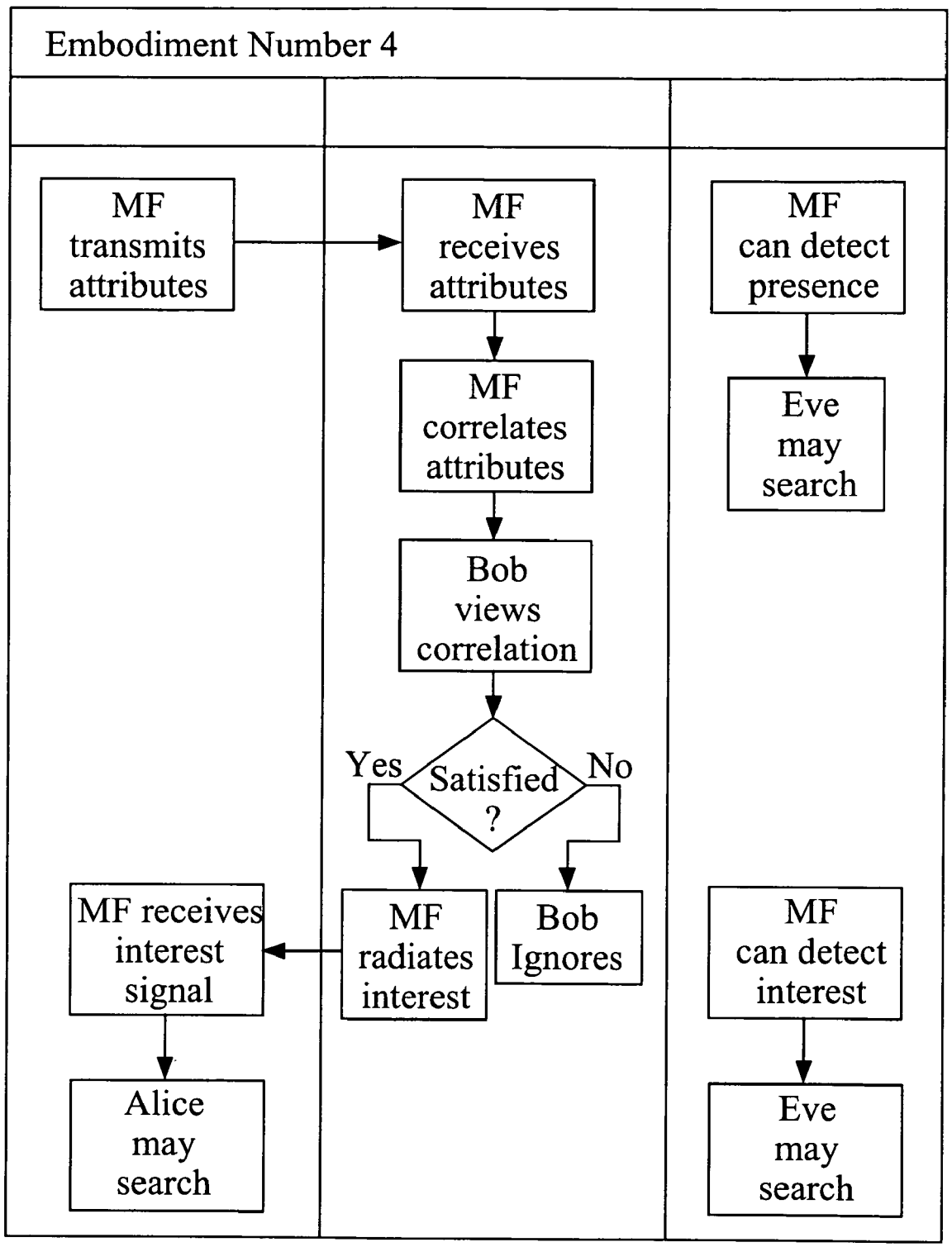

In Embodiment Number 4, shown in FIG. 13, Alice's MateFinder broadcasts Alice's attributes. Bob's MateFinder receives this information and correlates the received attributes with Bob's preferred attributes (hereafter called preferences). Bob views the degree of correlation and decides whether to have his MateFinder radiate an interest signal. If Alice detects that signal, she may initiate a search based on that information. Eve's and other MateFinders in the area can detect the presence of Alice's and Bob's MateFinders, and can detect the interest signal when emitted.

Figure 14:
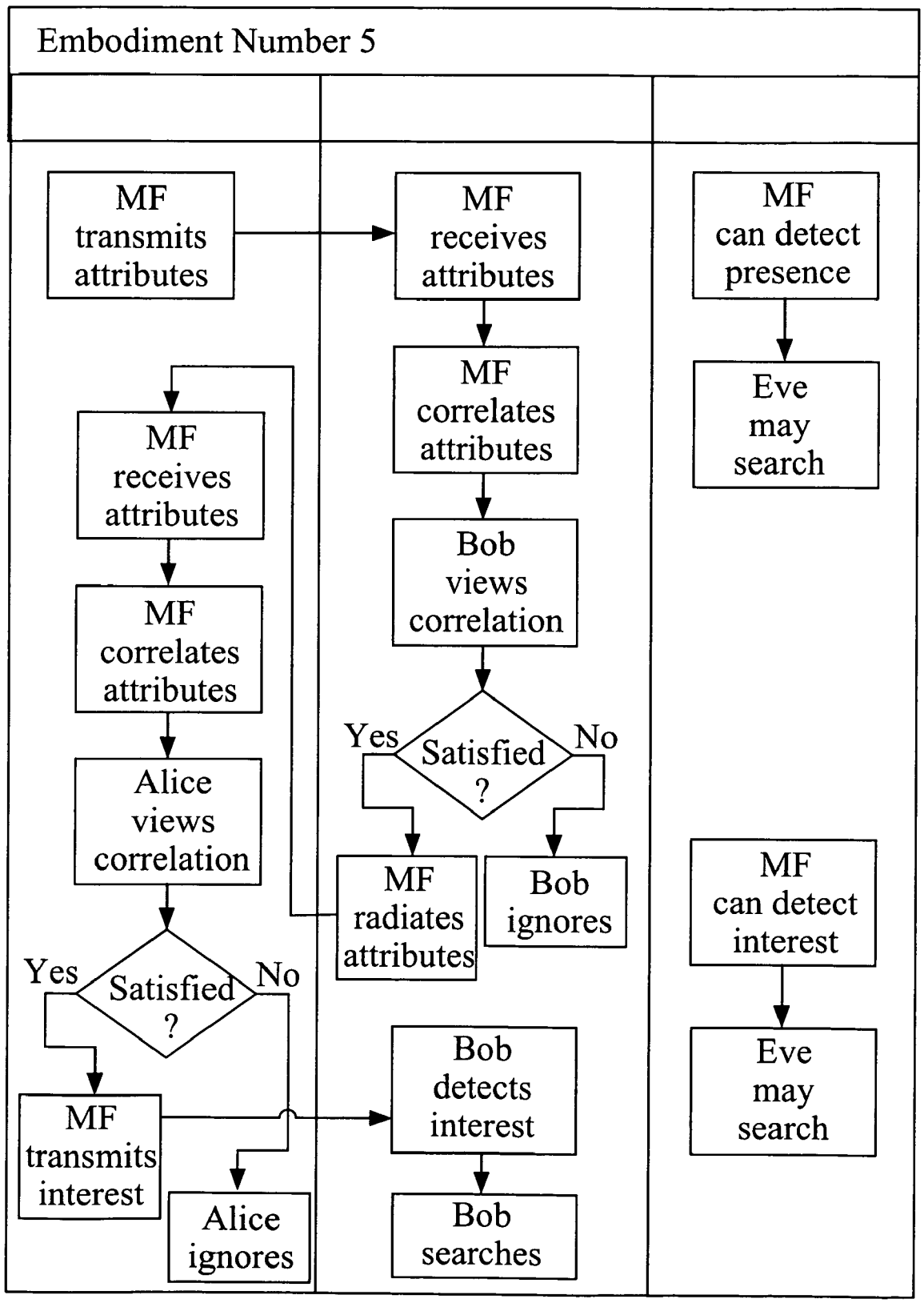

In Embodiment Number 5, shown in FIG. 14, Alice's MateFinder broadcasts Alice's attributes. Bob's MateFinder receives this information and correlates the received attributes with Bob's preferences. Bob views the degree of correlation and decides whether to have his MateFinder radiate his own attributes. If Alice's MateFinder detects that signal, it correlates the received attributes with her preferences. If she is satisfied with the correlation, she directs her MateFinder to emit an interest signal, and she may also search. If Bob's MateFinder detects the interest signal, he may initiate a search. Eve's and other MateFinders in the area can detect the presence of Alice's and Bob's MateFinders, and can detect the interest signal when emitted.

Figure 15:
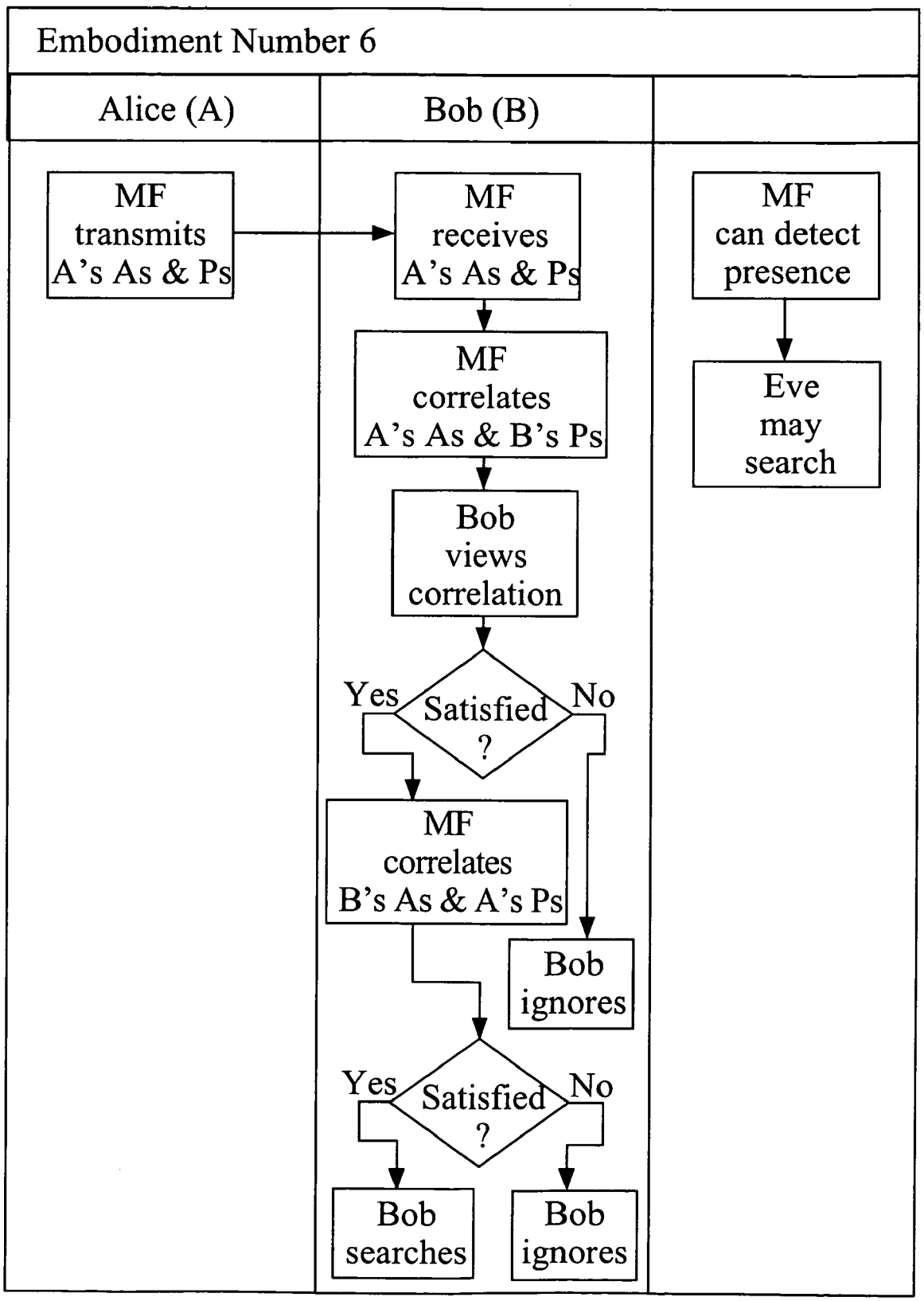

In Embodiment Number 6, shown in FIG. 15, Alice's MateFinder broadcasts both Alice's attributes and her preferences. Bob's MateFinder receives this information and correlates the received attributes with Bob's preferences If Bob is satisfied with the correlation between Alice's attributes and Bob's preferences, he may then have his MateFinder correlate Bob's attributes with the received preferences. Bob views the degree of this second correlation and, if satisfied, may initiate a search. Eve's and other MateFinders in the area can detect the presence of Alice's MateFinder.

Figure 16:
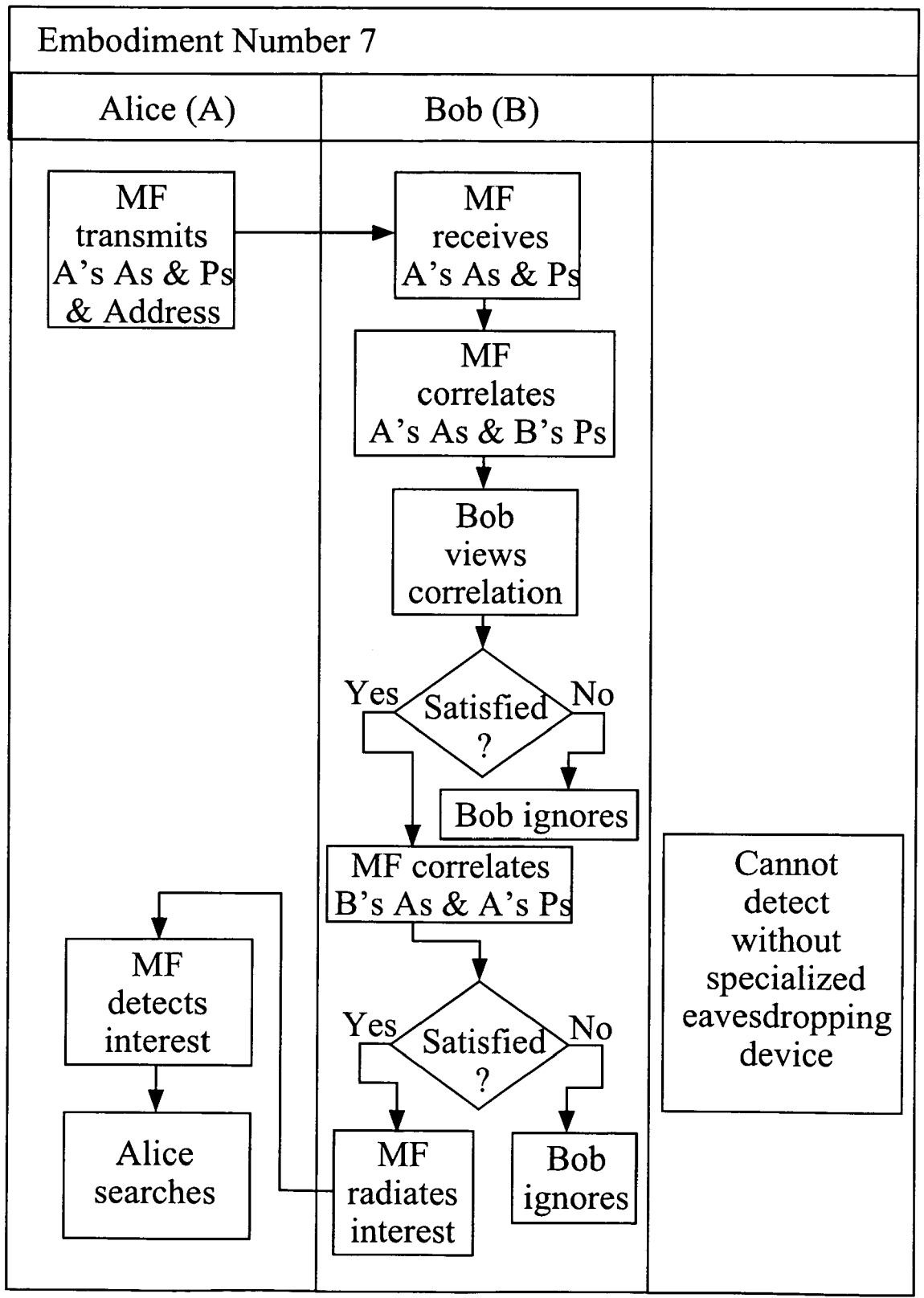

In Embodiment Number 7, shown in FIG. 16, events proceed as shown in FIG. 15, except that Alice's MateFinder adds an encrypted discrete address to her signal. Bob may choose to have his MateFinder radiate an interest signal directed to Alice's MateFinder's address. If Alice's MateFinder detects that signal, she may initiate a search. Eve's and other MateFinders in the area can detect the presence of Alice's and Bob's MateFinders. However, since Bob's interest signal is directed to a discrete address, other MateFinders cannot detect the interest signal.

Figure 17:
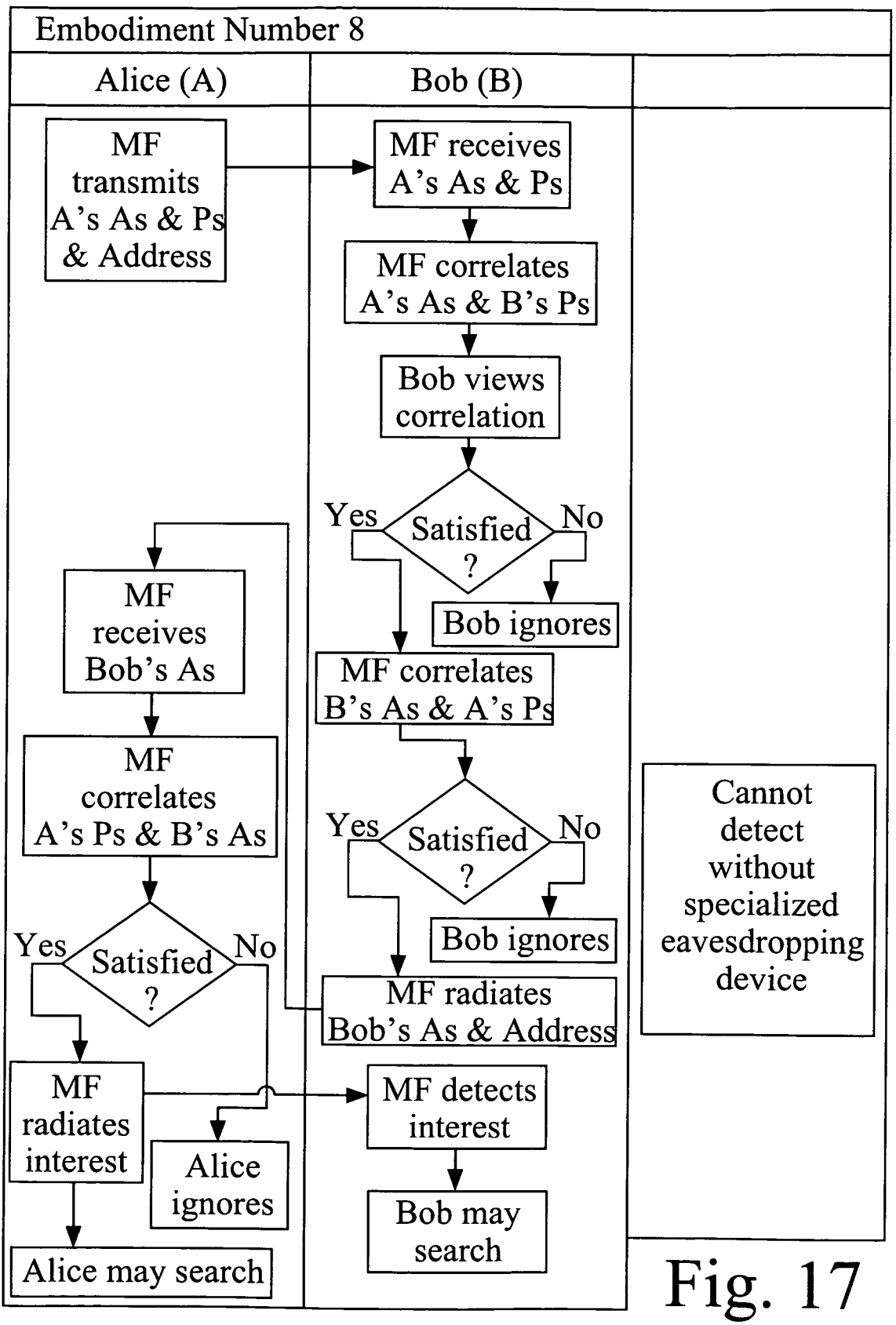

In Embodiment Number 8, shown in FIG. 17, events proceed as shown in FIG. 16, except that Bob may choose to have his MateFinder radiate his own attributes along with its encrypted discrete address. If Alice's MateFinder detects that transmission, it correlates Alice's preferences with the received attributes. If Alice is satisfied with the degree of correlation, she may initiate a search. Eve's and other MateFinders in the area can detect the presence of Alice's and Bob's MateFinders. However, since Alice's interest signal is directed to a discrete address, other MateFinders cannot detect the interest signal.

Figure 18:
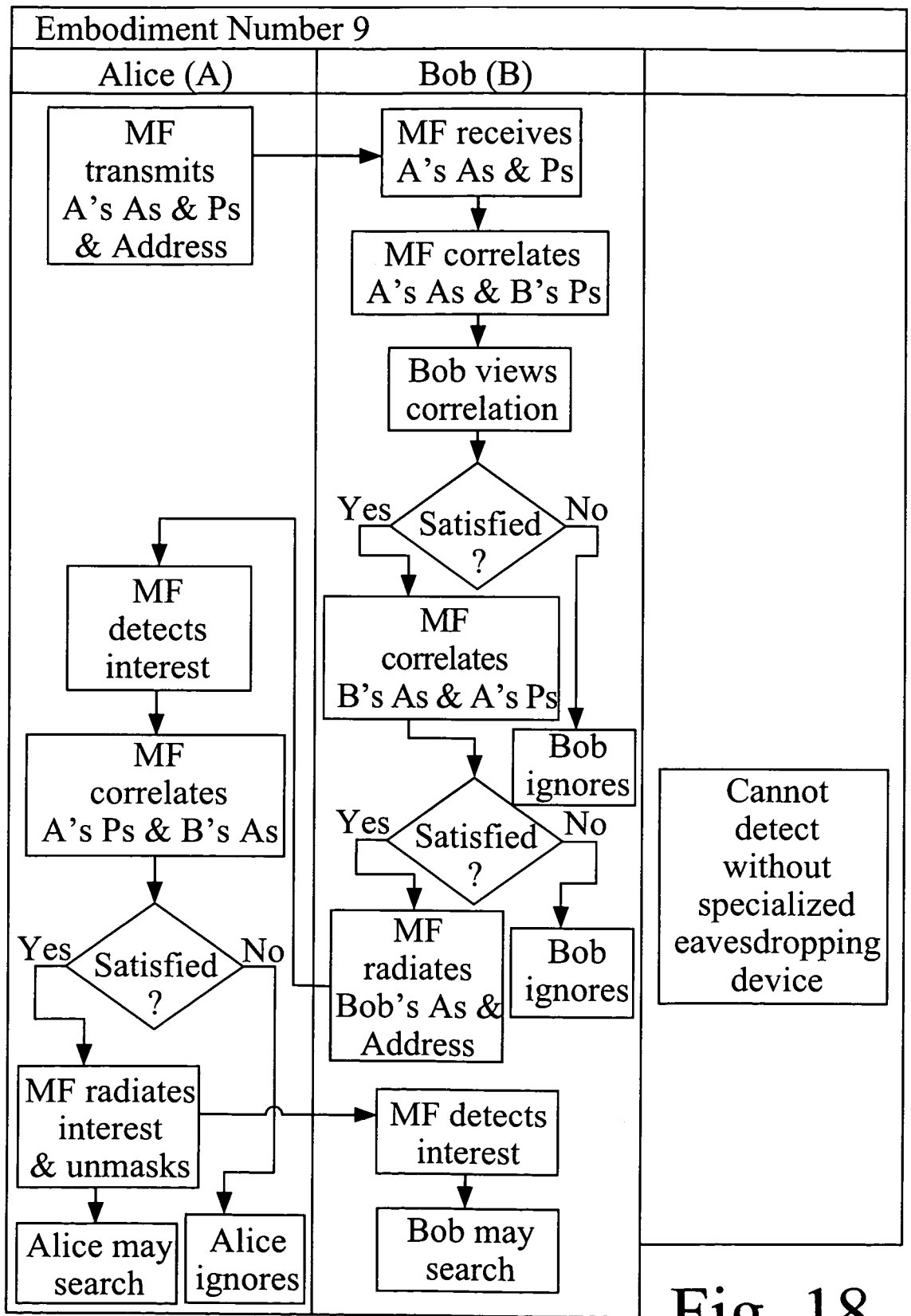

In Embodiment Number 9, shown in FIG. 18, events proceed as shown in FIG. 17, except that Alice may choose to have her MateFinder unmask her location to make her easier to locate, and at the same time to radiate an interest signal directed at the address of Bob's MateFinder. Either Alice or Bob may then decide to initiate a search, or using the location features of their MateFinders, they may choose to search cooperatively. Eve's and other MateFinders in the area can detect the presence of Alice's and Bob's MateFinders. However, since Bob's and Alice's interest signals are directed to the other's discrete address, other MateFinders cannot detect the interest signal.

Figure 19:
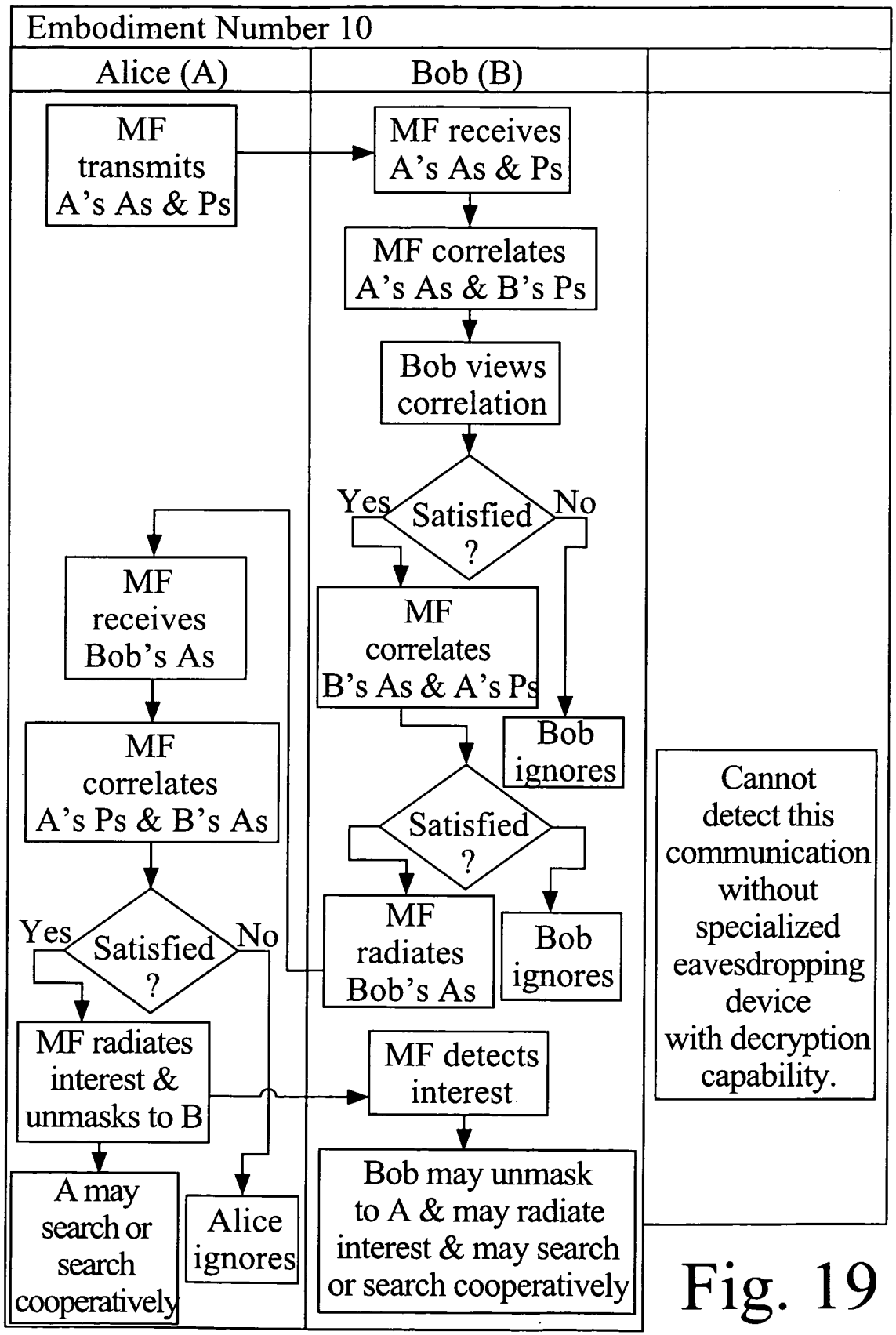

In Embodiment Number 10, shown in FIG. 19, events proceed as shown in FIG. 18, except that Alice may choose to have her MateFinder unmask her location to make her easier to locate, and upon receiving Alice interest signal, Bob may choose to unmask his location to Alice's MateFinder. Either Alice or Bob may then decide to initiate a search, or using the location features of their MateFinders, they may choose to search cooperatively. Eve's and other MateFinders in the area can detect the presence of Alice's and Bob's MateFinders. However, since Bob's interest signal is directed to a discrete address, other MateFinders cannot detect the interest signal. In addition, since unmasking is done only to discrete addresses which may be encrypted, even if equipped with specialized listening equipment, an eavesdropper cannot take advantage of the unmasking.

Embodiment Number 11, shown in FIG. 20 includes an embedded cellphone. As before, Alice's MateFinder transmits her Attributes and Bob's MateFinder receives and correlates them with his Preferences. If he is satisfied with the match, he can confirm her Attributes or check her background through the embedded cellphone, either by voice or browser. If he is satisfied with the result, he can offer his cellphone number to Alice or send her a text message which includes his profile. If Alice is interested, she may call Bob's cellphone number or send him a text message. She has the further options of ignoring his message or forwarding his profile to a third party.

In this embodiment, and in other embodiments that use cellphones, a central system may rely on location information gleaned by a central server from the GPS or other location device in the cellphone, and delivered by the cellular service provider as part of the users' cellular service arrangement. In these cases, the central server may use this information to compute the relative positions of users and provide for the exchange of Attributes and Preferences through the cellular network. This arrangement would obviate the need for special radio-frequency devices in the MateFinder.

Embodiment Number 12, shown in FIG. 21 proceeds as FIG. 20, except that if Bob is satisfied with the background check he may proceed to one of two secure communications protocols. These alternate protocols are described in FIG. 22 and FIG. 23.

In FIG. 22, Bob sends Alice an anonymous text message offering to exchange keys for a public-key cryptosystem such as the RSA™ algorithm. Using this or a similar public-key algorithm, Alice may send Bob a message encrypted with Bob's public key, which only Bob can decrypt, and similarly, Bob can send Alice a message using her public key which only she can decrypt. If Alice responds with her key, Bob can decide whether to request her cellphone number. If she is agreeable, they may exchange cellphone numbers securely using the public-key system, and may manually dial the number using an embedded cellphone or a separate cellphone.

The protocol in FIG. 22 proceeds as FIG. 21, except that either or both embedded cellphone may automatically decrypt the other's number and initiate a call.

Embodiment 13, shown in FIG. 24, is similar to earlier embodiments except that it allows for multiple MateFinders to interact. Bob may broadcast text messages using his MateFinder or other means. Those receiving his text messages may then respond and/or unmask their position.

Embodiment Number 14, shown in FIG. 25, is similar to that shown in FIG. 24, except that Bob may suggest and/or provide directions to a suitable meeting place at which face-to-face discussions may ensue.

FIGS. 26 and 27 show different embodiments of a Contractor Finder. This is a generalized device and process which can be used by individuals, groups or inanimate objects to locate compatible matches. In FIG. 26, Alice calls a contractor placement service on her cellphone and is offered a variety of potential contractors, either by voice, browser or other means. She then considers these prospects, and may narrow her search by adding other criteria. She then views a narrowed list, and may make a selection from that list and contact suitable prospects, using information or links provided by the placement service.

In FIG. 27, Alice rents or borrows a ContractorFinder, a device similar to a MateFinder, and programs her preferences into the device at a kiosk or online. Her ContractorFinder then radiates these Attributes. If there are responses, Alice considers them and may add further criteria. She then repeats this process as many times as necessary to select a suitable match.

III. Embodiments of the Invention for Use with a Wireless Network

In another embodiment of the invention, a MateFinder™ 49 is configured to communicate over a wireless network 50 via wireless signals 51 using a network radio 52. In one preferred embodiment, this radio 52 is a cellular telephone that is built into the MateFinder. One example of this combination 49 is shown in FIG. 28. In alternative embodiments, the network radio 52 may be a two-way pager, a Blackberry™ or some other text-message/e-mail device, a personal digital assistant, a computer with wireless access, a short range radio such as a "walkie-talkie'" or any other device that provides wireless communication over network 50. In one embodiment of the invention, the transceiver 10 and the network radio 52 are co-located, meaning that they are combined in a single package, housing or enclosure. In an alternative implementation, a MateFinder may be connected to a cell phone using a wired or wireless link. In yet another embodiment of the invention, the transceiver and the network radio may be integrated into a single radio circuit that functions on more than one frequency band. In this Specification and in the Claims that follow, the term "radio" includes any means or device for communicating over a distance without a wired connection.

The use of the reference characters "52a" and "52b" to refer to network radios is intended to assist the reader in understanding the invention, but does not necessarily connote any substantive differences in the devices. Similarly, the use of the reference character "52a" does not necessarily mean that the user is a man, or that the user of a device labeled "52b" is a woman.

In one preferred embodiment of the invention, the network 50 is a cellular telephone network. In an alternative embodiment, the network 50 may be any public or private network that enables communications among network radios 52.

The user 10 may employ the cellular phone function of the MateFinder to place conventional voice calls. This cellular phone may also include a display screen, a keyboard and a camera. This phone may also offer one or more of the following functions: text messaging, e-mail, Internet browsing which is used to access a website 19, audio and/or video recording and GPS location.

A. MateFinder/Cellular Telephone Combination

FIGS. 29-34 depict an alternative embodiment of the invention, which uses a cellular telephone 50 in combination with the present invention, which is referred to as the MateFinder/CP™ 49, a Trade & Service Mark owned by the Applicant. FIG. 24 portrays a woman with a MateFinder/CP 49 that includes a cellular telephone, an LCD screen, and browser software which enables the user to access information via the Internet. Like the more basic embodiment of the MateFinder that is illustrated in FIG. 2, the device 49 shown in FIG. 29 detects a suitable match for the user. Unlike the version of the MateFinder shown in FIG. 2, the user may employ this enhanced version to download the profile of the suitable match. The attributes which prompted the match are displayed on the LCD screen. Other information, including photographs or videos may be presented for the user's consideration before she communicates with him or approaches him.

Figure 30:
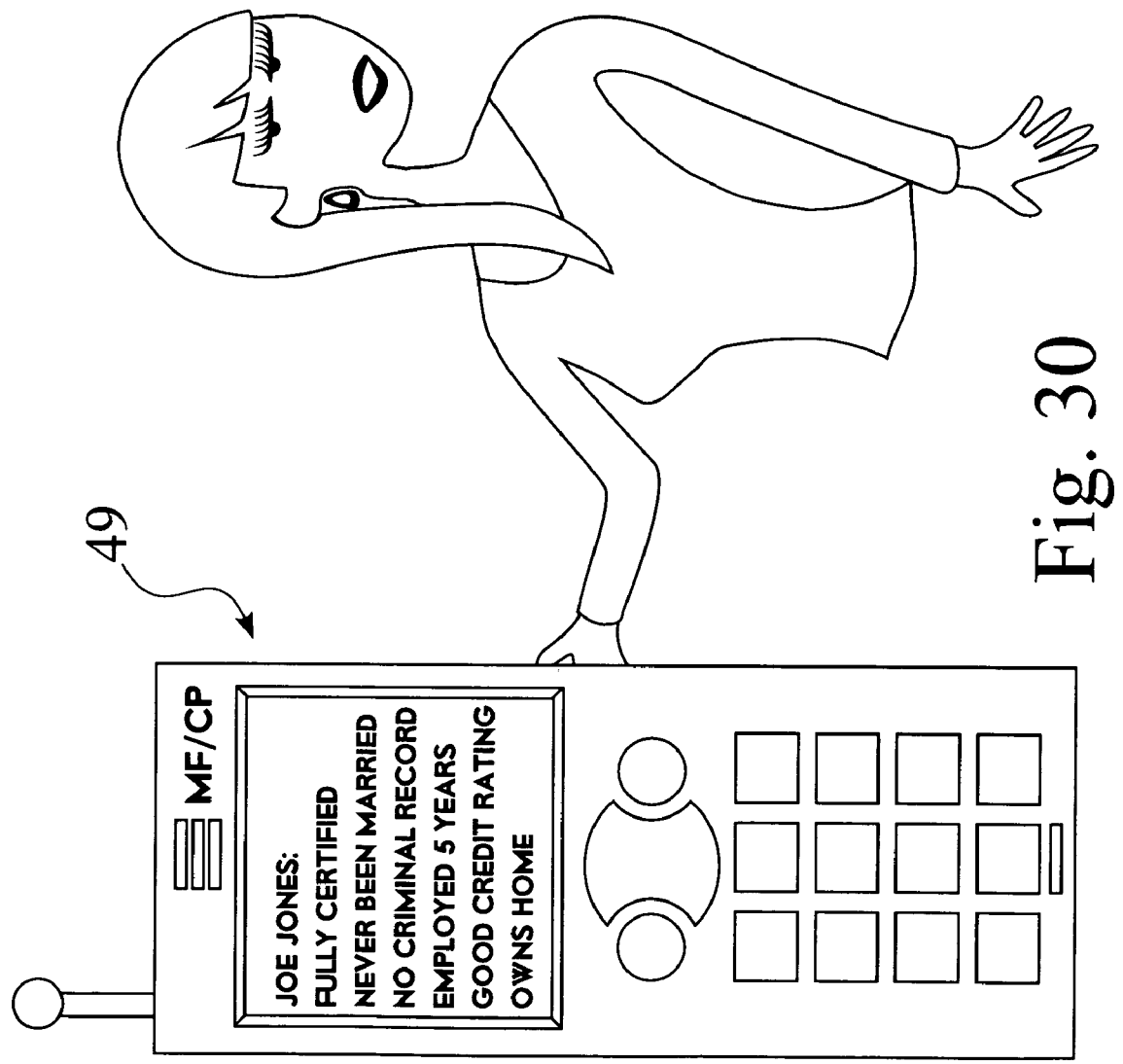

The user may also obtain certifications of the attributes of her prospective match, as shown in FIG. 30. These certifications may pertain to marital status, criminal record, employment history, credit rating, home ownership or any other independently verifiable public record that would help the user decide whether to communicate with the identified match.

Figure 31:
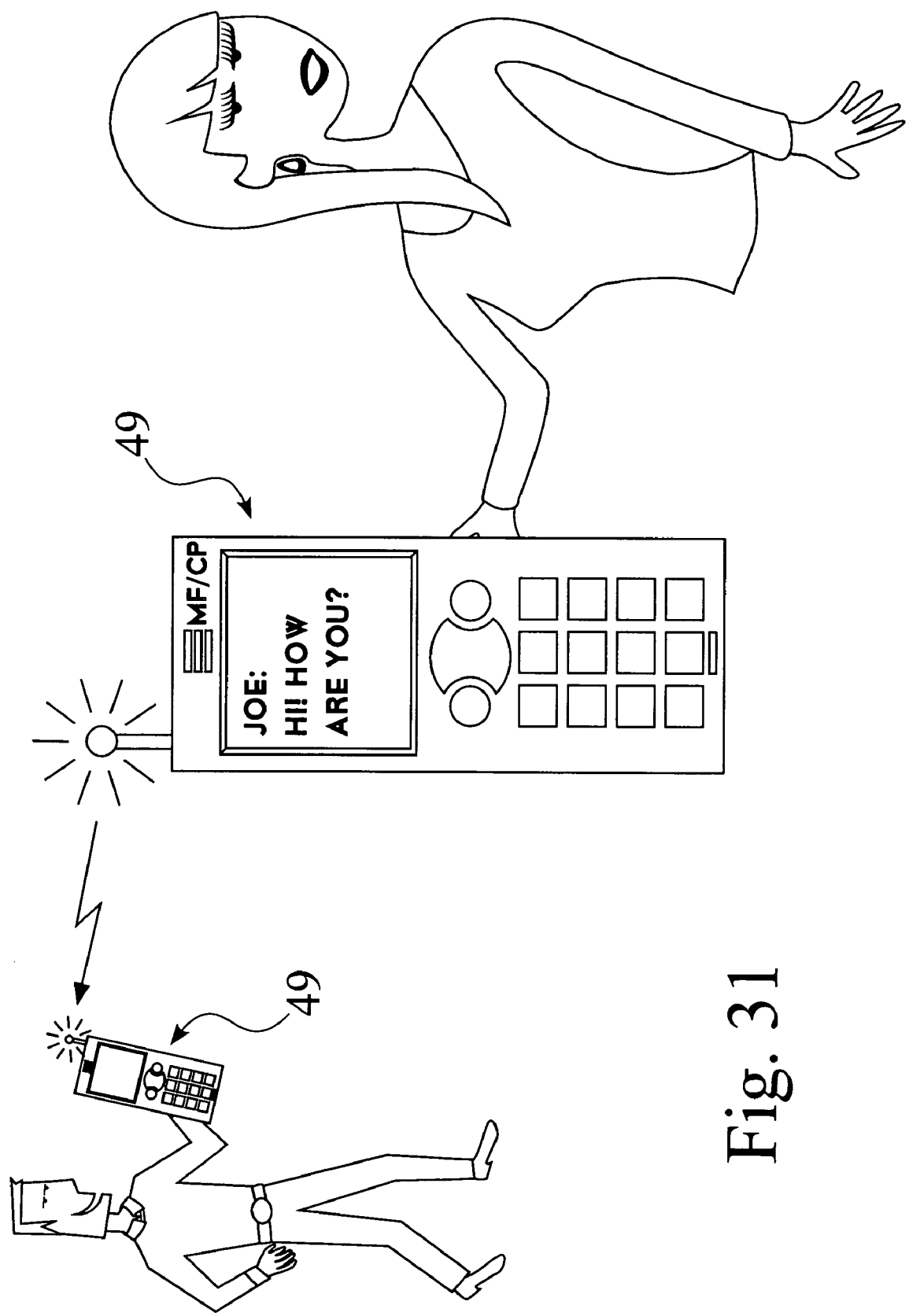
Figure 32:
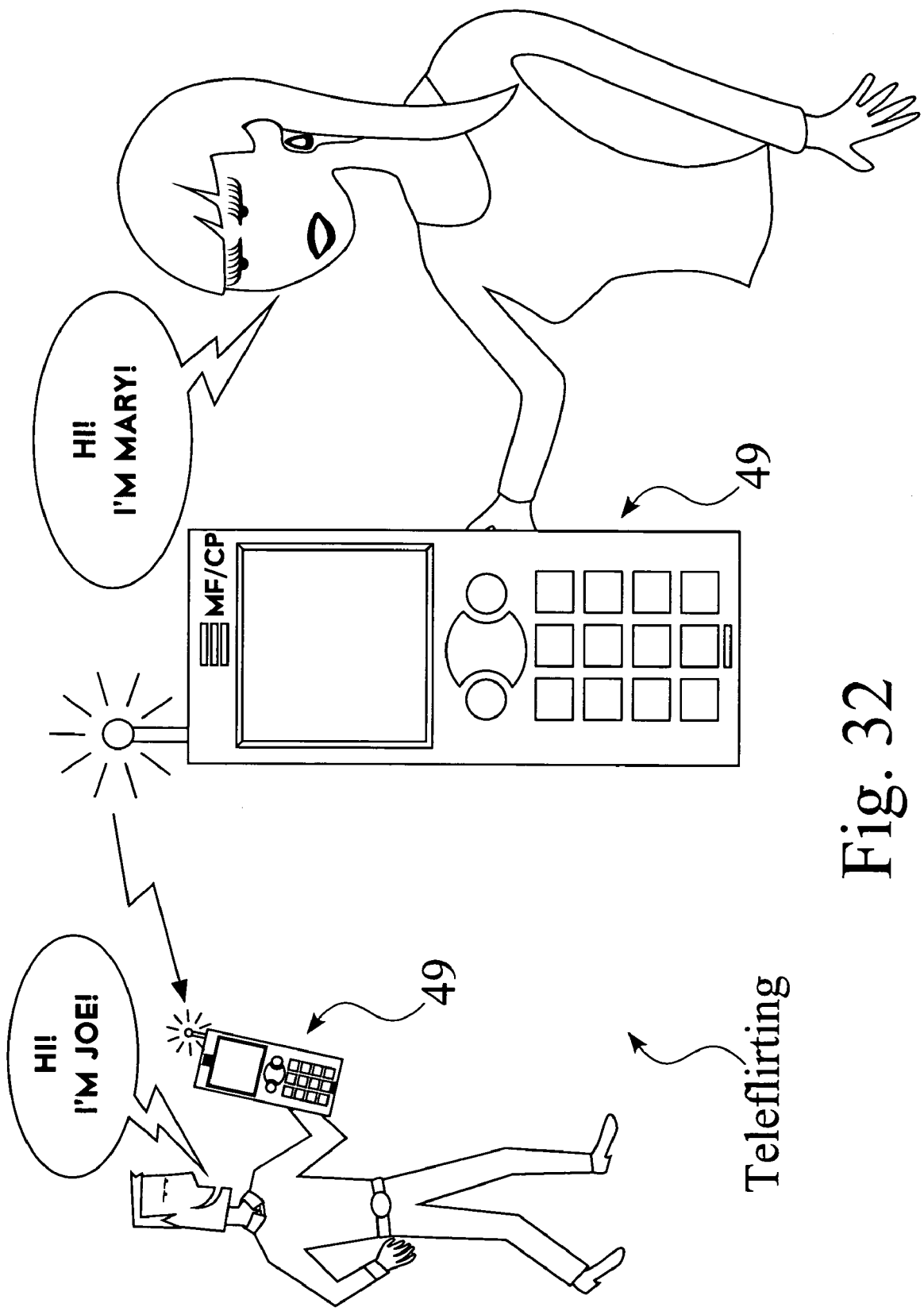

FIG. 31 reveals an additional feature of the embodiment of the invention which also functions as a telephone. After viewing the certified attributes shown in FIG. 30, the user decides to contact him directly by placing a call on the telephone, or by sending him a text message via the Internet. She may engage in some preliminary communications with her prospective match before approaching him. This feature of the invention is exhibited in FIG. 32, and is referred to as "TeleFlirting$^{SM}$," which is a Trade & Service Mark owned by the Applicant. The TeleFlirting function may also include making an audio and/or video recording using the camera and the network radio. This recording may then be sent to a prospective match as an e-mail attachment.

Figure 33:
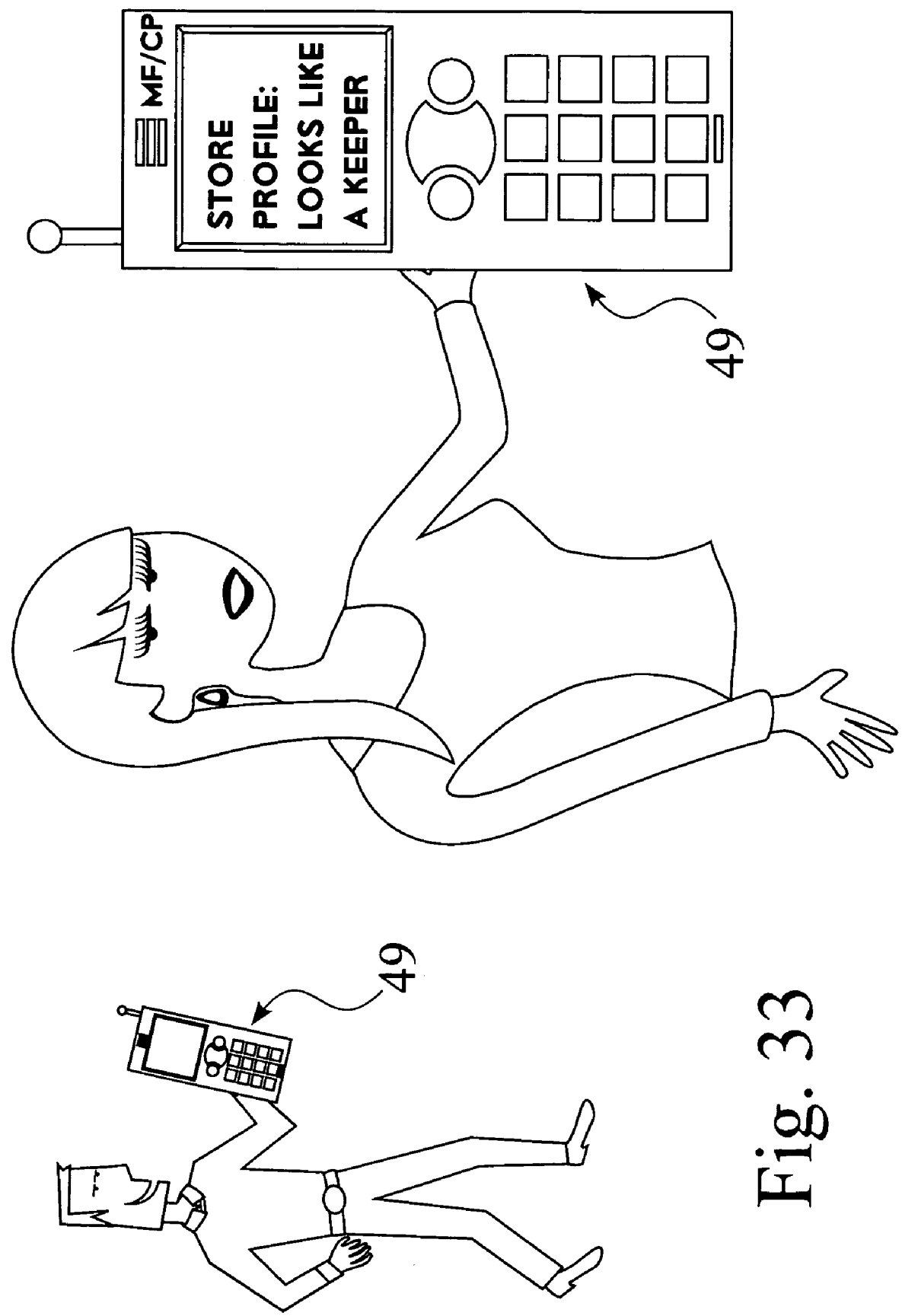
Figure 34:
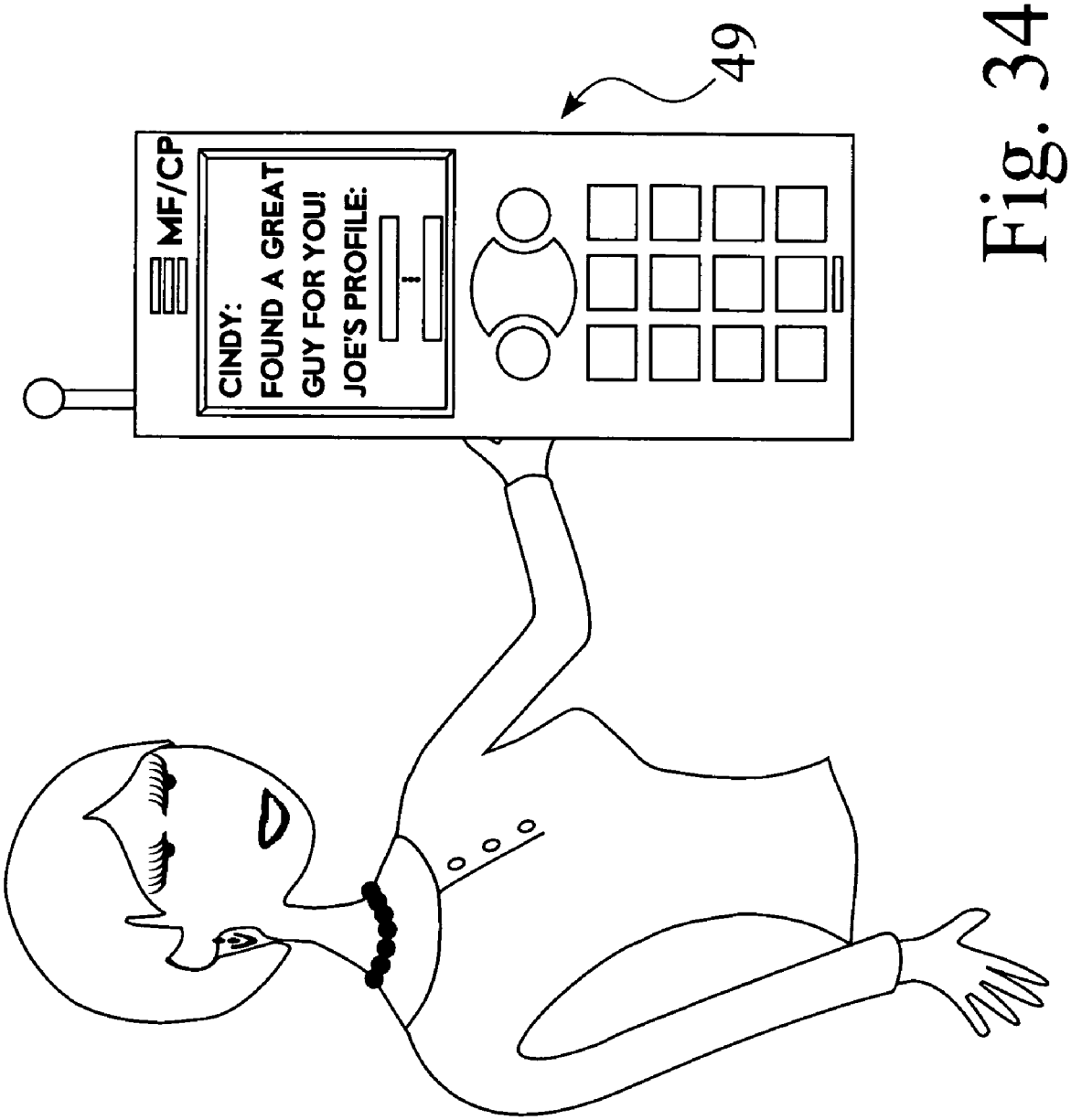

Another feature of this embodiment is portrayed in FIG. 33, which enables the user to save the profile of a potential match. In this Specification and in the Claims that follow, the term "profile" means a set of one or more attributes. The profile may be saved in a memory located in the MateFinder/CP 49, or may be saved as part of her account at the e-pheromone.com website. As an alternative, the user may decide that the prospective candidate is a better match for a girlfriend. In FIG. 34, the user has forwarded the downloaded profile to her friend's MateFinder/CP 49.

In another embodiment, the invention may also include a global positioning system (GPS) receiver, which enables each active MateFinder to know its own position with respect to the position of prospective matches. As discussed above, this embodiment may eliminate the need for other radio devices in the MateFinder.

B. The ContractorFinder™

Figure 35:
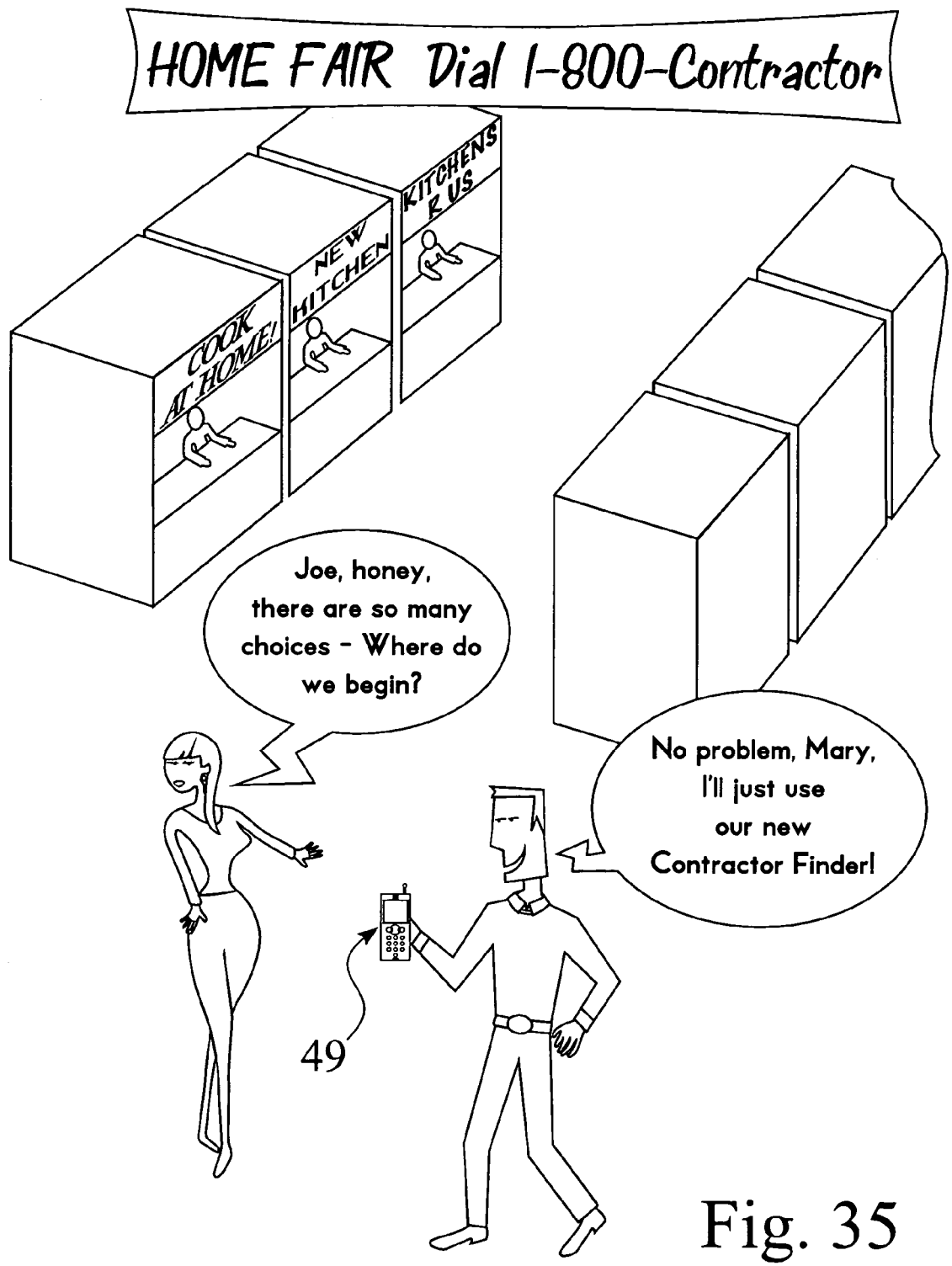
Figure 36:
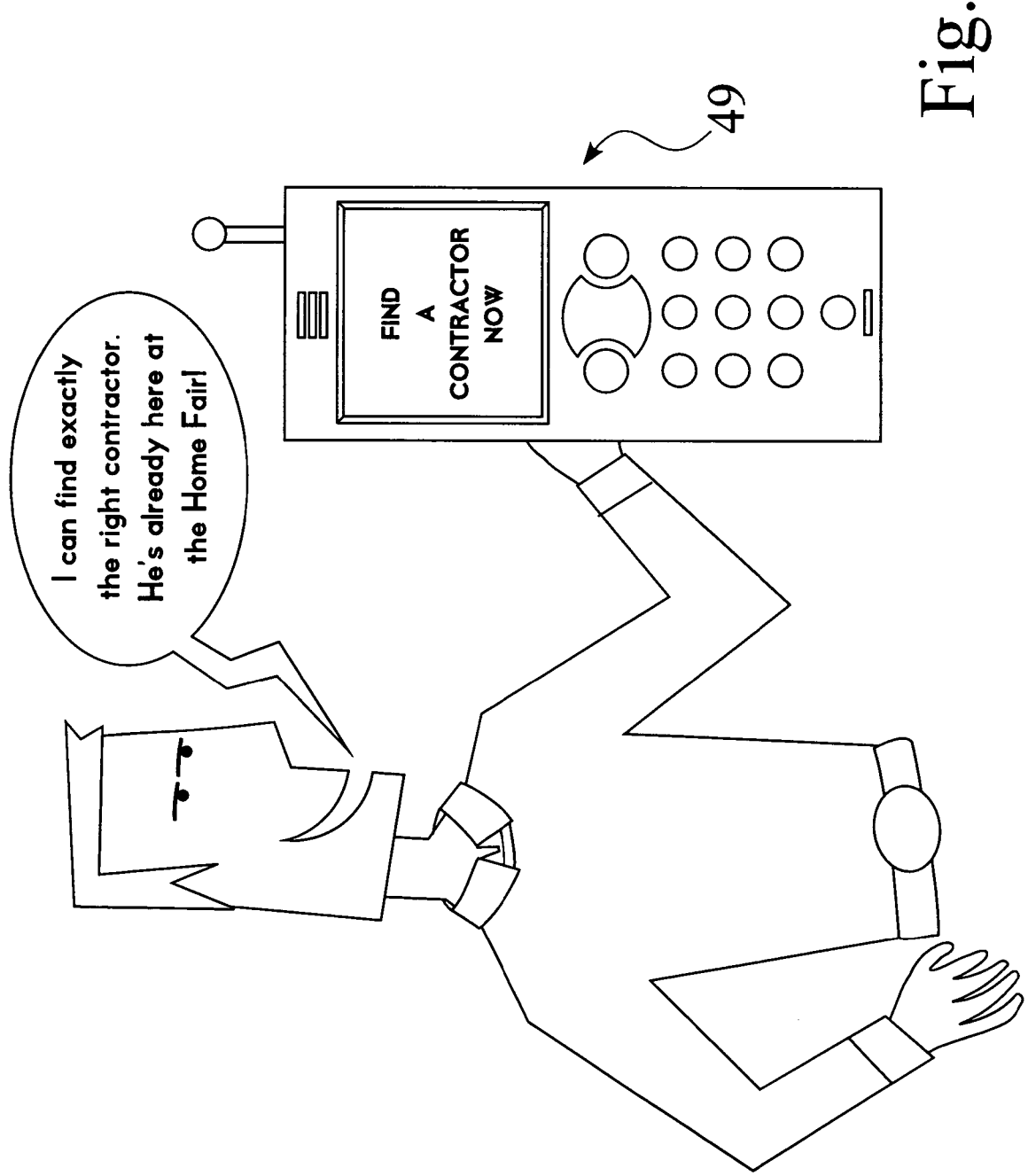

In yet another embodiment of the present invention, the MateFinder/CP™ may be used to obtain information about a product, service or some other subject matter of interest. In one particular implementation of the invention, the MateFinder/CP 49 is used as a ContractorFinder™. The ContractorFinder Trade & Service Mark is owned by the Applicant. FIG. 35 furnishes a view of two persons visiting a home show which is attended by many contractors who can provide a wide variety of services related to construction and remodeling. As shown in FIG. 36, one of the visitors uses his ContractorFinder to obtain information about contractors at the home show. He can either dial a toll-free telephone number such as "1.800.CONTRACTOR" or can use the browser function to access information via the Internet.

Figure 37:
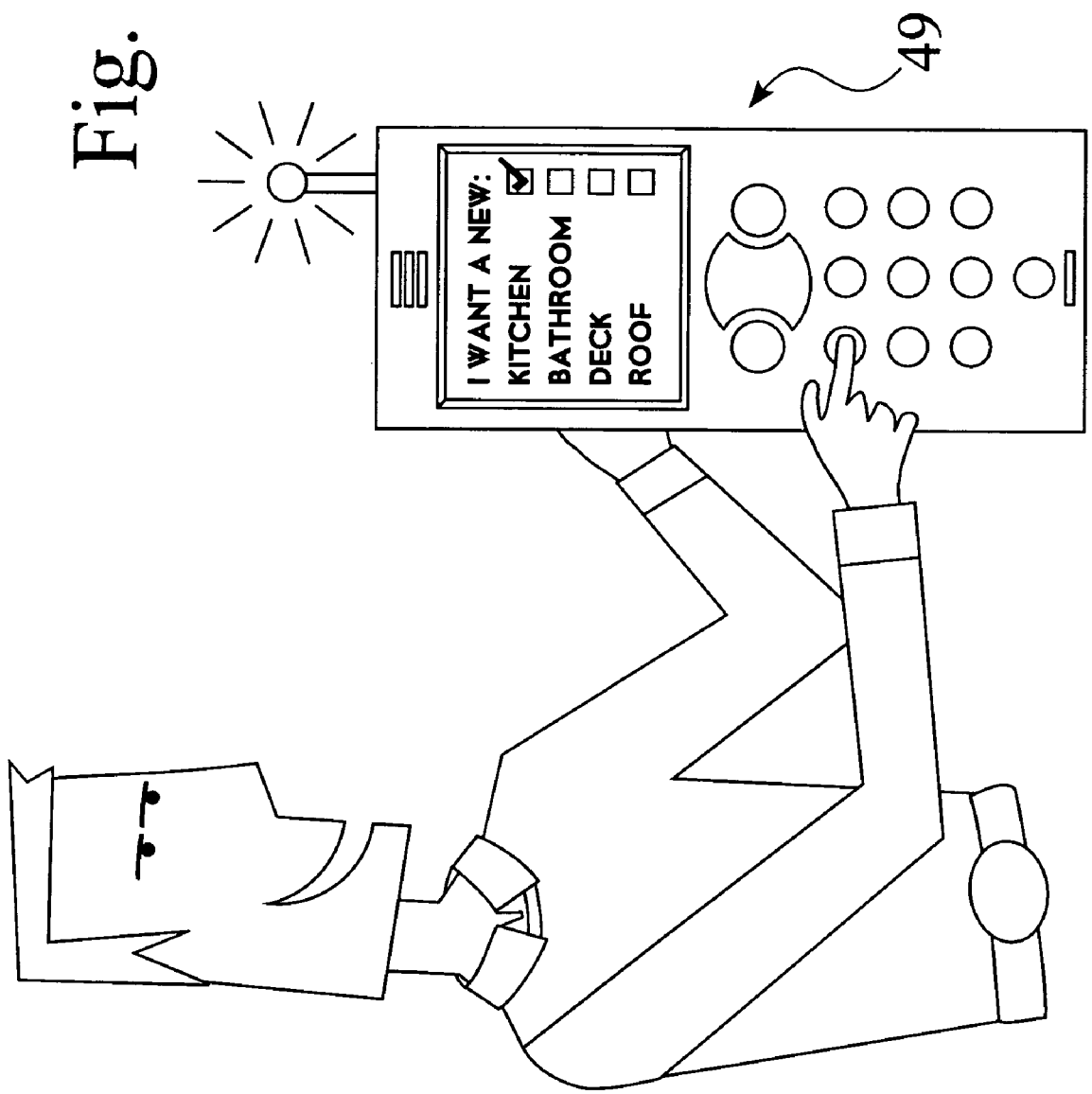

FIG. 37 shows a the LCD screen on the ContractorFinder as it displays a list of selections concerning contractor services.

Figure 38:
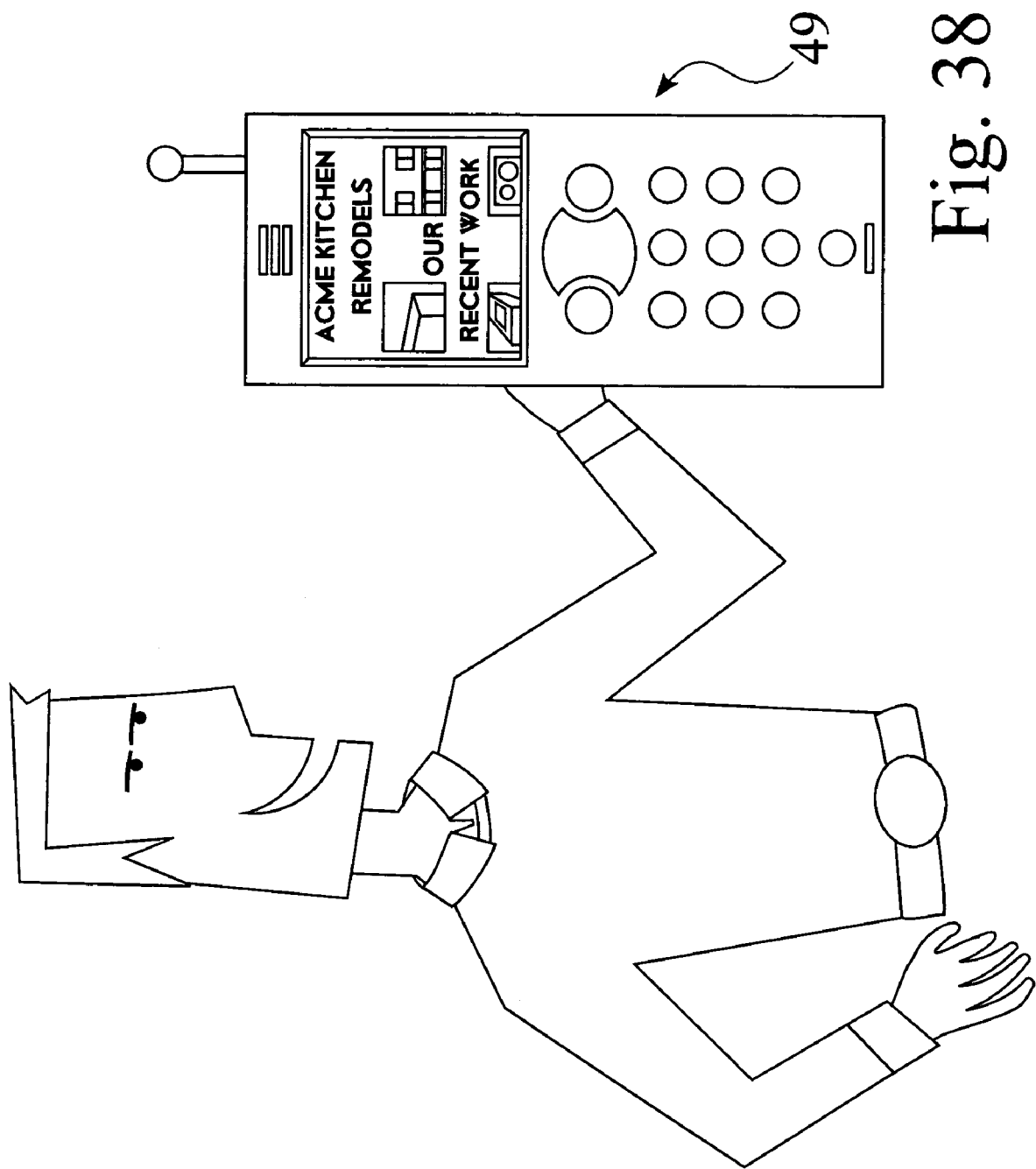

After the user chooses from among these choices, information about selected contractors is downloaded to his ContractorFinder in the form of text, images and/or videos, as shown in FIG. 38. The downloaded information may also help the user find the contractor's booth at the home show.

The description of this embodiment is intended to illustrate one particular application of the present invention, and is not intended to limit or to confine the invention to the particular embodiment of a home show attended by contractors. The invention may be used to find matches of attributes in any situation. Attributes may pertain to people, items in a warehouse, places or features of geography, or any other item or thing that is capable of being described and matched.

C. MateFinder with Direction & Range Finder

Figure 39:
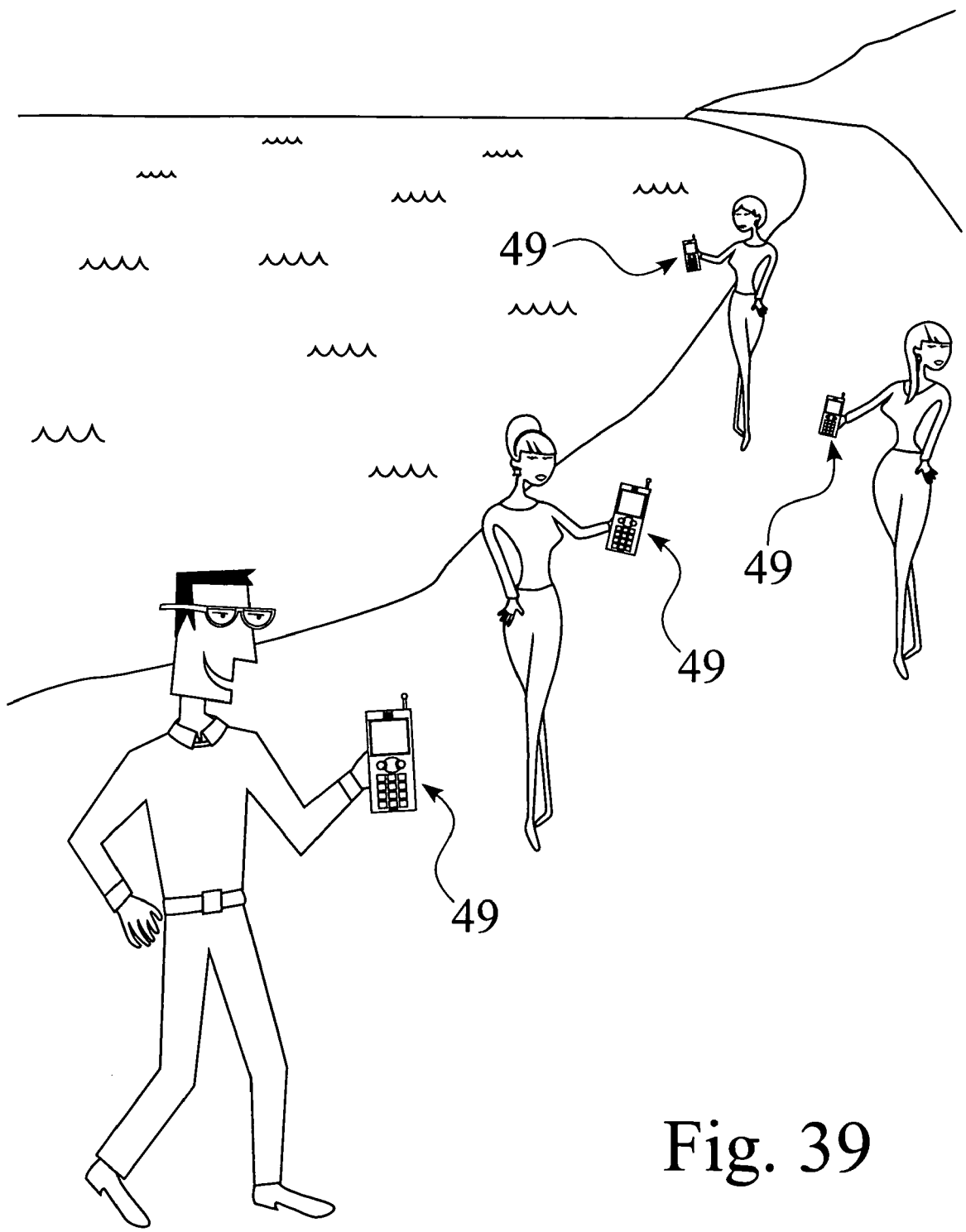
Figure 40:
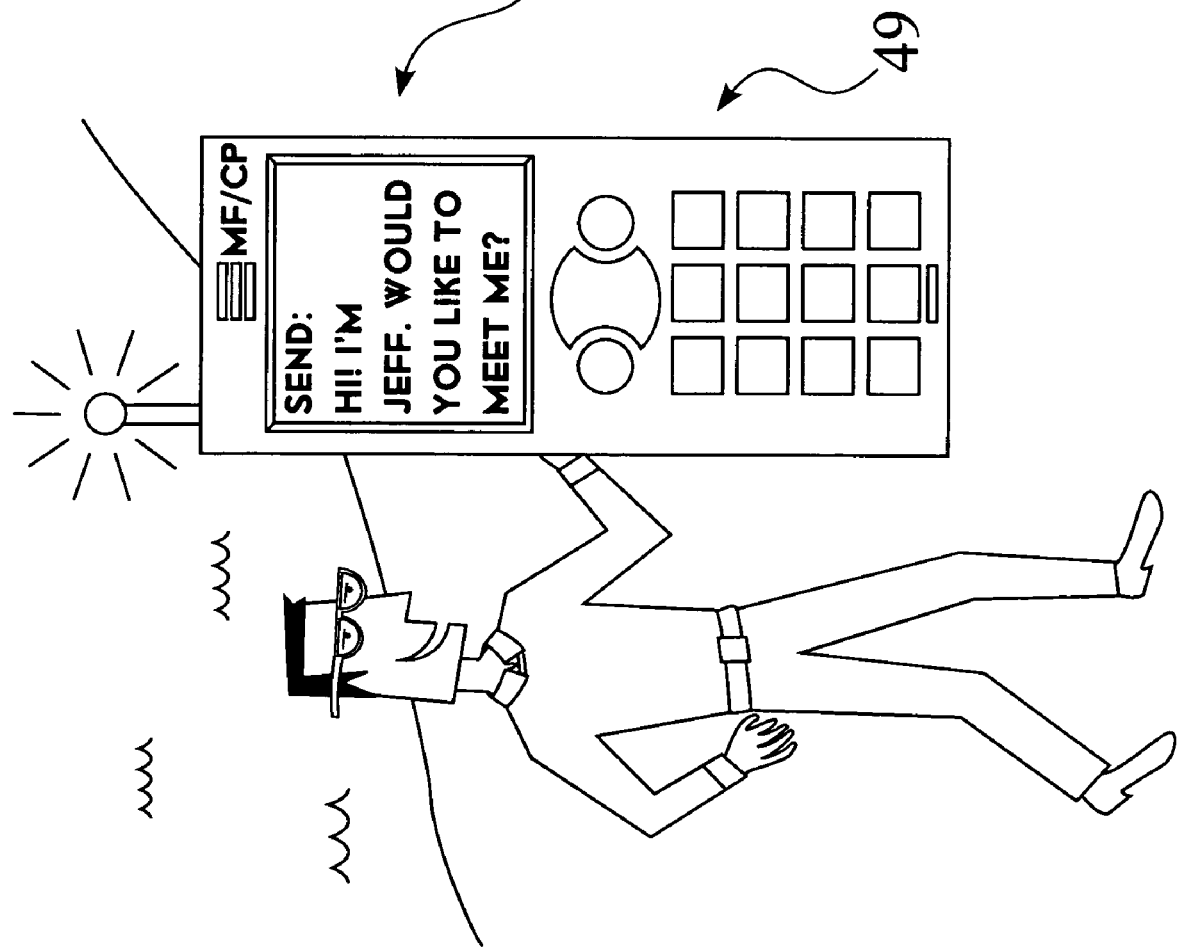
Figure 41:
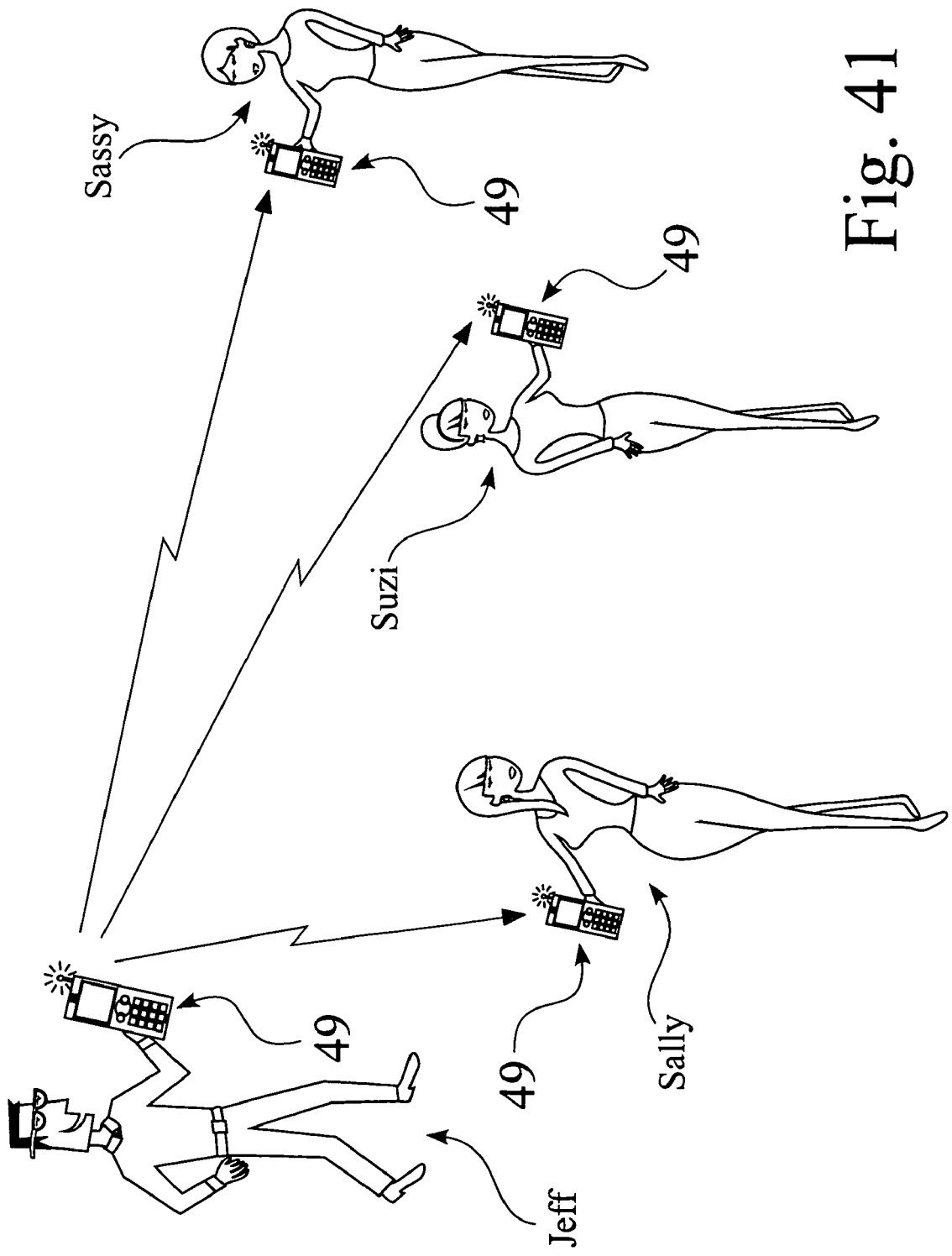
Figure 42:
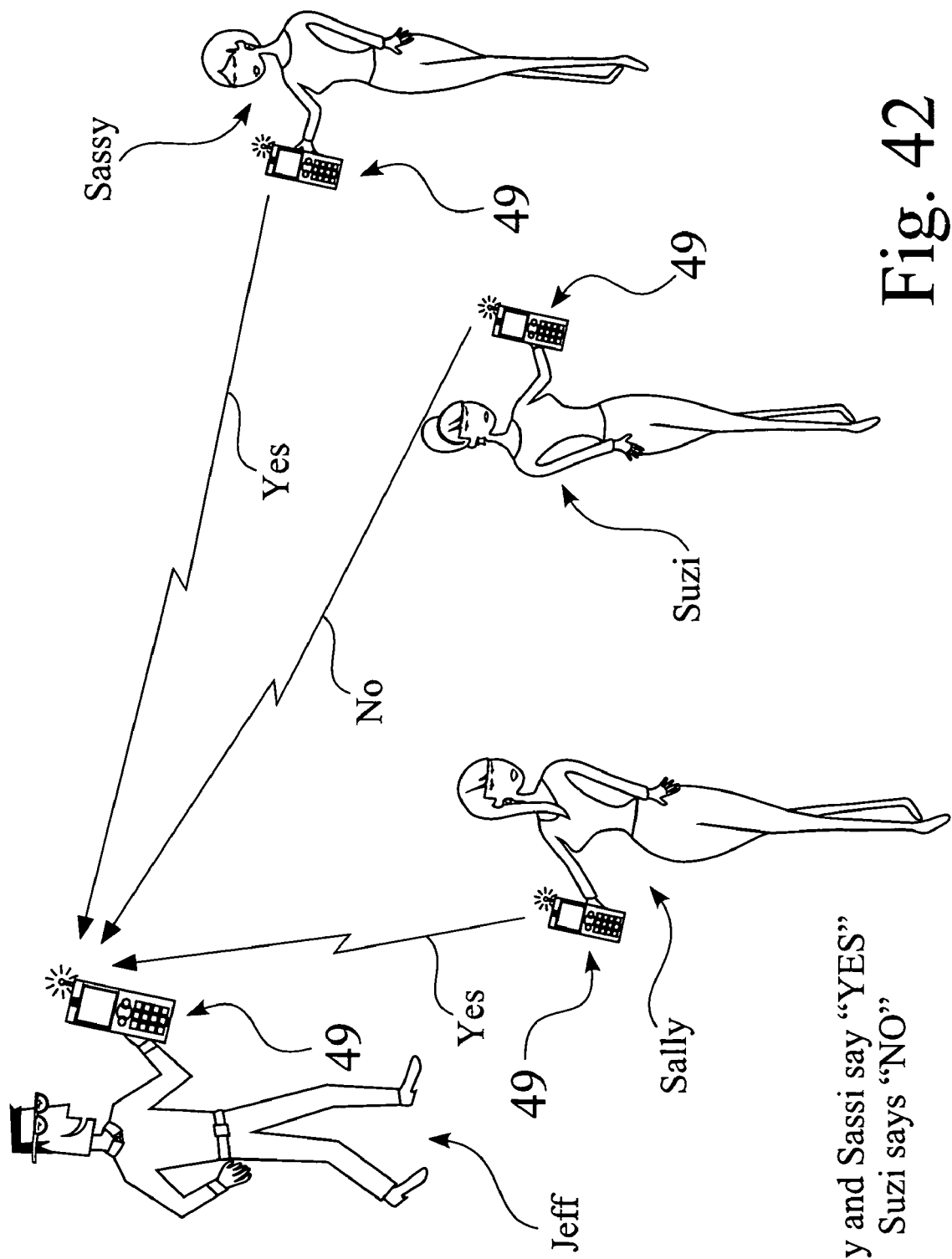
Figure 43:
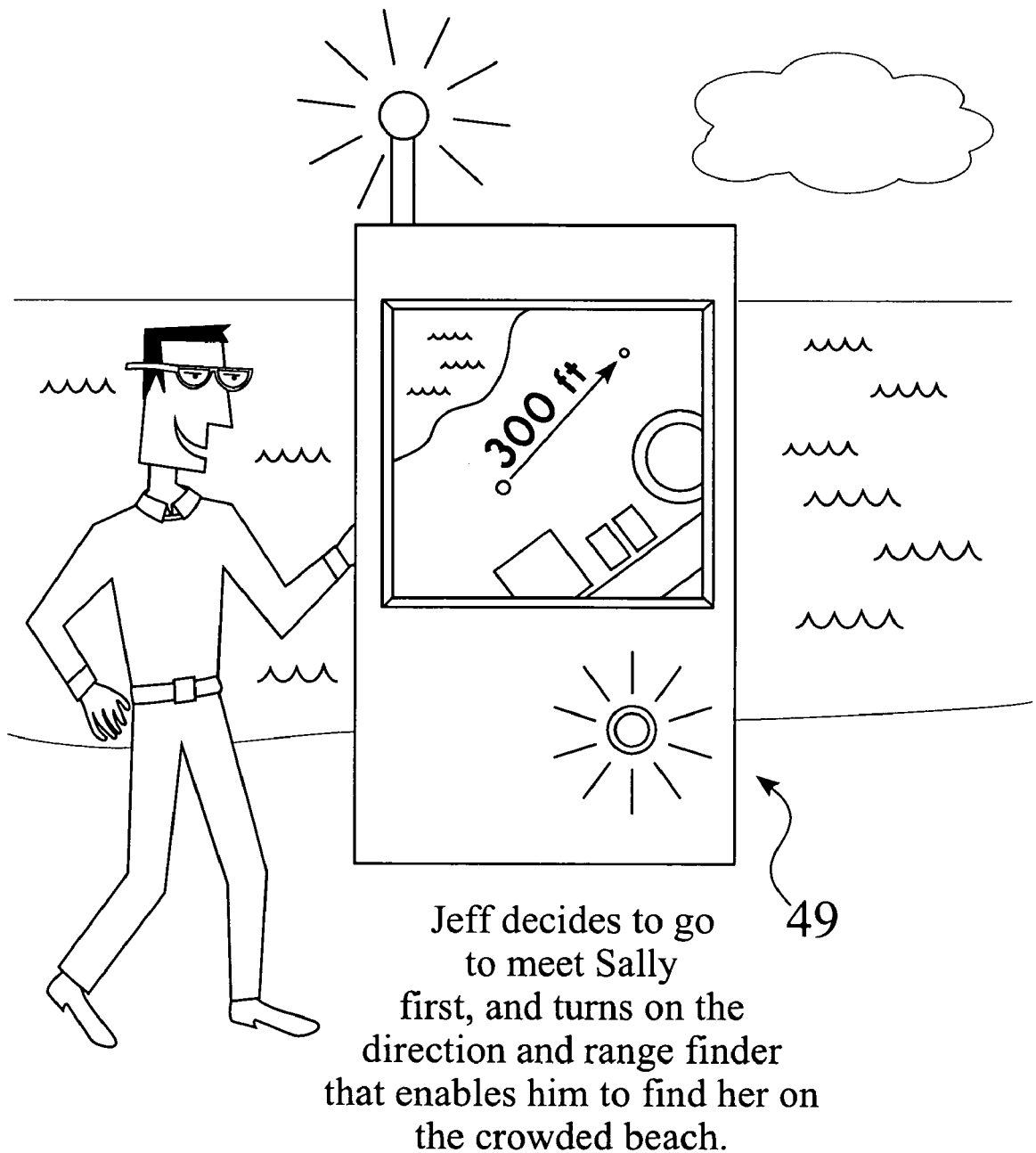

Another embodiment of the invention combines the MateFinder with direction and range finding capabilities. The combination is called the MateFinder/DRF™ 49. This Trade & Service Mark is owned by the Applicant. The MateFinder/DRF offers a user the ability to find someone in a large crowd, or in a large area, such as a beach or a ballpark. FIG. 39 furnishes a view of a user on a beach with his MateFinder/DRF, which has found three suitable matches in his general vicinity. In FIG. 40, the user sends a greeting message to three women using the text-message function. The greeting may be accompanied by the man's attributes, as presented in his profile on e-pheromone.com. In FIG. 41, the three women have received the greeting from the man. Two of the women decide to respond, while the third does not, as shown in FIG. 42. FIG. 43 shows that the man has decided to approach one of the women. He uses his MateFinder/DRF to request permission from the woman whom he is interested in meeting. When this woman grants permission, her MateFinder emits a homing signal, which enables the man to locate her by viewing a graphical display on the LCD screen of his MateFinder/DRF that supplies direction and range information.

In an alternative embodiment, the MateFinder with Direction & Range Finder may use a GPS radio to enable a user to find a match based on locations determined using the GPS System.

D. MateFinder with Network-Pushed Attributes

Figure 44:
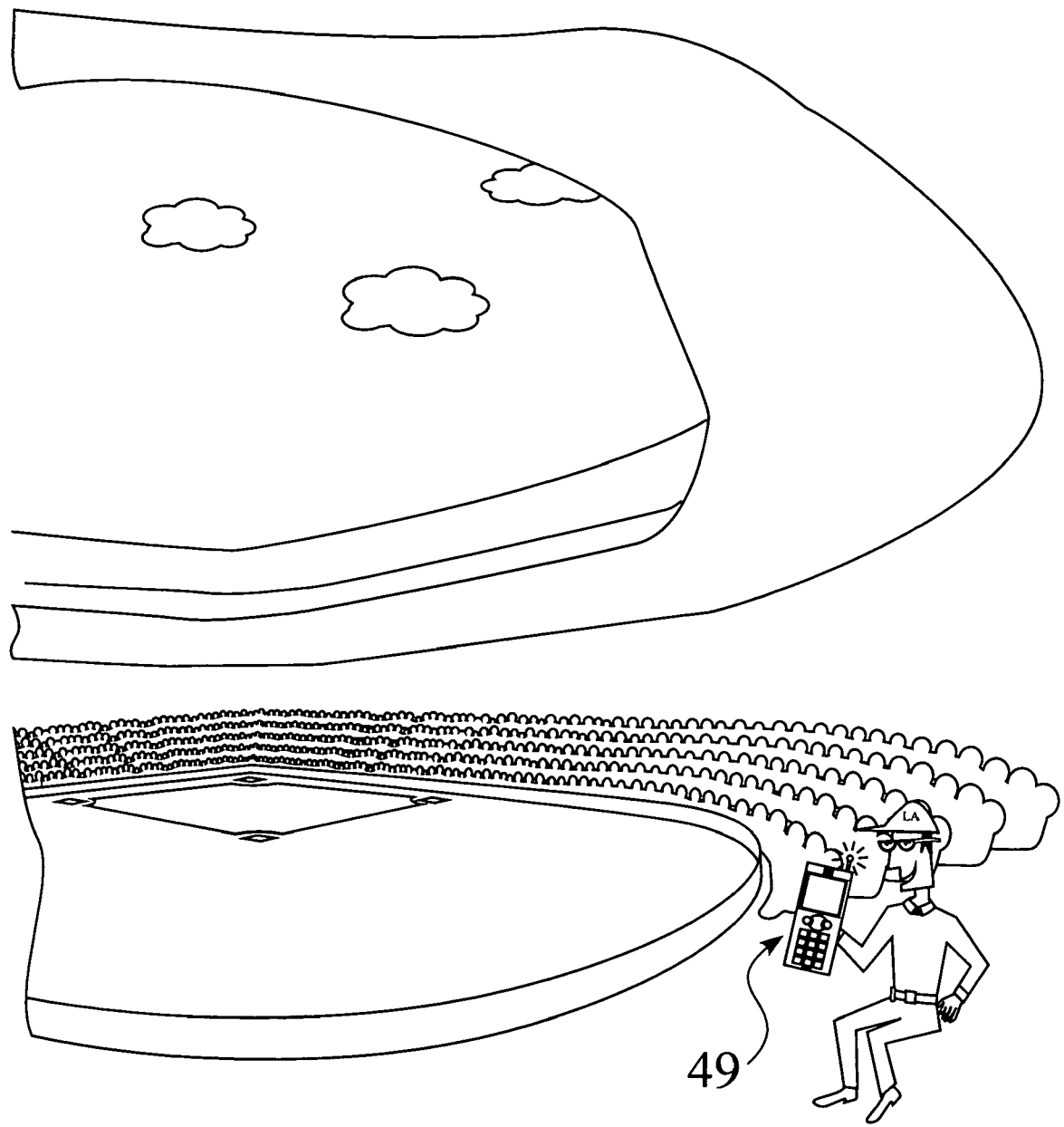
Figure 45:
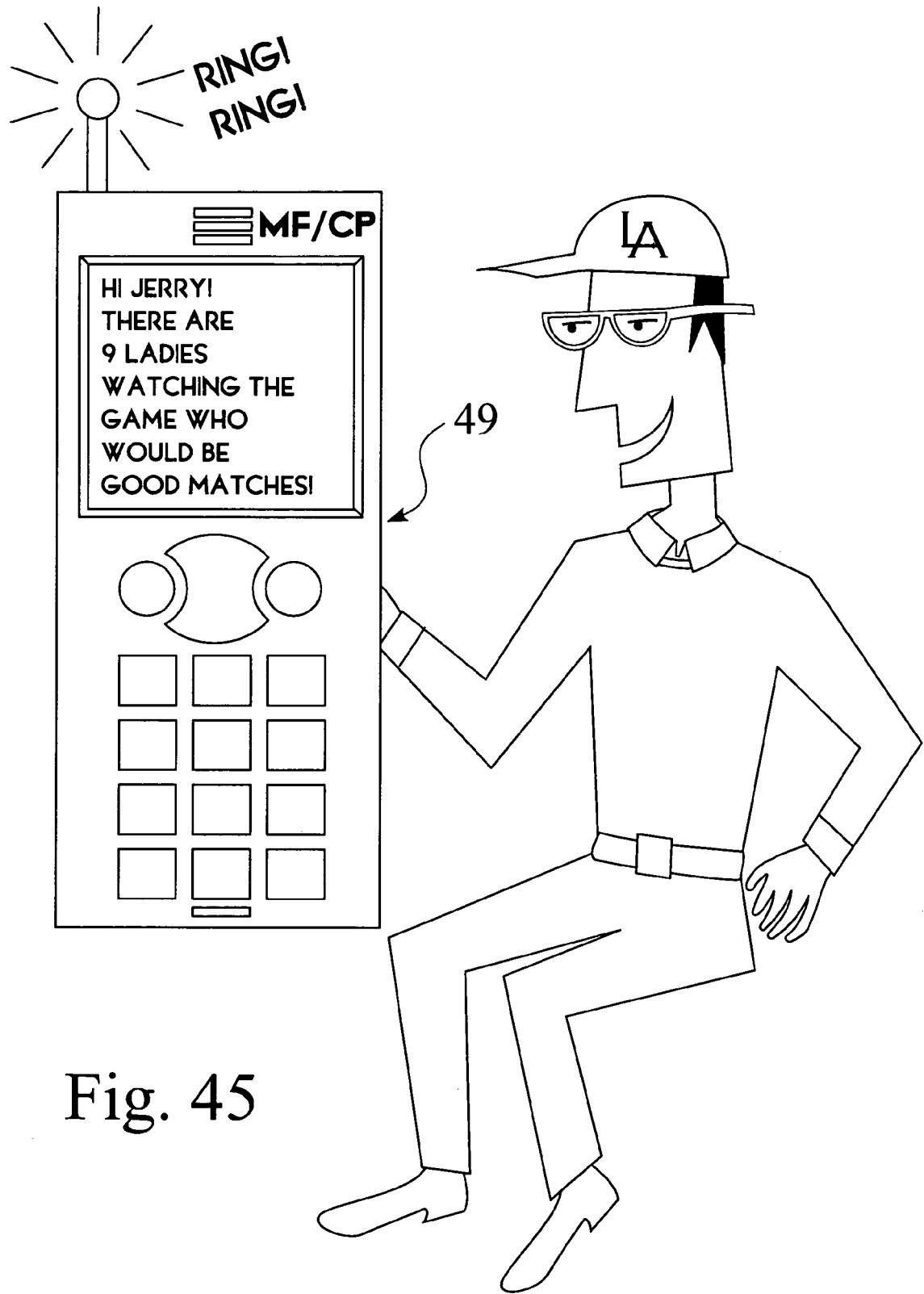

In another alternative embodiment of the invention, profiles of matches are automatically "pushed" to users. This version of the invention uses the MateFinder with AutoMatching™ 49. This Trade & Service Mark is owned by the Applicant. In one particular implementation, a user is watching a baseball game as shown in FIG. 44. His MateFinder with AutoMatching detects that there are several good matches who are also attending the game. Software at the e-pheromone.com website retrieves the profiles of the matches, and automatically sends them to the user's MateFinder, which rings or emits an alert to notify the user that profiles of matches have been conveyed to him, as shown in FIG. 45.

Figure 46:
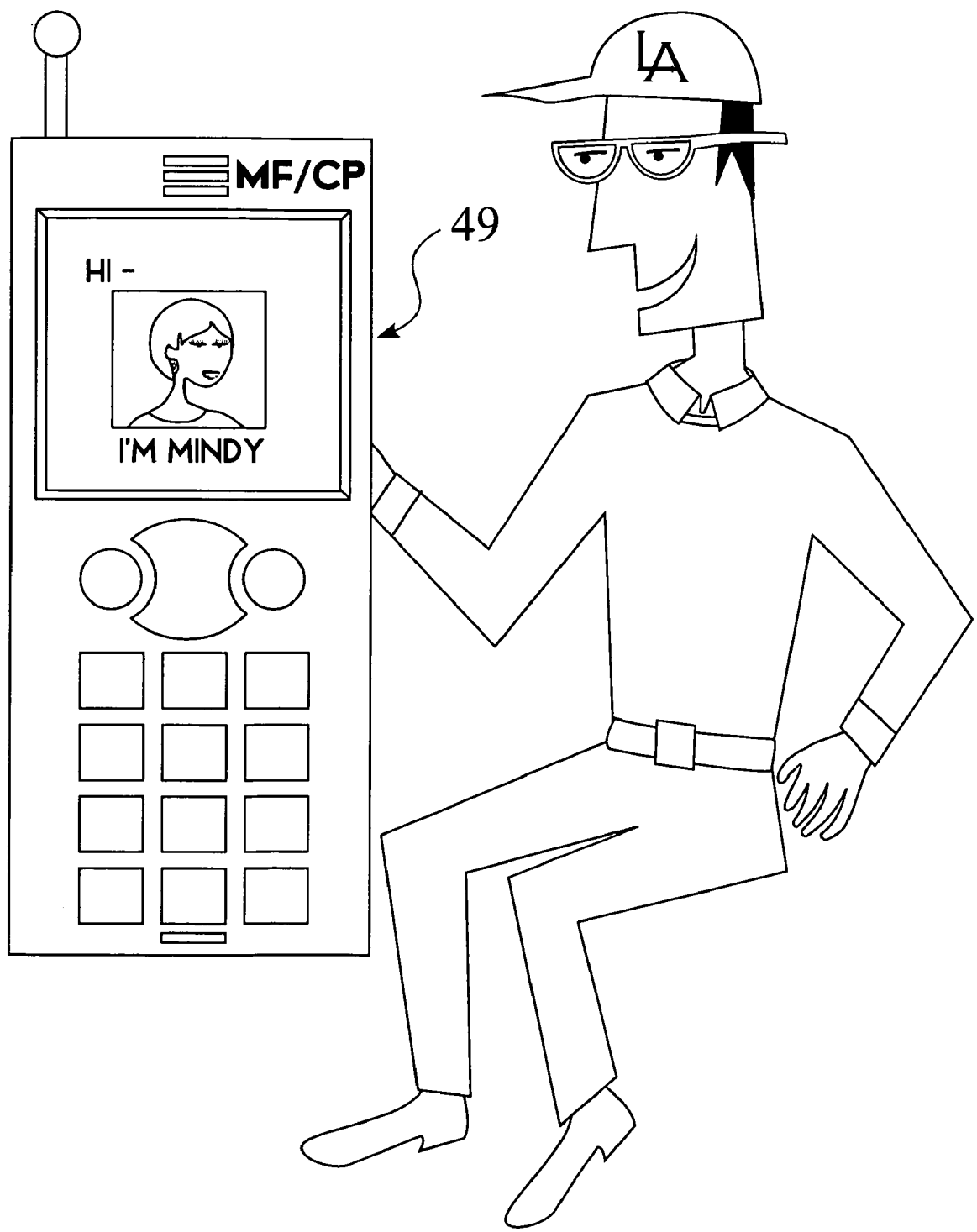
Figure 47:
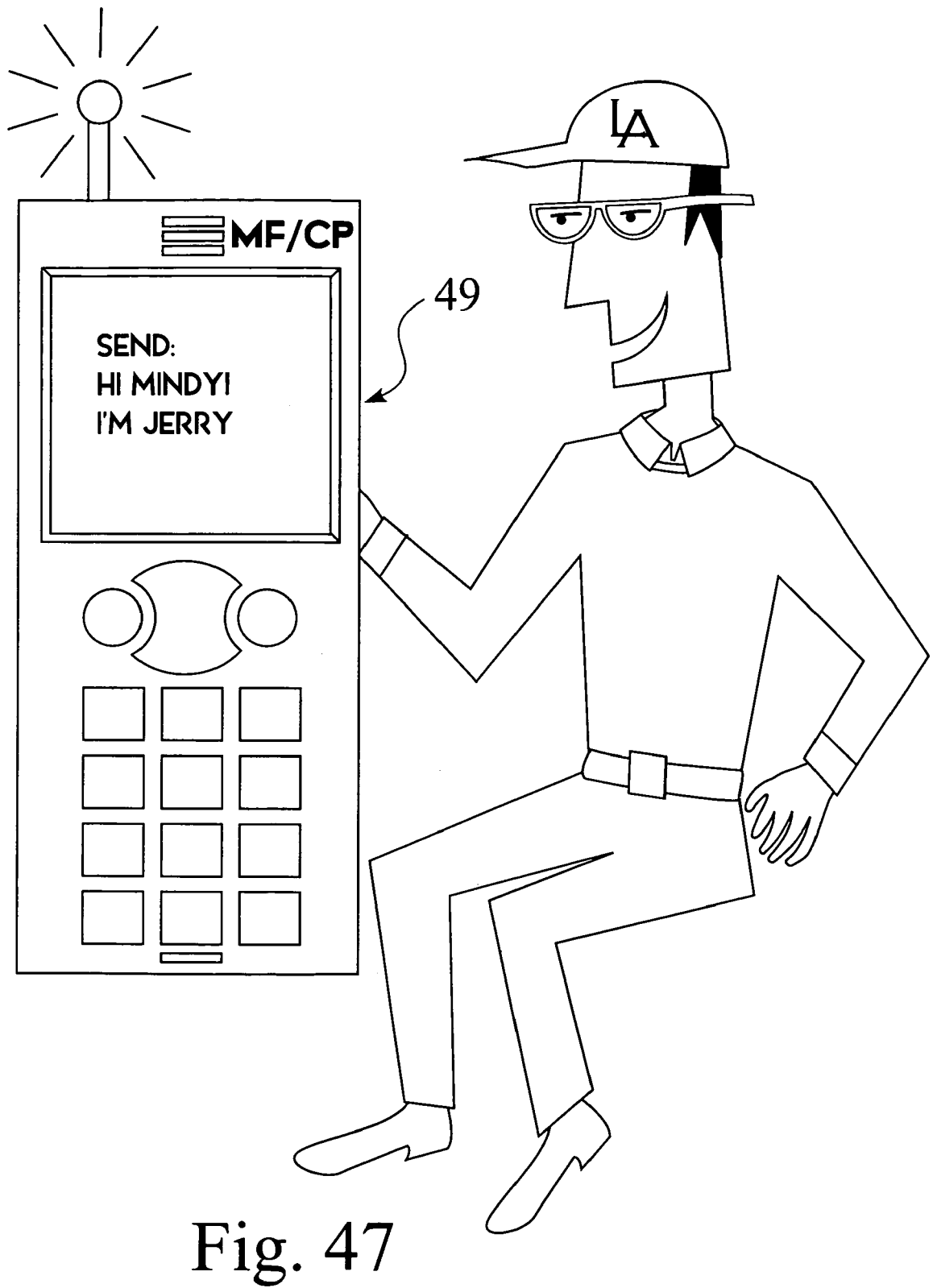
Figure 48:
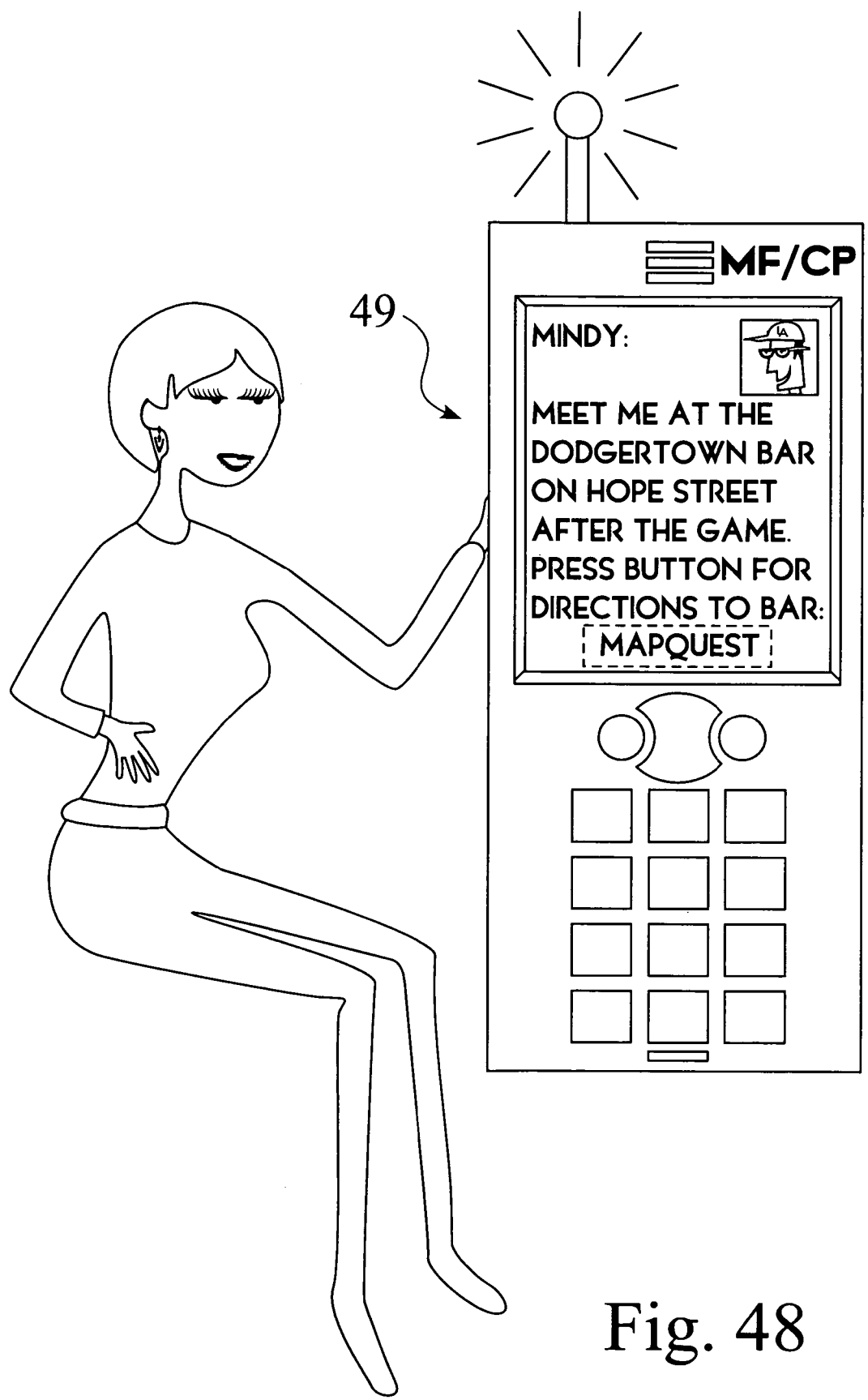

In FIG. 46, the user watches a short video which has just been received by his MateFinder, and decides to contact her via a text message or e-mail, as depicted in FIG. 47. In FIG. 47, the man sends the woman an invitation to meet after the ballgame, and suggests a meeting at a restaurant near the stadium. His invitation also includes a link to a webpage that furnishes a map and directions to the restaurant from the stadium.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Personal Radio Location System that have been disclosed above are intended to educate the reader about preferred embodiments of the invention, and are not intended to constrain the limits of the invention or the scope of Claims.

| LIST OF REFERENCE CHARACTERS | |
|---|---|
| 10 | MateFinder ™ |
| 10a | First user's MateFinder |
| 10b | Second user's MateFinder |
| 11 | Interrogation or seeking signal |
| 11a | First interrogation signal |
| 11b | Second interrogation signal |
| 12 | Housing |
| 14 | Power switch |
| 15 | "Seeking" indicator light |
| 16 | "Match Found" indicator light |
| 16a | First match indicator |
| 16b | Second match indicator |
| 17a | Man |
| 17b | Woman |
| 18 | LCD message screen |
| 19 | Website |
| 20 | USB port |
| 22 | Personal computer |
| 24 | USB cable |
| 26 | Battery |
| 28 | Radio/Processor assembly |
| 30 | Antenna |
| 32 | Memory |
| 32a | First memory |
| 32b | Second memory |
| 33 | Attribute |
| 33a | First set of attributes |
| 33b | Second set of attributes |
| 34 | Mask switch |
| 35 | Correlation thumbwheel |
| 36 | Microprocessor |
| 37 | Local wireless network |
| 38 | Downconverter |
| 39 | Transmit/Receive Switch |
| 40 | Amplifier |
| 42 | Modulator |
| 44 | Upconverter |
| 46 | Amplifier |
| 48 | Bandpass filter |
| 49 | MateFinder with Cellular Telephone Combination |
| 50 | Wireless network |
| 51 | Wireless signals to and from network |
| 52 | Network radio |

What is claimed is:

1. An apparatus comprising:
  a first transceiver (10a);
  said first transceiver (10a) including a first memory (32a);
    said first memory (32a) for storing a first attribute (33a) selected by a first user (17a);
  said first transceiver (10a) including a first match indicator (16a);
  a second transceiver (10b);
  said second transceiver (10b) including a second memory (32b); said second memory (32b) for storing a second attribute (33b) selected by a second user (17b);
  said second transceiver (10b) including a second match indicator (16b);
  said first transceiver (10a) for emitting a first interrogation signal (11a);
  said first interrogation signal (11a) being received by said second transceiver (10b);

said first match indicator (16*a*) on said first transceiver (10*a*) being activated when said first interrogation signal (11*a*) finds a match between said first attribute (33*a*) stored in said first memory (32*a*) in said first transceiver (10*a*) and said second attribute (33*b*) stored in said second memory (32*b*) in said second transceiver (10*b*);

said first attribute (33*a*) and said second attribute (33*b*) including information about an MHC (Major Histocompatibility Complex) dissimilarity of said first user (17*a*) compared to said second user (17*b*);

said match being based at least in part on said MHC dissimilarity;

a wireless network (50); and a first network radio (52*a*); said first network radio (52*a*) being co-located with said first transceiver (10*a*); said first network radio (52*a*) being used to communicate over said wireless network (50).

2. An apparatus as recited in claim 1, further comprising a voice call function.

3. An apparatus as recited in claim 1, further comprising an Internet access function.

4. An apparatus as recited in claim 1, further comprising a browser.

5. An apparatus as recited in claim 1, further comprising a text message function.

6. An apparatus as recited in claim 1, further comprising an instant messaging function.

7. An apparatus as recited in claim 1, further comprising an e-mail function.

8. An apparatus as recited in claim 1, further comprising a Global Positioning System function.

9. An apparatus as recited in claim 1, further comprising a display screen.

10. An apparatus as recited in claim 1, further comprising a keyboard.

11. An apparatus as recited in claim 1, further comprising a camera.

12. An apparatus as recited in claim 1, further comprising an audio recording function.

13. An apparatus as recited in claim 1, further comprising a video recording function.

14. An apparatus as recited in claim 1, which is used to access a website that contains a plurality of profiles.

15. An apparatus as recited in claim 14, which is used to view one of said plurality of profiles.

16. An apparatus as recited in claim 14, which is used to download one of said plurality of profiles.

17. An apparatus as recited in claim 14, which is used to download a certification of an attribute (33) contained in one of said plurality of profiles.

18. An apparatus as recited in claim 1, which is used to store an attribute which has been downloaded in said memory (32).

19. An apparatus as recited in claim 1, which is used to direct the storage of an attribute on a website (19).

20. An apparatus as recited in claim 1, which is used to forward an attribute.

21. An apparatus as recited in claim 1, which is used to view information about a plurality of products.

22. An apparatus as recited in claim 1, which is used to listen to information about a plurality of products.

23. An apparatus as recited in claim 21, in which said information includes text.

24. An apparatus as recited in claim 21, in which said information includes an image.

25. An apparatus as recited in claim 21, in which said information includes a video presentation.

26. An apparatus as recited in claim 1, which is used to download information about a plurality of products.

27. An apparatus as recited in claim 1, which is used to store downloaded information about a plurality of products.

28. An apparatus as recited in claim 1, which is used to view information about a plurality of services.

29. An apparatus as recited in claim 27, in which said information includes text.

30. An apparatus as recited in claim 27, in which said information includes an image.

31. An apparatus as recited in claim 27, in which said information includes a video presentation.

32. An apparatus as recited in claim 1, which is used to download information about a plurality of services.

33. An apparatus as recited in claim 1, which is used to store downloaded information about a plurality of services.

34. An apparatus as recited in claim 1, which is used to detect a match, and then is used to send a message to said match.

35. An apparatus as recited in claim 1, which is used to detect a homing signal generated by said match, and then to find said match using direction finding.

36. An apparatus as recited in claim 1, which is used to detect a homing signal generated by said match, and then to find said match using range finding.

37. An apparatus as recited in claim 1, in which a GPS receiver is used to locate said match.

38. An apparatus as recited in claim 1, which is used to receive an automatically transmitted attribute of a match.

39. An apparatus as recited in claim 1, which is used to view an automatically transmitted attribute of a match.

40. An apparatus as recited in claim 1, which is used to download an automatically transmitted attribute of a match.

41. An apparatus as recited in claim 1, which is used to store an automatically transmitted attribute of a match.

42. An apparatus as recited in claim 1, which issues an alert when an automatically transmitted attribute is received.

43. An apparatus as recited in claim 38, in which said automatically transmitted attribute includes text.

44. An apparatus as recited in claim 38, in which said automatically transmitted attribute includes an image.

45. An apparatus as recited in claim 38, in which said automatically transmitted attribute includes a video presentation.

46. An apparatus as recited in claim 1, which is used to receive an automatically transmitted attribute of a match who is nearby.

47. An apparatus as recited in claim 1, which issues an alert when an automatically transmitted attribute of a match who is nearby is received.

48. An apparatus as recited in claim 1, in which said first network radio (52*a*) is a cellular telephone.

49. An apparatus as recited in claim 1, in which said first network radio (52*a*) is a two-way pager.

50. An apparatus as recited in claim 1, in which said first network radio (52*a*) is a text-message device.

51. An apparatus as recited in claim 1, in which said first network radio (52*a*) is a personal digital assistant with wireless access.

52. An apparatus as recited in claim 1, in which said first network radio (52*a*) is a portable computer with wireless access.

53. An apparatus as recited in claim 1, in which said first network radio (52*a*) is a walkie-talkie.

54. An apparatus as recited in claim 1, further comprising a second network radio 52(*b*); said second network radio (52*b*) being co-located with said second transceiver.

55. An apparatus as recited in claim 1, in which
a central server uses location information generated by said network (52) to supply the relative positions of a plurality of said users to one of said users.

56. An apparatus comprising:
a first transceiver (10a);
said first transceiver (10a) including a first memory (32a); said first memory (32a) for storing a first attribute (33a) selected by a first user (17a);
said first transceiver (10a) including a first match indicator (16a);
a second transceiver (10b);
said second transceiver (10b) including a second memory (32b); said second memory (32b) for storing a second attribute (33b) selected by a second user (17b);
said second transceiver (10b) including a second match indicator (16b);
said first transceiver (10a) for emitting a first interrogation signal (11a);
said first interrogation signal (11a) being received by said second transceiver (10b);
said first match indicator (16a) on said first transceiver (10a) being activated when said first interrogation signal (11a) finds a match between said first attribute (33a) stored in said first memory (32a) in said first transceiver (10a) and said second attribute (33b) stored in said second memory (32b) in said second transceiver (10b); and
said first attribute (33a) and said second attribute (33b) including information about an MHC (Major Histocompatibility Complex) dissimilarity of said first user (17a) compared to said second user (17b);
said match being based at least in part on said MHC dissimilarity;
a website (19); said website for enabling said user to program said user's transceiver (10).

57. An apparatus as recited in claim 56, in which
said website (19) is also used for storing said user's attributes (33).

58. An apparatus as recited in claim 56, in which
said website (19) is used for certifying said user's attributes (33).

59. An apparatus as recited in claim 56, in which
said website (19) is used for providing an alias for said user's true e-mail address.

60. An apparatus as recited in claim 56, in which
said website (19) is used for providing a call-forwarding feature to protect said user's true telephone number.

61. A method comprising the steps of:
programming a transceiver (10) by storing a plurality of user attributes (33a) in said transceiver (10);
using said transceiver (10) to seek a match based on a comparison of said user attributes (33a) and a plurality of candidate attributes (33b); and
said plurality of user attributes (33a) and said plurality of candidate attributes (33b) including information about an MHC (Major Histocompatibility Complex) dissimilarity of said first user (17a) compared to said second user (17b);
said match being based at least in part on said MHC dissimilarity;
communicating with said match using a network radio (52).

62. A method as recited in claim 61, in which
said transceiver (10) is programmed using a personal computer (22) and a website (19).

63. A method as recited in claim 61, in which
said transceiver (10) is programmed using a personal computer (22).

64. A method as recited in claim 62, in which
said transceiver (10) is programmed directly using said website (19) using said network radio (52) over a wireless connection.

65. A method as recited in claim 61, in which
said transceiver (10) uses radio frequencies to interrogate a plurality of other transceivers (10).

66. A method as recited in claim 61, in which
said transceiver (10) is adjusted to calculate the degree of correlation of said user attributes (33a) and said plurality of candidate attributes (33b).

67. A method as recited in claim 61, in which
said network radio (52) is a cellular telephone.

68. A method as recited in claim 61, in which
said network radio (52) is a two-way pager.

69. A method as recited in claim 61, in which said network radio (52) is a text-message device.

70. A method as recited in claim 61, in which said network radio (52) is a personal digital assistant with wireless access.

71. A method as recited in claim 61, in which said network radio (52) is a portable computer with wireless access.

72. A method as recited in claim 61, in which said network radio (52) is a short-range radio.

73. A method as recited in claim 61, in which a central server uses location information generated by said network (52) to supply the relative positions of a plurality of said users to one of said users.

* * * * *